US012711565B2

(12) United States Patent
Mcmahan et al.

(10) Patent No.: US 12,711,565 B2
(45) Date of Patent: Aug. 18, 2026

(54) SYSTEM AND METHOD FOR USING TAMPER-PROOF EXECUTABLE INSTRUCTIONS FOR ELECTRONIC COMMUNICATION PLATFORMS

(71) Applicant: FOUNDATION CREF LLC, Seal Beach, CA (US)

(72) Inventors: Ron Mcmahan, Seal Beach, CA (US); John Seeburger, Seal Beach, CA (US); Christopher Crovatto, Seal Beach, CA (US); Sean Banchik, Seal Beach, CA (US); Todd Mont, Seal Beach, CA (US)

(73) Assignee: FOUNDATION CREF LLC, Seal Beach, CA (US)

( * ) Notice: Subject to any disclaimer, the term of this patent is extended or adjusted under 35 U.S.C. 154(b) by 0 days.

(21) Appl. No.: 19/354,426

(22) Filed: Oct. 9, 2025

(65) Prior Publication Data

US 2026/0179159 A1 Jun. 25, 2026

Related U.S. Application Data

(63) Continuation-in-part of application No. 17/064,973, filed on Oct. 7, 2020, now abandoned.

(Continued)

(51) Int. Cl.
*G06Q 30/06* (2023.01)
*G06Q 30/0601* (2023.01)

(Continued)

(52) U.S. Cl.
CPC ....... *G06Q 50/163* (2013.01); *G06Q 30/0641* (2013.01); *G06Q 30/08* (2013.01)

(58) Field of Classification Search
CPC ... G06Q 30/06; G06Q 30/0643; G06F 3/0482
See application file for complete search history.

(56) References Cited

U.S. PATENT DOCUMENTS

2017/0005804 A1* 1/2017 Zinder .................. H04L 9/3239
2017/0249682 A1* 8/2017 Friedman ........... G06Q 30/0623
2019/0026845 A1* 1/2019 Amin ..................... G06Q 30/06

OTHER PUBLICATIONS

Niedermayer, Andreas, Artyom Shneyerov, and Pia Xu. Foreclosure auctions. No. 522. SFB/TR 15 Discussion Paper, 2015.*

(Continued)

*Primary Examiner* — Jeffrey A. Smith
*Assistant Examiner* — Jennifer V Lee
(74) *Attorney, Agent, or Firm* — Foley & Lardner LLP

(57) ABSTRACT

A computer-implemented system for managing online, event-driven asset network events is disclosed. The system presents role-specific electronic dashboards to different parties via a web application. Prior to a scheduled event, a user selection and associated value are captured and stored within an immutable executable file containing asset attributes and computer-readable instructions. The file is stored in both a system database and on the user device to prevent unauthorized modification. Upon detecting commencement of the scheduled event, the system automatically executes the file, submitting the instructed value across connected platforms and confirming completion of the network operation in accordance with predefined transfer rules. Integrated synchronization and external data interfaces provide real-time updates, secure recordkeeping, and coordinated process management for all stakeholders.

20 Claims, 34 Drawing Sheets

400

Display first dashboard on user device of user. 402

In response to receiving one or more inputs from the first user device, present a first set of graphical components on the first electronic dashboard where each graphical component of the first set of graphical components represents a data record satisfying the one or more inputs and is configured to direct the first user device to an electronic page displaying at least one attribute of the data record. 404

In response to receiving a selection of a first graphical component corresponding to a first data record and a first value at a time before a scheduled event of the first data record, generate an immutable executable file comprising: a dataset comprising at least one attribute of the first data record, the first value, and a computer-readable instruction configured to cause a computer to generate and submit a proposed value at the event associated with the first data record, the proposed value corresponding to any amount higher than proposed values from other digital participants at the event. 406

Upon identifying the immutable executable file for the first data record at the event for the first data record, automatically execute the immutable executable file, such that the computer readable instruction of the immutable executable file causes the server to: generate, in accordance with the computer readable instruction within the immutable executable file, a proposed value for a associated with the first data record on behalf of the first user, wherein the proposed value causes the data record to be automatically assigned to the first user, and transmit the generated proposed value to a second server associated with the event, such that the immutable executable file causes the second server to automatically block other proposed values from other digital participants at the event. 408

Related U.S. Application Data

(60) Provisional application No. 62/914,132, filed on Oct. 11, 2019.

(51) Int. Cl.
*G06Q 30/08* (2012.01)
*G06Q 50/163* (2024.01)

(56) References Cited

OTHER PUBLICATIONS

"How to Bid at the Public Trustee Foreclosure Sale," Adams County Public Trustee, retrieved from https://www.adcogov.org/sites/default/fi les/H ow-to-Bid-at-the-Public-Trustee-Foreclosure-Sale-V201702.pdf, Feb. 2017 (2 pages).
Final Office Action on U.S. Appl. No. 17/064,973 dated Aug. 20, 2024 (21 pages).
Final Office Action on U.S. Appl. No. 17/064,973 dated May 19, 2023 (21 pages).
Non-Final Office Action on U.S. Appl. No. 17/064,973 dated Apr. 10, 2025 (26 pages).
Non-Final Office Action on U.S. Appl. No. 17/064,973 dated Dec. 22, 2023 (21 pages).
Non-Final Office Action on U.S. Appl. No. 17/064,973 dated Oct. 27, 2022 (18 pages).

* cited by examiner

Figure 4:
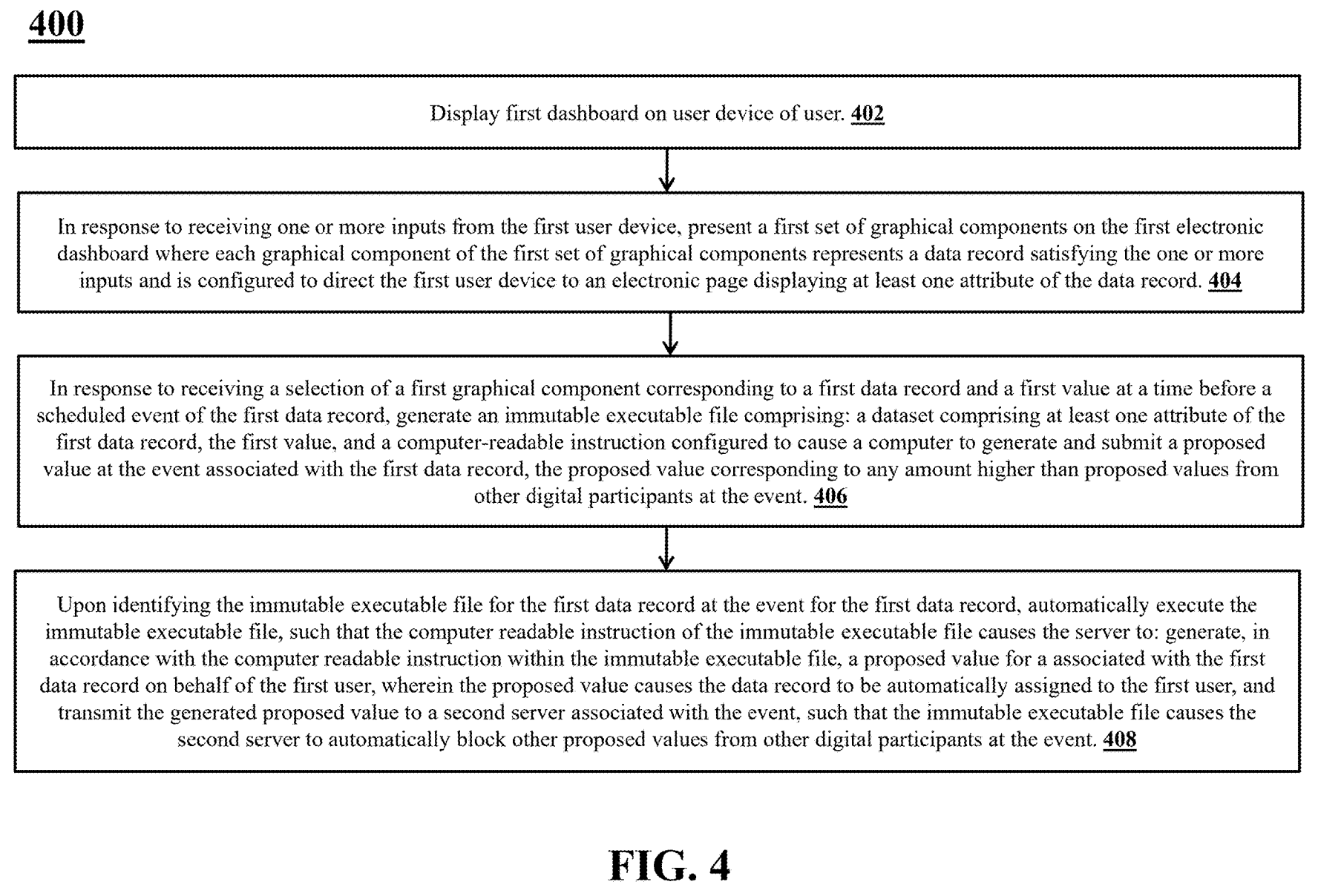

400

Display first dashboard on user device of user. 402

In response to receiving one or more inputs from the first user device, present a first set of graphical components on the first electronic dashboard where each graphical component of the first set of graphical components represents a data record satisfying the one or more inputs and is configured to direct the first user device to an electronic page displaying at least one attribute of the data record. 404

In response to receiving a selection of a first graphical component corresponding to a first data record and a first value at a time before a scheduled event of the first data record, generate an immutable executable file comprising: a dataset comprising at least one attribute of the first data record, the first value, and a computer-readable instruction configured to cause a computer to generate and submit a proposed value at the event associated with the first data record, the proposed value corresponding to any amount higher than proposed values from other digital participants at the event. 406

Upon identifying the immutable executable file for the first data record at the event for the first data record, automatically execute the immutable executable file, such that the computer readable instruction of the immutable executable file causes the server to: generate, in accordance with the computer readable instruction within the immutable executable file, a proposed value for a associated with the first data record on behalf of the first user, wherein the proposed value causes the data record to be automatically assigned to the first user, and transmit the generated proposed value to a second server associated with the event, such that the immutable executable file causes the second server to automatically block other proposed values from other digital participants at the event. 408

FIG. 10
FOUNDATION
AUCTIONS
123 Main Street
126 Point Street
59 Main Street
369 Cole Dr.
63 Main Ave.
123 Calvert Cr.
John Smith
FOUNDATION

BID ACTIVITY

Winning Bid: $730,000 | Winner: John Johnson | Reserve: $720,000

123 Main St, Dallas, TX, 75026

1906

| Auction ID | User | Date/Time | High Bid |
|---|---|---|---|
| 113 | User 1 | 2020-09-17 11:59:52.768403 | $729,000 |
| 113 | User 2 | 2020-09-17 11:59:34.691220 | $739,000 |
| 113 | User 3 | 2020-09-17 11:58:36.342210 | $726,000 |
| 113 | User 4 | 2020-09-17 11:58:27.806951 | $723,000 |
| 113 | User 5 | 2020-09-17 09:17:56.308106 | $725,000 |
| 113 | User6 | 2020-09-16 11:57:50.941293 | $712,000 |
| 113 | User 7 | 2020-09-16 10:48:05.002567 | $700,000 |

Offers

| Date/Time | Offer | User | Entity | Phone | Email | Message |
|---|---|---|---|---|---|---|
| 2020-09-17 12:06:36 | $725,000 | John Smith | John Smith LLC | 9729796334 | John@email.com | |

Figure 22:
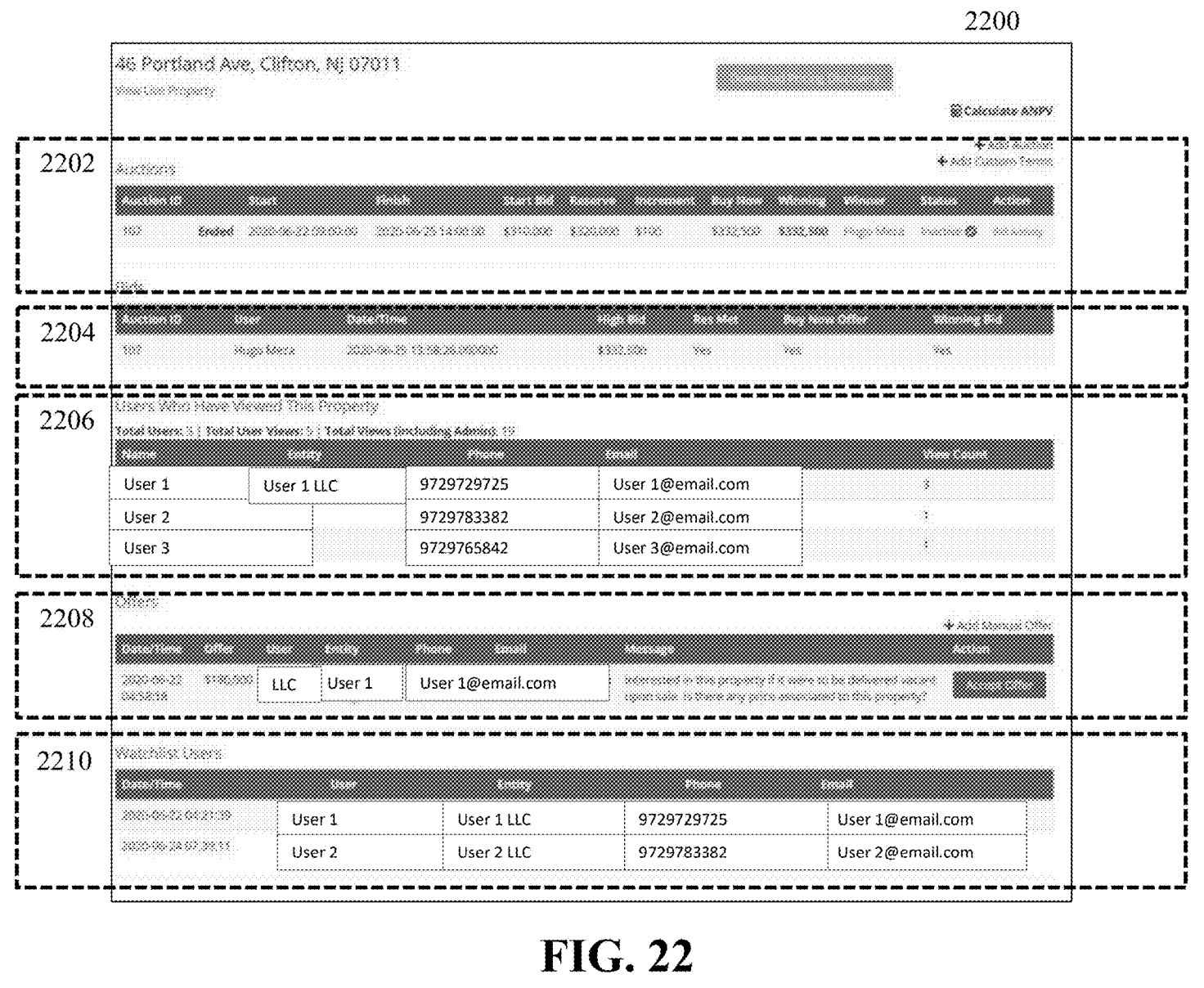

46 Portland Ave, Clifton, NJ 07011

| User 1 | User 1 LLC | 9729729725 | User 1@email.com |
| --- | --- | --- | --- |
| User 2 | | 9729783382 | User 2@email.com |
| User 3 | | 9729765842 | User 3@email.com |

| LLC | User 1 | User 1@email.com |
| --- | --- | --- |

| User 1 | User 1 LLC | 9729729725 | User 1@email.com |
| --- | --- | --- | --- |
| User 2 | User 2 LLC | 9729783382 | User 2@email.com |

AUCTION LOTS FROM 2020-09-24

| | Start | End | Address | Start Bid | Reserve | Increment | Buy Now | Winning |
|---|---|---|---|---|---|---|---|---|
| Ended | 2020-09-19 07:00:00 PST | 2020-09-24 13:00:00 PST | 123 Main Street | $50,000 | $55,000 | $500 | $65,000 | |
| Ended | 2020-09-19 07:00:00 PST | 2020-09-24 13:00:00 PST | 126 Point Street | $80,000 | $90,000 | $1,000 | $110,000 | |

123 Main Street, Dallas, TX, 75206

| Address | Date | Discount Rate | REO Months | Modeled Rehab Cost | Brokerage and Closing Costs | Other (CFK,Eviction, Prop Pres) | Tax Insurance | AUM | Cost of Capital | Property Specific | Expected REO Sale Price | ANPV |
|---|---|---|---|---|---|---|---|---|---|---|---|---|
| 123 Main Street | 2020-09-25 17:01:05 | 15% | 10 | $100,000 | $54,250 | $5,000 | $22,515 | $8,313 | $84,461 | $0.00 | $950,000 | $676,375 |
| 126 Point Street | 2020-09-25 17:00:51 | 12% | 7 | $100,000 | $54,250 | $5,000 | $22,515 | $8,313 | $49,144 | $0.00 | $950,000 | $711,310 |
| 59 Main Street | 2020-09-25 17:00:18 | 12% | 7 | $40,875 | $54,250 | $5,000 | $22,515 | $8,313 | $52,927 | $0.00 | $950,000 | $766,653 |
| 369 Cole Dr. | 2020-09-25 16:59:24 | 12% | 10 | $100,000 | $57,000 | $5,000 | $23,700 | $8,750 | $73,383 | $0.00 | $1,000,000 | $732,955 |
| 63 Main Pole Ave. | 2020-09-25 16:58:44 | 15% | 10 | $100,000 | $57,000 | $5,000 | $23,700 | $8,750 | $89,526 | $0.00 | $1,000,000 | $716,986 |
| 560 Main Street | 2020-09-25 16:56:56 | 12% | 7 | $40,875 | $57,000 | $5,000 | $23,700 | $8,750 | $55,874 | $0.00 | $1,000,000 | $609,361 |
| 445 Point Street | 2020-09-24 22:21:01 | 12% | 7 | $16,700 | $5,410 | $5,000 | $1,469 | $543 | $2,138 | $0.00 | $62,000 | $30,775 |
| 980 Main Street | 2020-09-15 16:34:25 | 12% | 7 | $24,675 | $10,250 | $5,000 | $4,013 | $1,313 | $6,785 | $0.00 | $150,000 | $98,049 |

FIG. 28

SYSTEM AND METHOD FOR USING TAMPER-PROOF EXECUTABLE INSTRUCTIONS FOR ELECTRONIC COMMUNICATION PLATFORMS

CROSS-REFERENCE TO RELATED APPLICATIONS

This application is a continuation-in-part of U.S. patent application Ser. No. 17/064,973, filed on Oct. 7, 2020, which claims priority to U.S. Provisional Patent Application No. 62/914,132, filed on Oct. 11, 2019, each of which is incorporated herein by reference in its entirety for any and all purposes.

TECHNICAL FIELD

The present application relates generally to online event management.

BACKGROUND

Online event-based asset transfers and data record management have become increasingly common, yet existing digital platforms lack comprehensive management capabilities to ensure transparency, coordination, and certainty of outcome. Current systems often operate in isolation, provide incomplete or outdated asset information, and fail to synchronize activities between parties in real time, leading to miscommunication, errors, and disputes. Moreover, they cannot securely preserve and enforce pre-event commitments at the time of the event, as no mechanism exists for generating immutable, tamper-proof instruction sets and executing them automatically across interconnected systems. As a result, participants may lose desired assets despite prior agreements, and asset holders cannot reliably finalize network events.

SUMMARY

For the aforementioned reasons, there is a need for a secure, integrated (and multi-tiered) platform capable of managing online events end-to-end, recording pre-event selections in a protected executable format, and automatically enforcing those instructions during the event while providing synchronized, role-specific interfaces for all stakeholders.

The disclosed system provides technical advantages by implementing a secure, distributed architecture that ensures the integrity and execution of pre-event commitments in online, event-driven environments. By generating immutable executable files containing asset attributes and value instructions and redundantly storing them on both the system database and user device, the methods and systems discussed herein prevent unauthorized alteration while enabling automatic, rules-based execution at the scheduled event without human intervention. Multi-tier, role-specific electronic dashboards synchronized in real time across platforms improve operational visibility and coordination between stakeholders, while integration with external data sources supports accurate asset valuation and status monitoring. These features collectively enhance security, network operation certainty, and process efficiency beyond the capabilities of existing online event management systems.

In some aspects, the techniques described herein relate to a system including: a server including a processor and a non-transitory computer-readable medium containing instructions that when executed by the processor causes the processor to perform operations including: display a first electronic dashboard on a first user device of one or more user devices upon execution of a web application on the first user device; in response to receiving one or more inputs from the first user device, present a first set of graphical components on the first electronic dashboard where each graphical component of the first set of graphical components represents a data record satisfying the one or more inputs and is configured to direct the first user device to an electronic page displaying at least one attribute of the data record; in response to receiving a selection of a first graphical component corresponding to a first data record and a first value at a time before a scheduled event of the first data record, generate an immutable executable file including: a dataset including at least one attribute of the first data record, the first value, and a computer-readable instruction configured to cause a computer to generate and submit a proposed value at the scheduled event associated with the first data record, the proposed value corresponding to any amount higher than proposed values from other digital participants at the scheduled event; store the immutable executable file in a system database and a copy of the immutable executable file on the first user device to avoid an unauthorized revision of the immutable executable file; and upon identifying the immutable executable file for the first data record at the scheduled event for the first data record, automatically execute the immutable executable file, such that the computer-readable instruction of the immutable executable file causes the server to: generate, in accordance with the computer-readable instruction within the immutable executable file, a proposed value for a associated with the first data record on behalf of the first user device, wherein the proposed value causes the data record to be automatically assigned to the first user device, and transmit the generated proposed value to a second server associated with the scheduled event, such that the immutable executable file causes the second server to automatically block other proposed values from other digital participants at the scheduled event.

In some aspects, the immutable executable file further causes the second server to terminate publishing, within at least one electronic page, data associated with the first data record.

In some aspects, the instructions further cause the processor to: instruct the second server to block a second proposed value associated with the first data record from a second electronic device.

In some aspects, the instructions further cause the processor to: present the first set of graphical components on the first electronic dashboard based on historical input data associated with a user of the first user device.

In some aspects, the one or more inputs includes a geographical location or a type of a unit associated with the first data record.

In some aspects, the instructions further cause the processor to: display a second electronic dashboard on an administrator device upon execution of the web application on the administrator device.

In some aspects, the instructions further cause the processor to: present on the second electronic dashboard a status of a corresponding data record associated with a second set of graphical components, in response to an interaction with any corresponding first set of graphical components.

In some aspects, the techniques described herein relate to a method including: displaying, by at least one processor, a first electronic dashboard on a first user device of one or more user devices upon execution of a web application on the first user device; in response to receiving one or more inputs from the first user device, presenting, by the at least one processor, a first set of graphical components on the first electronic dashboard where each graphical component of the first set of graphical components represents a data record satisfying the one or more inputs and is configured to direct the first user device to an electronic page displaying at least one attribute of the data record; in response to receiving a selection of a first graphical component corresponding to a first data record and a first value at a time before a scheduled event of the first data record, generating, by the at least one processor, an immutable executable file including: a dataset including at least one attribute of the first data record, the first value, and a computer-readable instruction configured to cause a computer to generate and submit a proposed value at the scheduled event associated with the first data record, the proposed value corresponding to any amount higher than proposed values from other digital participants at the scheduled event; storing, by the at least one processor, the immutable executable file in a system database and a copy of the immutable executable file on the first user device to avoid an unauthorized revision of the immutable executable file; and upon identifying the immutable executable file for the first data record at the scheduled event for the first data record, automatically executing, by the at least one processor, the immutable executable file, such that the computer-readable instruction of the immutable executable file causes the at least one processor to: generate, in accordance with the computer-readable instruction within the immutable executable file, a proposed value for a associated with the first data record on behalf of the first user device, wherein the proposed value causes the data record to be automatically assigned to the first user device, and transmit the generated proposed value to a second server associated with the scheduled event, such that the immutable executable file causes the second server to automatically block other proposed values from other digital participants at the scheduled event.

In some aspects, the immutable executable file further causes the second server to terminate publishing, within at least one electronic page, data associated with the first data record.

In some aspects, the method further includes instructing, by the at least one processor, the second server to block a second proposed value associated with the first data record from a second electronic device.

In some aspects, the method further includes presenting, by the at least one processor, the first set of graphical components on the first electronic dashboard based on historical input data associated with a user of the first user device.

In some aspects, the one or more inputs includes a geographical location or a type of a unit associated with the first data record.

In some aspects, the method further includes displaying, by the at least one processor, a second electronic dashboard on an administrator device upon execution of the web application on the administrator device.

In some aspects, the method further includes presenting, by the at least one processor, on the second electronic dashboard a status of a corresponding data record associated with a second set of graphical components, in response to an interaction with any corresponding first set of graphical components.

In some aspects, the techniques described herein relate to a system including at least one processor configured to: display a first electronic dashboard on a first user device of one or more user devices upon execution of a web application on the first user device; in response to receiving one or more inputs from the first user device, present a first set of graphical components on the first electronic dashboard where each graphical component of the first set of graphical components represents a data record satisfying the one or more inputs and is configured to direct the first user device to an electronic page displaying at least one attribute of the data record; in response to receiving a selection of a first graphical component corresponding to a first data record and a first value at a time before a scheduled event of the first data record, generate an immutable executable file including: a dataset including at least one attribute of the first data record, the first value, and a computer-readable instruction configured to cause a computer to generate and submit a proposed value at the scheduled event associated with the first data record, the proposed value corresponding to any amount higher than proposed values from other digital participants at the scheduled event; store the immutable executable file in a system database and a copy of the immutable executable file on the first user device to avoid an unauthorized revision of the immutable executable file; and upon identifying the immutable executable file for the first data record at the scheduled event for the first data record, automatically execute the immutable executable file, such that the computer-readable instruction of the immutable executable file causes the at least one processor to: generate, in accordance with the computer-readable instruction within the immutable executable file, a proposed value for a associated with the first data record on behalf of the first user device, wherein the proposed value causes the data record to be automatically assigned to the first user device, and transmit the generated proposed value to a second server associated with the scheduled event, such that the immutable executable file causes the second server to automatically block other proposed values from other digital participants at the scheduled event.

In some aspects, the immutable executable file further causes the second server to terminate publishing, within at least one electronic page, data associated with the first data record.

In some aspects, the at least one processor is further configured to: instruct the second server to block a second proposed value associated with the first data record from a second electronic device.

In some aspects, the at least one processor is further configured to: present the first set of graphical components on the first electronic dashboard based on historical input data associated with a user of the first user device.

In some aspects, the one or more inputs includes a geographical location or a type of a unit associated with the first data record.

In some aspects, the at least one processor is further configured to: display a second electronic dashboard on an administrator device upon execution of the web application on the administrator device.

BRIEF DESCRIPTION OF THE DRAWINGS

Non-limiting embodiments of present disclosure are described by way of example with reference to accompanying figures, which are schematic and are not intended to be drawn to scale. Unless indicated as representing background art, the figures represent aspects of the present disclosure.

FIG. 4 illustrates a flow diagram of a method for presenting a plurality of electronic dashboards on a plurality of devices, according to an embodiment.

FIGS. 5-28 illustrate various graphical user interfaces presented by one or more servers described herein, according to an embodiment.

DETAILED DESCRIPTION

Figure 1A:
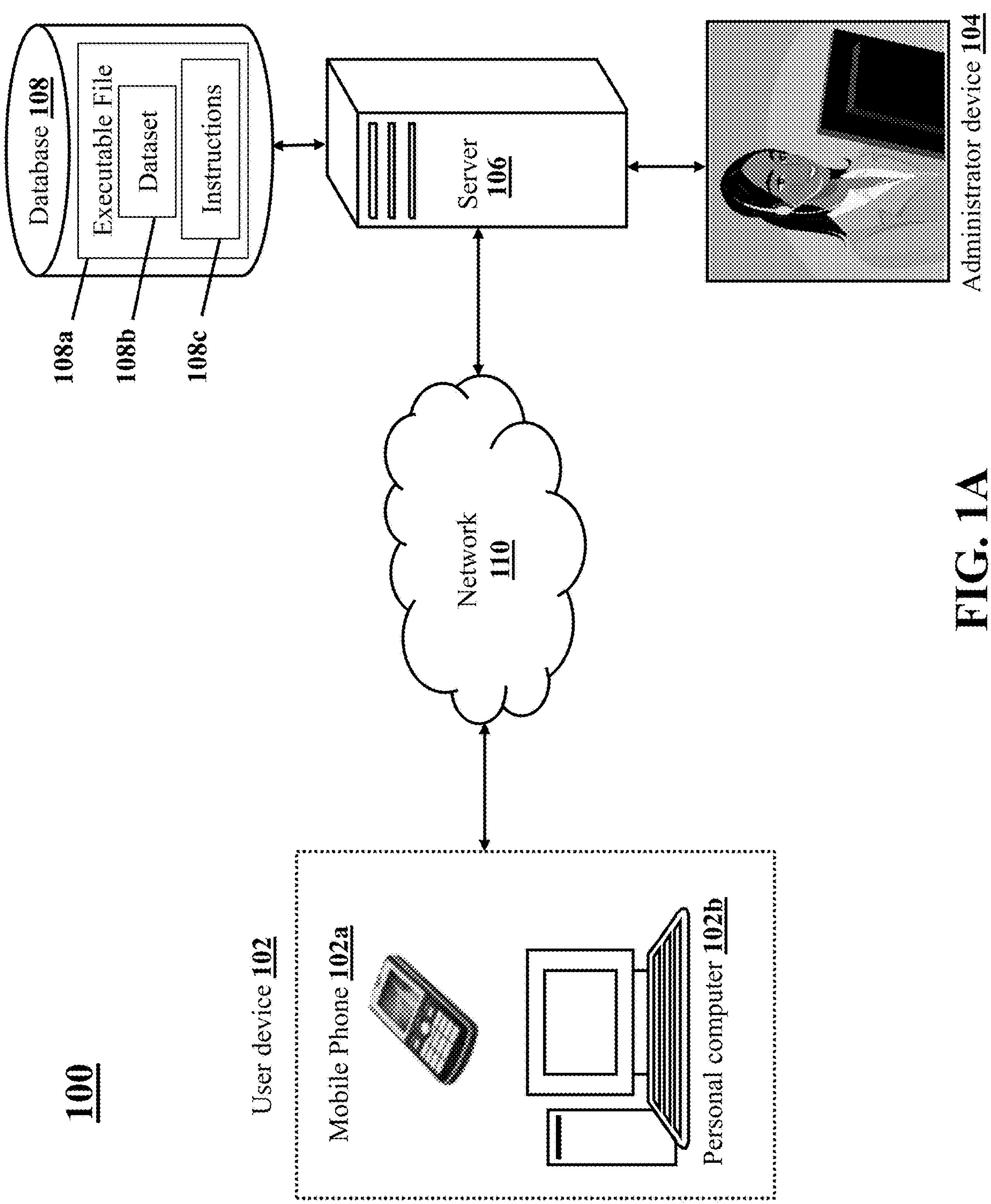
FIG. 1A illustrates an example of a system configured to present a plurality of electronic dashboards on a plurality of devices, according to an embodiment.

The present disclosure is here described in detail with reference to embodiments illustrated in the drawings, which form a part here. Other embodiments may be used and/or other changes may be made without departing from the spirit or scope of the present disclosure. The embodiments described in the detailed description are not meant to be limiting of the subject matter presented here.

Reference will now be made to the embodiments illustrated in the drawings, and specific language will be used herein to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein.

A server may manage and execute various modules of a web application, such as a cloud-based web application, which may be configured to display various data records associated with different real estate units, such as real estate properties and assets associated with poor-performing mortgages owned by a host party (i.e., a secured party). The web application may be customized for each end-user based on a role of an end-user. For instance, the web application may be configured to display a purchaser electronic dashboard on a user device of a user (for example, a potential purchaser/buyer) when the user device executes the web application. The web application may be configured to display an event electronic dashboard on a user device of a seller user when the seller device executes the web application. The web application may be configured to display an electronic dashboard on an administrator device of an administrator user when the administrator device executes the web application. The web application may transmit real time notifications and alerts to the user device and/or the administrator device when there is any update in a status of the data records associated with the poor-performing mortgages. The updates may include any data associated with the unit and/or the user behavior. For instance, the server (via the web application) may transmit an update to one or more users where the update/notification indicates a change in the unit (e.g., new image(s) uploaded, price changes, and/or bidding activity by other users). Non-limiting examples of notifications may include change in occupancy status, and the like.

The execution of the various modules and notification systems described herein, are designed to provide both real time and asynchronous interaction among all users (buyer, seller and admin) to achieve a successful network operation before the scheduled event (or immediately after the scheduled event but before title vests to the secured party) that would otherwise not be achievable. The various modules of the web application may include a purchaser electronic dashboard module, a seller electronic dashboard module, administrator module, and a notification module. As used herein, scheduled event may refer to any event in which a transfer of ownership takes place, such as a foreclosure event where an online digital platform is used to sell a unit. As used herein, a unit may refer to any unit, such as a real estate unit or any other item. Each of these modules is a software component or part of a program of the web application. Each of these modules may be incorporated into the program of the web application through interfaces. The combination of each of these modules form overall complete program of the web application. Each of these modules may serve a unique and separate function. The server may execute each of these modules to implement various functions of the web application.

The purchaser electronic dashboard module may be connected to a database. The purchaser electronic dashboard associated with the purchaser electronic dashboard module may be presented on the user device via the web application when the server executes the purchaser electronic dashboard module of the web application. The database may store all pre-registration information provided by users along with their historical bid data. All this information may be accessible to the administrator to enhance user experience and manage user access on the web application. For instance, the server may customize information on the purchaser electronic dashboard associated with the web application for each user based on the pre-registration information and the historical bid data of each user. The server may also customize different electronic dashboards based on historical site visits and user activity/preferences.

The user may have access to the purchaser electronic dashboard to view a description of each unit and mortgage information associated with each unit presented based on the pre-registration information and the historical bid data of the user. The purchaser electronic dashboard may also display a “buy now” button and a “bidding” button associated with each unit. The user may interact with and select the “buy now” button or the “bidding” button associated with any unit prior to a start of an actual scheduled event or digital auction (may be referred to herein as an “event”) associated with the unit.

When the user selects a “buy now” button associated with a first unit presented on the purchaser electronic dashboard, the server may execute instructions, which may guarantee that the user may own the first unit at agreed-upon price (for example, a buy now price) once an actual scheduled event of the first unit is completed. For instance, in operation, when the server may receive a confirmation that the user has placed a “buy now” offer using the “buy now” button associated with the first unit, the server may generate a binding forward executable instruction between the secured party and the user. The binding forward executable instruction may ensure that, at the time of the scheduled event, the server may automatically credit bid (or total debt bid) associated with the first unit up to a maximum legal balance on the mortgage associated with the first unit, such that the first unit may revert to the secured party. The server may automate this process, such that minimal human interaction is needed. For instance, the server may automatically cause a processor/computer to submit a bid (enter credit bid) at a predetermined time.

Accordingly, when the user selects the "buy now" button associated with the first unit, the server may generate and transmit a purchase record of the first unit to the user device with all junior liens extinguished at a conclusion of the actual scheduled event associated with the first unit, provided that total debt bid of the secured party prevails.

When the user selects the "bidding" button associated with the first unit presented on the purchaser electronic dashboard, the server may display the first unit on the purchaser electronic dashboard with an established opening bid and a specified time period for the user to submit incremental bids (for example, of at least $100). When the specified bidding time period concludes for the first unit, the server may determine a winning bidder (for example, the user with the highest bid). The server may generate the binding forward executable instruction between the secured party and the user. Accordingly, at the actual scheduled event associated with the first unit, the server may generate and place a total debt bid on behalf of the secured party, ensuring that a title record of the first unit may revert to the secured party. The secured party may transfer the title record of the first unit to the user for the winning bid amount upon receipt of funds associated with the purchase of the first unit. In some other configurations, the server may notify or instruct a third party to accomplish this task.

The unit electronic dashboard module may be connected to the database. The unit electronic dashboard associated with the unit electronic dashboard module may be presented on the administrator device via the web application when the server executes the unit electronic dashboard module of the web application. The database may store all watch lists, offers, and bidding activities from all users associated with each unit presented in the web application. The database may also store user page views and site usage activity by different users. The server may then analyze the data stored to customize one or more features of the electronic dashboards described herein. For instance, the server may use historical data and user activity to recommend new units for a particular user. In another example, the server may use this data to increase the number/rate of successful network operations before or immediately following the scheduled event for both buyer and seller.

The unit electronic dashboard may display all the watch lists, the offers, user page views for individual units, and the bidding activities from all the users associated with each unit. The unit electronic dashboard may further include one or more features, which may be used by the administrator to generate and transmit notifications associated with status of different units to the user device. Non-limiting examples of these features may include saved searches, watch lists, status changes, user views, offers, bids, and the like. The server may use this data to generate various notifications (and improve outcomes for both buyers and sellers).

The server may update the unit electronic dashboard in real time in accordance with various user activities and interactions (for example, received bids for one or more units) on the web application.

The notification module may be associated with the unit electronic dashboard module and/or the purchaser electronic dashboard module. The notification module may be connected to the database. The database may store information associated with a user profile of the user. The user profile may include attributes, such as preferred unit characteristics of the user and geographic preferences of the user. The user profile may also include one or more specific units on the watch lists of the user. When new units are uploaded in the database associated with the web application, and some of these new units may match some of the attributes in the user profile, the server may generate and transmit a real time alert or notification to the user via an electronic mailing method (e.g., email, SMS, MMS, and/or push notifications). The real time alert or notification may include the information associated with all the new units that may be associated with some of the attributes in the user profile. Also, when the user is actively watching or bidding on some of the units mentioned on the web application, the server may transmit the alert or notification in real time to the user updating subsequent status or bid changes or bid updates on the units.

FIG. 1A illustrates an example of a system 100 operated by a company. Non-limiting examples of the company may include a real estate professional services company. The system 100 may include various electronic and computing devices, such as a user device 102, an administrator device 104, a server 106, and a database 108. The user device 102 may be a mobile phone 102*a*. The user device 102 may be a personal computer 102*b*.

Even though aspects of the embodiments described herein discuss bidding on units such as real estate properties, it is expressly understood that the methods/systems described herein apply to bidding on the recorded judgment prior to the scheduled event, bidding on the real estate after the scheduled event but before title records in the noteholder's name (second chance), and/or bidding of the fee simple estate in the unit (REO properties) as well. Generally, the methods and systems described herein apply to bidding on real estate prior to the scheduled event contingent upon a successful secured party bid.

The system 100 may be described in a context of computer-executable instructions, such as program modules, being executed by server computers, such as the server 106. The server 106 may operate various software programs and applications, such as a web application. The administrator device 104 may install and execute the web application. The web application may include a first set of programs, modules, objects, components, data structures, etc., which may perform particular administrator-related tasks. The user device 102 may install and execute the web application. The web application may include a second set of programs, modules, objects, components, data structures, etc., which may perform particular user related tasks. The features of the system 100 may be practiced either in a single computing device, or in a distributed computing environment, where various tasks may be performed by processing devices, which are linked through a network 110. In the distributed computing environment, the various program modules may be located in both local and remote computer storage media including memory storage devices.

The user device 102, the administrator device 104, the server 106, the database 108, and various other devices of the system 100 may communicate with each other over the network 110. The network 110 may include, but is not limited to, a private or public local area network, a wireless local area network, a metropolitan area network, a wide-area network, and Internet. The network 110 may further include both wired and wireless communications according to one or more standards via one or more transport mediums. The communication over the network 110 is in accordance with various communication protocols, such as transmission control protocol, internet protocol, user datagram protocol, and institute of electrical and electronics engineers (IEEE) communication protocols. The network 110 may further include wireless communications according to Bluetooth specification sets, or another standard or proprietary wireless communication protocol. The network 110 may further include communications over a cellular network, including, for example, a global system for mobile communications, code division multiple access, and enhanced data for global evolution network. The network 110 may further include hardware devices (e.g., routers, switches, firewalls) and software components configured to relay data communications between different computing devices and applications associated with the system 100.

The system 100 may operate in a local computing environment where the user device 102 and the administrator device 104 may generate and execute various tasks using the web application. A first task may be associated with an online purchase of a mortgage of a unit on the web application prior to an actual scheduled event of the unit. A second task may be associated with an online bidding of the mortgage of the unit on the web application prior to the actual scheduled event of the unit. A third task may be associated with the online bidding of the recorded judgment of the unit prior to the scheduled event. A fourth task may be associated with online bidding of the unit after the scheduled event but before title has recorded in the noteholder's name. Additionally, a fifth task may be associated with the online bidding of the fee interest in the unit (REO).

The database 108 and application programs associated with the web application managed by the server 106 may be stored and executed on local computing resources. In response to receiving a request from the user device 102 and/or the administrator device 104, the server 106 may locally query the database 108 to retrieve data records, such as unit records and user data records. The data record may belong to multiple categories, such as data associated with the user, bids, events (e.g., auctions), page views, and assets.

Non-limiting examples of user data records and attributes monitored/stored by the server 106 may include personal information (e.g., demographic data and address), username, password, status, verified email information bidder approved, credit score/rating, number of network operations in the last three years, number of rental units owned, criminal background pending/previous bankruptcies, pending/previous judgments, lawsuits involved, previous foreclosed units, delinquency, citizenship, admin notes, last login, assigned user, lead source, point of contact, login count, user cookies, verification date, and consigner information.

Non-limiting examples of unit data may include data associated with platform ID, property ID, listing status, address, year built, property information (e.g., number of bedrooms, bathrooms, square footage, garage, lot size, description, pool), flood zone, occupancy status, rental status, property type, ownership, buy now price, bid start price, event date, list price, bid increment, available images, occupancy data, consigner, and minimum start price override.

Non-limiting examples of bid information may include user ID, date, property ID, bid received, username, event ID, and role. Non-limiting event data may include user ID, property ID, start date, end date, start bid, reserve price, bid increment, buy now price, buy now offer, status, setup notification, start notification, ending notification, notified winner, notify buy now, cancelled event notification, winner, winning bid, bid count, process winner, and process order.

The database 112 may store a summary of the unit records. The summary of the unit records may be according to an identifier associated with each unit. The server 106 may present the unit records on an interactive graphical user interface of the user device 102 and/or the administrator device 104. The server 106 may analyze and update the unit records based on inputs, such as buying and bidding activities of various users. The server 106 may present an updated version of the unit records on the interactive graphical user interface of the user device 102 and/or the administrator device 104.

The system 100 may operate in a cloud-computing environment where the user device 102 and/or the administrator device 104 may be cloud-optimized. The user device 102 and/or the administrator device 104 may execute the web application to generate and execute various tasks. The first task may be associated with the online buying of the mortgage of the unit on the web application prior to the actual scheduled event associated with a data record. The second task may be associated with the online bidding of the mortgage of the unit on the web application prior to the actual scheduled event associated with a data record. The web application, the user device 102 data and application programs, and the administrator device 104 data and application programs may be stored and executed on a remote cloud-based server 106 accessed over a network cloud. In the cloud-computing environment, a web browser on the user device 102 and/or the administrator device 104 may interface with an application program corresponding to the web application. The remote cloud-based server 106 may access and execute the web application via the web browser. Utilizing the web application, the user device 102 may generate a request for buying or bidding a particular unit. The user device 102 may transmit the request to the remote cloud-based server 106 via the application program. The remote cloud-based server 106 may process the request, transmit the request to the administrator device 104, and take subsequent actions to execute the tasks associated with the request based on an input from the administrator device 104.

A user device 102 is a computing device including a processing unit. The processing unit may include a processor with a computer-readable medium, such as a random access memory coupled to the processor. The user device 102 may be running algorithms or computer executable program instructions, which may be executed by a single processor or multiple processors in a distributed configuration. The user device 102 may interact with one or more software modules of a same or a different type operating within the system 100.

Non-limiting examples of the processor may include a microprocessor, an application specific integrated circuit, and a field programmable object array, among others. Non-limiting examples of the user device 102 may include the mobile phone **102*a* (e.g., a smartphone, PDA) and the personal computer 102*b* (e.g., a tablet device). The user device 102 may be operated by the user. The user may refer an individual interacting with the web application, such as a cloud-based web application to buy or bid for the mortgage (also judgment, post foreclosure, and/or pre title recording or fee simple interest) associated with the unit. For ease of explanation, the FIG. 1A shows a single computing device functioning as the user device 102**. However, some embodiments may include a plurality of computing devices capable of performing tasks described herein.

The user device 102 may include one or more input devices and one or more output devices. The input devices and the output devices may be configured to allow the user interaction with one or more programs on the user device 102 to communicate with the administrator device 104 via the server 106. The one or more programs may include a client-side web application from which the user may transmit information and requests to the administrator device 104 via the server 106. The web application may be a cloud-based web application. The web application may be a cloud-based web platform. The web application may be a software stack running on an operating system of the user device 102. The web application may have a protocol layer and a user interface layer where each layer may be responsible for specific functions. The protocol layer of the web application may communicate with the operating system of the user device 102 and manages various connections of the user device 102 over the network 110. The protocol layer may communicate with the user interface layer. The protocol layer may be arranged to control the user interface layer, and to present information to the user via a user interface of the web application and to receive information from the user via the user interface of the web application.

In order to access the web application on the user device 102, the user device 102 may transmit web application credentials of the user via user inputs to the server 106, from which the server 106 may validate the user. The user device 102 may include a number of input devices (e.g., a keyboard, a touchscreen, and a stylus) to receive the user inputs, including various types of web application credentials and data inputs allowing for validation, e.g., username, passwords, certificates, biometrics. When the server 106 validates the user based on processing of the web application credentials, the user may have access to various features of the web application running on the user device 102. The user device 102 may access the features of the web application to generate a request via the web application. The features of the web application may include multiple buttons associated with the web application. The user device 102 may transmit the request to the administrator device 104 via the server 106. The request may be for buying the mortgage or recorded judgment of the unit prior to or during the scheduled event associated with a data record. The request may be for bidding on the mortgage or recorded judgment of the unit prior to or during the scheduled event associated with a data record. The request may be for buying the fee simple title of the unit after the scheduled event.

The user device 102 may include an interactive graphical user interface on which the user may interact with the electronic dashboard of the web application by means of the input device. The interactive graphical user interface via the electronic dashboard of the web application may present notifications to the user, which is received from the server 106 or the administrator device 104. The electronic dashboard of the web application may also display a subset of graphical components from a plurality of graphical components. The plurality of graphical components may correspond to a plurality of units. The subset of graphical components may be selected from the plurality of graphical components for display on the electronic dashboard of the web application based on one or more user input preferences included in the user profile stored in the database 108. The one or more user input preferences may include a geographical location, a size, a configuration (for example, number of bedrooms, bathrooms, parking spaces, etc.), a price range, a type of unit (for example, apartments, houses, condos, townhomes, etc.), and amenities (for example, air conditioning, in unit washer and dryer, washer & dryer hookups, dishwasher, wheelchair access, parking, laundry facilities, fitness center, pool, elevator, dog friendly, cat friendly, furnished, etc.).

The subset of graphical components that may be selected from the plurality of graphical components for display on the electronic dashboard of the web application may correspond to a subset of units, which may have a scheduled event scheduled within a predetermined time period (for example, 30 days). These units may be offered for pre-sale to the user of the user device 102 via a forward purchase agreement which, pending successful event, may allow the user of the user device 102 to secure a future purchase of these units at a set price, and such future purchase of these units may be financed by the administrator of the administrator device 104 so the user of the user device 102 may only be required to provide a predetermined percentage deposit (for example, 5% deposit) at the time of the event.

The user device 102 may electronically interact with the subset of graphical components displayed on the electronic dashboard of the web application using the input device. The user device 102 may select a first graphical component from the subset of graphical components displayed on the electronic dashboard of the web application using the input device. The first graphical component may correspond to a first unit. The first graphical component may be associated with one or more sub-graphical components and a plurality of interactive icons or buttons. Upon selection of the first graphical component, the one or more sub-graphical components and the plurality of interactive icons or buttons may be presented on the electronic dashboard of the web application. In some embodiments, the one or more sub-graphical components and the plurality of interactive icons or buttons may always be displayed on the electronic dashboard of the web application along with the first graphical component. The one or more sub-graphical components and the plurality of interactive icons or buttons may be presented adjacent to the first graphical component on the electronic dashboard of the web application.

The one or more sub-graphical components may include a first sub-graphical component, a second sub-graphical component, a third sub-graphical component, etc. The first sub-graphical component may correspond to a description section associated with the first unit. The description section associated with the first unit may include a size of first unit, a location of first unit, a type of first unit, interior pictures of first unit, exterior pictures of first unit, inspection reports of first unit, recorded documents of first unit, occupancy information such as agreements to vacate/consent to foreclosure, leases, etc. of first unit, original title reports of first unit, valuation reports of the first unit, and an updated lien search of first unit. The second sub-graphical component may correspond to a price section corresponding to the first unit. The price section corresponding to the first unit may include a price range for buying the first unit and a current bid (e.g., minimum event bid, buy now price, and minimum non-event offer). The price section associated with the first unit may include a total cost of a mortgage or recorded judgment associated with the first unit. The third sub-graphical component may correspond to a status section corresponding to the first unit. The status section corresponding to the unit may include a date of the event of the first data record (unit) and a number of users interested in buying the first unit. The status may also include whether reserve price has met or not met; and time remaining on the pre-event event. The status section corresponding to the first unit may further include a link to real-time data including closed sales and bids associated with the first unit.

The plurality of interactive icons or buttons may include a first button and a second button. The first button may be a buy now button. The user device 102 may interact with the first button and select the first button to request to buy the first unit prior to the actual scheduled event. The user device 102 may interact with the first button and select the first button to request to buy the first unit during the actual event associated with the first data record. The second button may be a bidding button. The user device 102 may interact with the second button and select the second button to place a bid for the first unit prior to the scheduled event of the first unit. The user device 102 may interact with the second button and select the second button to place the bid for the first unit during the actual scheduled event of the first unit.

A server 106 is a computing device. The server 106 may include a processing unit and a non-transitory machine-readable storage medium. The processing unit may include a processor with a computer-readable medium, such as a random access memory coupled to the processor. The server 106 may be executing algorithms or computer executable program instructions, which may be executed by a single processor or multiple processors in a distributed configuration. The server 106 may be configured to interact with one or more software modules of a same or a different type operating within the system 100.

Non-limiting examples of the processor may include a microprocessor, an application specific integrated circuit, and a field programmable object array, among others. The server 106 is capable of executing various call management and authentication tasks. Non-limiting examples of the server 106 may include a desktop computer, a server computer, a laptop computer, a tablet computer, and the like. For ease of explanation, the FIG. 1A shows a single server computing device functioning as the server 106. However, some embodiments may include a plurality of server computing devices capable of performing the call management and authentication tasks described herein.

The server 106 may be coupled to the user device 102, the database 108, and the administrator device 104 via the network 110. When a web connection is established between various devices of the system 100, the server 106 is able to receive data from the database 108 as well as any information from the user device 102 and the administrator device 104. At the same time, the server 106 is able to transmit the data to the user device 102 and the administrator device 104. The administrator device 104 may receive the data from the server 106 via the web application running on the administrator device 104. The user device 102 may receive the data from the server 106 via the web application running on the user device 102. The data may include requests, notifications, and messages.

The server 106 may execute one or more authentication algorithms to generate one or more authentication questions for verification of an identity of the user prior to allowing the user access to the web application during the web connection. The authentication questions may be questions related to sensitive information of the user. The sensitive information may include a passport number and a social security number of the user. In some embodiments, the authentication questions may be questions related to non-sensitive information of the user. The non-sensitive information may include fathers name, mother's name, year of birth, etc.

The server 106 may generate a record of the one or more authentication questions selected for performing the authentication of the user. The server 106 may store the record of the one or more authentication questions selected for performing the authentication of the user in the database 108. The server 106 may transmit the one or more authentication questions selected for performing the authentication of the user to the administrator device 104. The administrator device 104 may transmit the one or more authentication questions to the user device 102. In some embodiments, the server 106 may transmit the one or more authentication questions selected for performing the authentication of the user to the user device 102 via the administrator device 104.

The server 106 may receive answers for the one or more authentication questions from the user device 102. In some embodiments, the server 106 may receive the answers for the one or more authentication questions obtained from the user device 102 via the administrator device 104. After receiving the answers, the server 106 may match the answers provided by the user for the one or more authentication questions with answers to a same set of one or more authentication questions previously provided by the user, which are presently stored in the database 108. The server 106 upon determining that current answers provided by the user for the one or more authentication questions matches with the previously provided and verified answers by the user for the same set of one or more authentication questions, the server 106 may authenticate the user and the user may be able to access all features of the web application. The server 106 may present a result of the authentication of the user on the graphical user interface of the administrator device 104.

When the server 106 determines that the current answers provided by the user for the one or more authentication questions does not match with the previously provided and verified answers by the user for the same set of one or more authentication questions, the server 106 may generate and transmit one or more secondary authentication questions to the user device 102. When the user provides a correct answer for each of the one or more secondary authentication questions, the server 106 may authenticate the user and the user may be able to access all features of the web application.

The server 106 may receive a data record directly from the user device 102 when the user is accessing the web application. In another embodiment, the server 106 may generate and execute a request to obtain the data record from the user device 102 when the user is accessing the web application. The data record may include a unique identification number of the user using the user device 102, among other information associated with the user device 102, such as the unique device identifier associated with the user device 102. The server 106 may store the data record received from the user device 102 in the database 108. The unique identification number of the user using the user device 102 may be a social security number of the user. The unique device identifier associated with the user device 102 may be a unique device identification number of the user device 102. The unique device identifier associated with the user device 102 may be a model number of the user device 102. The unique device identifier associated with the user device 102 may be a serial number of the user device 102. The unique device identifier associated with the user device 102 may be IMEI number of the user device 102. The unique device identifier associated with the user device 102 may be an account number of the user. The unique device identifier associated with the user device 102 may be an email address of the user.

The server 106 may retrieve a user profile of the user operating the user device 102 from the database 108 using the unique identification number and/or the unique device identifier. The user profile may include information associated with the user, such as a name of the user, an age of the user, a gender of the user, insurance policies owned of the user, bank accounts of the user, network operation records of the user, hobbies of the user, personal interests of the user, an occupation of the user, verification preferences of the user for different locations, social networking accounts of the user, and the one or more user input preferences. The user input preferences may include a preference for the geographical location of a unit, the size of the unit, the price range of the unit, the type of the unit, and the amenities associated with the unit. The user input preferences may also include the occupancy status of the unit, and ownership status.

The server 106 may determine browsing history of the user on the user device 102 for a predetermined period of time using the web application running on the user device 102. The server 106 may also determine the browsing history of the user on one or more computing devices, which are wired or wirelessly linked to the user device 102 for the predetermined period of time. The server 106 may transmit instructions to a webserver to determine and transmit the browsing history of the user on the user device 102 and other computing devices for the predetermined period of time. The webserver may determine a list of websites, such as real estate websites being accessed by the user on the user device 102 and other computing devices over the predetermined period of time. The webserver may further determine a list of units being searched by the user on various websites over the predetermined period of time. The webserver may further determine a list of articles being read by the user on various websites over the predetermined period of time. The webserver may process the information associated with the list of the units, the list of the articles, and the list of the websites to generate a research history report corresponding to the user. The webserver may transmit the research history report to the server 106. The server 106 may update the user profile of the user and the one or more user input preferences to include insights from the research history report of the user. The server 106 may store updated user profile in the database 108.

The server 106 may present the electronic dashboard of the web application on the user device 102 of the user when the user uses the web application. The information within the electronic dashboard may be personalized based on the updated and current user profile of the user. The information within the electronic dashboard may include the subset of graphical components, which may be selected from the plurality of graphical components based on the updated and current user profile of the user and/or based on the user's page view history on the platform. Each of the subset of graphical components may correspond to a unit.

Each of the subset of graphical components (for example, the first graphical component corresponding to the first unit) may be associated with the one or more sub-graphical components and the plurality of interactive icons or buttons. The one or more sub-graphical components and the plurality of interactive icons or buttons may be presented adjacent to the first graphical component on the electronic dashboard of the web application. The one or more sub-graphical components may include the first sub-graphical component corresponding to the description section associated with the first unit, the second sub-graphical component corresponding to the price section associated with the first unit, and the third sub-graphical component corresponding to the status section associated with the first unit. The plurality of interactive icons or buttons may include the buy now button and the bidding button.

The server 106 may generate and execute one or more instructions associated with the scheduled event of the first unit on receiving a signal that the user device 102 has electronically interacted with the buy now button and/or the bidding button associated with the first graphical component on the electronic dashboard of the web application.

When the user device 102 may interact with and select the buy now button associated with the first graphical component on the electronic dashboard of the web application, the server 106 may receive an electronic message confirming that the user has placed a buy now offer associated with the first unit. On receiving the electronic message, the server 106 may generate and execute a first instruction, which may guarantee that upon successful actual scheduled event, the user may be able to purchase the first unit at an agreed-upon price (for example, a price of the first unit at the time of the selection of the buy now button). The server 106 may generate and transmit a second instruction to the user device 102 to collect a deposit amount associated with the agreed-upon price. The deposit amount may be a predetermined percentage (for example, five percent) of the agreed-upon price. On receiving the second instruction, the user device 102 may transmit the deposit amount to the server 106. The server 106 may receive the deposit amount from the user device 102. On receiving the deposit amount, the server 106 may generate a dataset corresponding to a binding forward executable instruction.

The binding forward executable instruction may be associated with the scheduled event. The binding forward executable instruction may indicate that at a time of the actual scheduled event, the server 106 may automatically generate and submit a winning bid to purchase the first unit on behalf of the user of the user device 102. The winning bid may have the price, which may be same as the agreed-upon price. The winning bid may have the price, which may be more than the agreed-upon price. The winning bid may have the price, which may be less than the agreed-upon price. Upon successful submission of the winning bid, the first unit may be successfully purchased and a purchase record of the first unit is transmitted to the user device 102. In some embodiments, the server 106 may generate and submit the winning bid in accordance with some rules of a set of rules within the dataset. A first rule of the set of rules may specify that the server 106 may generate and credit the bid of the first unit at the time of the scheduled event up to a maximum legal amount on the mortgage associated with the first unit. This process may be automated for the server where the server can notify the third party directly in the process after a virtual network operation is facilitated.

A second rule of the set of rules may specify that if the actual scheduled event is not conducted, the server 106 may transmit the deposit amount back to the user device 102.

When the user device 102 may interact with and select the bidding button associated with the first graphical component on the electronic dashboard of the web application, the server 106 may receive an electronic message confirming that the user has placed a bidding offer associated with the first unit. On receiving the electronic message, the server 106 may generate an electronic bidding session for the user to submit incremental bids associated with the scheduled event. The electronic bidding session may be active for a predetermined time period. During the predetermined time period, the server 106 may receive bids associated with the scheduled event from multiple users. After conclusion of the predetermined time period associated with the electronic bidding session, the server 106 may compare value of all the bids received from different users and select the user with a highest bid. The highest bid may have a maximum value among all the bids.

Upon selection of the user with the highest bid, the server 106 may generate and execute the first instruction, which may guarantee that upon successful actual scheduled event, the user may be able to purchase the first unit at the agreed-upon price. The server 106 may generate and transmit the second instruction to the user device 102 to collect the deposit amount associated with the agreed-upon price (e.g., earnest money and/or a cancellation fee submitted by the potential buyer). On receiving the second instruction, the user device 102 may transmit the deposit amount to the server 106. The server 106 may receive the deposit amount from the user device 102. On receiving the deposit amount, the server 106 may generate the dataset corresponding to the binding forward executable instruction. The binding forward executable instruction may be associated with the actual scheduled event. The binding forward executable instruction may indicate that at the time of the actual scheduled event, the server 106 may automatically generate and submit the winning bid to purchase the first unit on behalf of the user of the user device 102. Upon successful submission of the winning bid, the first unit is successfully purchased and the purchase record of the first unit is transmitted to the user device 102.

An administrator device 104 may be a portable or a non-portable electronic device. The administrator device 104 may include one or more processors, which may be configured to perform one or more operations according to one or more programming instructions. The administrator device 104 may be capable of communicating with the server 106 and the user device 102 through the network 110 using the wired or wireless communication capabilities. Non-limiting examples of the administrator device 104 may include a computer (e.g., a mobile phone, a laptop, and a tablet).

The administrator device 104 may receive records of incoming requests transmitted from the user device 102 via the server 106. The records of the incoming requests may have one data field indicating a nature of the request (for example, buying or bidding request of a unit via the web application) and a second data field indicating a time-sensitive nature or a user-sensitive nature of the request (for example, a request to place the bid for the unit after a predetermined period of time). Based on the data fields associated with the records of the incoming requests, the administrator device 104 may receive the records of the incoming requests having subject matter or procedural data fields associated with respective administrator credentials. The server 106 may store the records of the incoming requests in a queue associated with the administrator.

The administrator device 104 may include one or more input and output devices, which may allow the administrator to accept and process the incoming requests received from the user device 102. The administrator device 104 may select a record associated with an incoming request from the queue that is assigned to the administrator, and then review underlying information associated with the record of the incoming request.

The administrator device 104 may include a communication interface on which the records of the incoming requests may be presented via the electronic dashboard of the web application. The communication interface may be integral with the administrator device 104. The communication interface may be communicatively coupled to the body of the administrator device 104. The communication interface may be communicatively coupled to the body of the administrator device 104 via the direct connection, for example through a cord associated with the body of the administrator device 104 connected to a plug of the communication interface. The communication interface may be communicatively coupled to the body of the administrator device 104 through wireless connection, such as Wi-Fi, Bluetooth, BLE, NFC, or other appropriate short-range communication.

The communication interface may include a display screen. The display screen may be a liquid crystal display, a plasma display, a light emitting diode display, an organic light-emitting diode display, an electronic paper display, or any other suitable type of display able to present digital content thereon. The display screen may include a touch sensor to provide a touchscreen display configured to receive touch inputs for enabling interaction with a user interface presented on the display screen.

The communication interface may present the records of the incoming requests via the electronic dashboard of the web application. The administrator device 104 may accept and process the incoming requests from the user device 102. The administrator may view the records of the incoming requests presented on the communication interface. Each record of the incoming requests may include, but not limited to, a user name, a user device number, a user identifier, a time of the request, a date of the request, an account history of the user, a name of a unit selected by the user on the web application, an application to buy the mortgage of the unit, and an application to bid for the event of the mortgage of the unit.

The communication interface may be configured for receiving an entry of an input from the administrator. For instance, the administrator may mark or tag the records of the incoming requests. In some embodiments, the server 106 may mark or tag the records of the incoming requests, and transmit the tagged records of the incoming requests to the administrator device 104. The server 106 may execute various data models, which may indicate that the records of the incoming requests should be tagged. The server 106 may automatically tag the records of the incoming requests when data fields in the records of the incoming requests match a threshold number of data fields of a given data model. In one embodiment, the tag may indicate that the user is very interested in a particular unit for purchase during a scheduled event.

A database 108 may communicate with the user device 102, the administrator device 104, and the server 106. The database 108 may be capable of storing information in a plain format and an encrypted version. In one embodiment, the database 108 may be in communication with a processor of the user device 102 where the processor is capable of executing the various commands of the system 100. The database 108 may be part of the user device 102. The database 108 may be a separate component in communication with the user device 102. In another embodiment, the database 108 may be in communication with a processor of the administrator device 104 where the processor is capable of executing the various commands of the system 100. The database 108 may be part of the administrator device 104. The database 108 may be a separate component in communication with the administrator device 104. In yet another embodiment, the database 108 may be in communication with a processor of the server 106 where the processor is capable of executing the various commands of the system 100. The database 108 may be part of the server 106. The database 108 may be a separate component in communication with the server 106.

The database 108 may store data records associated with various aspects of application services offered to the users. Non-limiting examples of what may be stored in the database 108 may include user records that may include data fields describing users, e.g., user data, such as user credentials (e.g., username, passwords, biometrics, encryption certificates), user profile, user account data, user roles, or user permissions; document records that may comprise machine-readable computer files (e.g., word processing files), parsed portions of such computer files, or metadata associated with computer files; and application data that may include software instructions or data used by various applications (for example, the web application). The database 108 may further store information associated with foreclosures and foreclosed units.

The database 108 may have a logical construct of data files, which may be stored in non-transitory machine-readable storage media, such as a hard disk or a memory, controlled by software modules of a database program (e.g., SQL), and a database management system that may execute the code modules (e.g., SQL scripts) for various data queries and management functions.

In operation, the server 106 generates multiple electronic dashboards/platforms that can be updated in real time. The first electronic dashboard (buyer's electronic dashboard/platform) may be displayed on the user device 102 displaying a series of units and events. The second electronic dashboard may be an administrator electronic dashboard/platform that is displayed on the administrator device 104. The server may update the electronic dashboards, such that each electronic dashboard is updated/revised in accordance with inputs received from the other electronic dashboard. In an example, the server 106 may display an event on the buyer's electronic dashboard displayed on the user device 102. When the user operating the user device 102 wins the event (or exercises the buy now option as described herein), the server 106 may generate the executable file 108*a* and may notify the system administrator device 104 by revising the second electronic dashboard.

The executable file 108*a* may include the dataset 108*b* that includes various attributes of the unit at issue (e.g., size, mortgage data, and location), event data (e.g., winning bid amount, bidding history, and timestamp), and/or user information (e.g., information associated with the winning bidder and data associated with the user device 102 or the user operating the user device 102). The executable file 108*a* may also include instructions 108*c* that cause the server 106 to generate a winning bid when the unit at issue is associated with a scheduled event. The instructions may also cause the server to monitor and identify whether the unit is foreclosed upon. When the server 106 identifies that the unit is foreclosed upon, the server generates a winning bid in accordance with the instructions 108*c* and updates the electronic dashboards accordingly. For instance, the server may enter the scheduled event (e.g., auction) associated with the unit (hosted on a different platform) and enter a winning bid (e.g., outbid other participants), such that the property title is transferred to the platform (e.g., the administrator or any other party associated with the platform) at the time of foreclosure. As described herein, the title will then be transferred (e.g., by the server or another party associated with the server) to the user operating the user device 102.

The instructions 108*c* may further cause money to be transferred among the parties described herein. For instance, the instructions 108*c* may cause the server 106, at the time of scheduled event, to automatically withdraw an amount associated with the user's winning bid (or buy now price) from the user's account and transfer such amount to the platform's account. The timing of the withdrawal may be revised based on any other timeframe agreed upon by the parties (e.g., user and the system administrator).

Figure 1B:
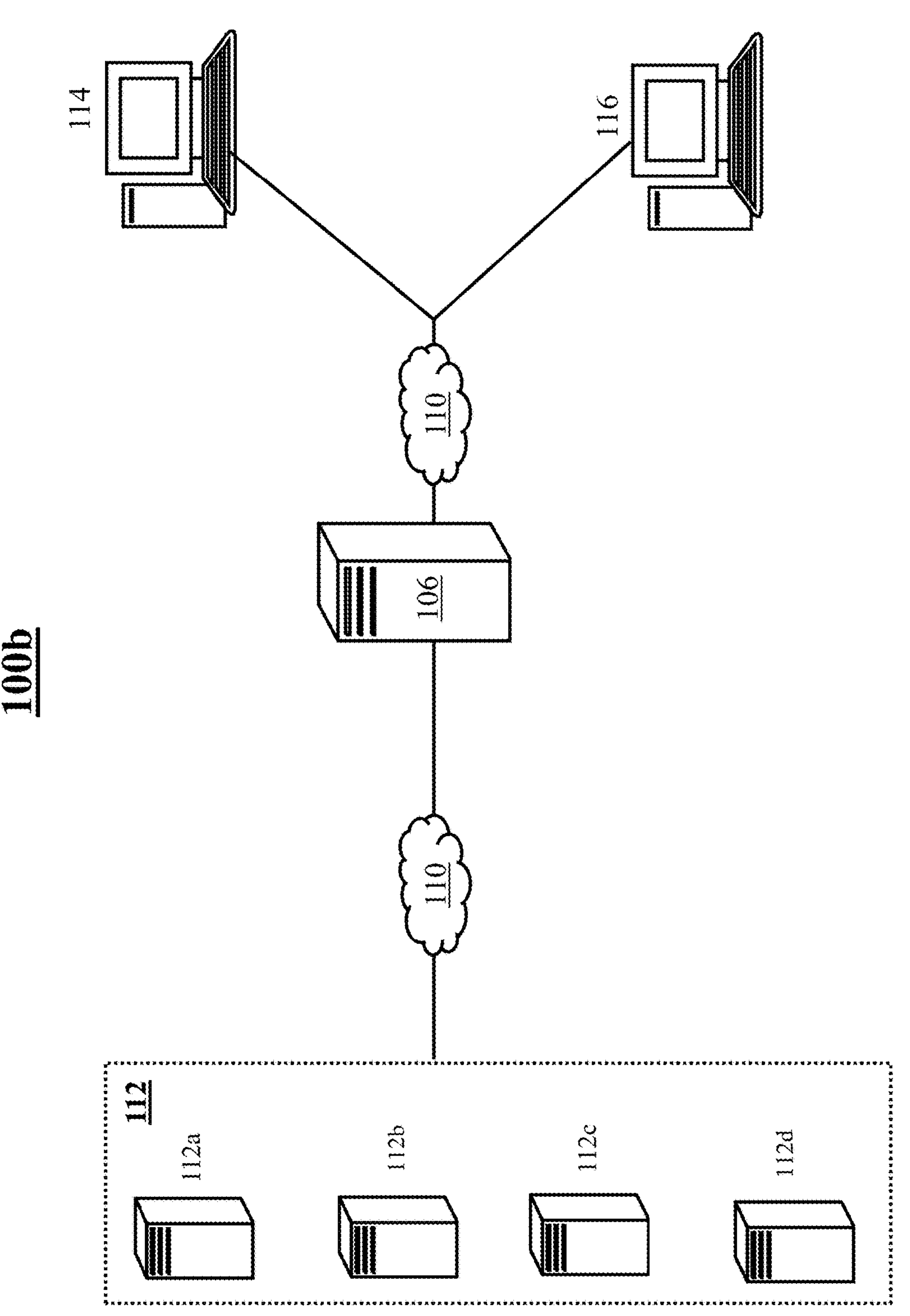
FIG. 1B illustrates an example of a system configured to present a plurality of electronic dashboards on a plurality of devices, according to an embodiment.

Referring now to FIG. 1B, the system 100*b* illustrates a non-limiting example of the server 106 communicating with third-party data repositories 112 to update the electronic dashboards/platforms described herein. As described above, the server 106 may display synchronized electronic dashboards on one or more computers having different (e.g., competing) interests. For instance, the server 106 may display a buyers' electronic dashboard, which is directed towards potential buyer end-users operating the computing device 114. The server 106 may also display a sellers' platform/electronic dashboard on the computing device 116. Because buyers and sellers have competing interests, the server 106 may customize each electronic dashboard, such that confidential and/or proprietary information is not displayed and co-mingled among electronic dashboards. For instance, as will be described below, the server 106 may not display event details on the buyers' platform because such details are confidential and may only be viewed by the seller or system administrator.

As described throughout, the server 106 may synchronously or asynchronously (e.g., in real time or in near real-time) update each electronic dashboard, such that the information presented on each electronic dashboard corresponds to the latest and most updated inputs received from various users. For instance, when a user operating the computing device 114 accesses the buyers' platform and submits an input (e.g., an unsolicited bid along with a message), the server 106 may update the sellers' platform accessed by a system administrator and/or a seller operating computing device 116, such that the buyer's bid/message is displayed. Additionally, as described herein, the server 106 may generate various notifications and alert different users accordingly. For instance, the server 106 may generate an alert each time a unit watch listed by a buyer is associated with a new update (e.g., new information is uploaded, bidding information is changed, and/or an event has received an offer).

In addition to generating the synchronized platform, the server 106 may also communicate with various external and/or third party data repositories 112. As a result, the server 106 may update one or both platforms accordingly. The server 106 may use various application programming interfaces (API) to connect with the data repositories 112, such that when new alerts/updates are available, the server 106 updates one or both of the platforms accordingly. For instance, the server 106 may use an API to identify whether the status of a unit has changed (e.g., from occupied to vacant or vice versa). The server 106 may then determine that the change of status may affect the net present value of the unit. As a result, the server 106 generates an alert to the computing device 116 and 114. The server may then retrieve data and may automatically populate one or more graphical indicators based on the new status of the unit. Accordingly, the server 106 may act as a central hub that can autonomously monitor data associated with various units and can further update one or both of the platforms.

In some embodiments, the data received from the data repositories 112 may be proprietary data. For instance, the server 106 may access proprietary libraries and data sets generated by the data repositories 112 and may update one or both of the platforms accordingly. In some configurations, the server 106 may not directly present the proprietary third-party data to the users. That is, the server 106 may only display portions of the proprietary data, such as by populating various graphical elements described herein.

The data repositories 112 may include various parties, which may or may not have competing interests. Therefore, the server 106 may execute one or more tenant isolation protocols to ensure that proprietary data from different data repositories are not co-mingled.

The data repositories 112 may include server 112*a*, which may correspond to a server associated with a mortgage facilitation company. For instance, after a buyer has placed a winning bid or has exercised the buy now option, the server 106 may transmit network operation data to the server 112*a*. The server 112*a* may analyze the network operation data and may display various purchase contract and mortgage related information to be consumed by the buyer and/or the seller. For instance, the server 106 may collect and transmit data associated with a network operation (e.g., winning amount, buyer's demographic data, and property information) to the server 112*a*. The server 106 may also direct the buyer, via the buyers' platform, to an application hosted or otherwise associated with the server 112*a*.

The server 112*a* may provide electronic documents for different parties to execute. For instance, the server 112*a* may transmit a secure document to different parties and ensure that different parties have reviewed and executed the documents. The "documents," as used herein refer to purchase-related documents for an acquisition loan.

The data repositories 112 may also include the server 112*b*, which may correspond to a server associated with a portfolio management and analytics system. The entity hosting the server 112*b* may be an affiliate of the server 106. The server 112*b* may house historical data of loan level outcomes and statuses, loan level analytics, and proprietary loss mitigation data including scheduled event results, costs/timelines, and REO remediation data. The data hosted or otherwise accessible to the server 112*b* may be utilized for automated pricing models described herein. For instance, the server 106 may query and retrieve loan related data associated with a unit and may pre-populate NPV calculators accordingly, such that the NPV calculator may provide more accurate results. The data retrieved from the server 112*b* may be utilized to assist sellers with an accurate determination of NPV and bidding envelopes.

The data contained in these analytical tools utilized by the server 112*b* may be pushed automatically to the server 106 (e.g., via an API). The server 106 may then display the data on the seller's platform. The server 106 may also execute one or more analytical models (using the data retrieved from the server 112*b* in conjunction with other data associated with the buyer and/or the seller) to calculate NPV and/or estimate profits associated with the unit's sale. Different users may use the result to determine bid levels and risks associated with specific collateral types, conditions, occupancy status, and geographic locations.

The data may also include the server 112*c* which may correspond to a server associated with a proprietary portfolio management and analytics system. The server 112*c* may provide access to loan and unit level data and documentation associated with current asset status. The server 112*c* may represent a primary repository for the property information, photos and documents that are pushed to the server 106 nightly via an API in communication with the server 106.

The data repositories 112 also include the server 112*d*, which may correspond to current MLS data combined with an interactive user interface enabling buyers and sellers to determine current unit values based on highly relevant and customized information. The server 106 may display an interactive link within one or more of the platforms described herein. When a user interacts with the interactive link, the server 106 may direct the user to an application hosted by the server 112*d* where the user can identify algorithmically-generated unit values and the user can perform customized valuation analyses using the data retrieved from the server 112*d*.

Figure 2:
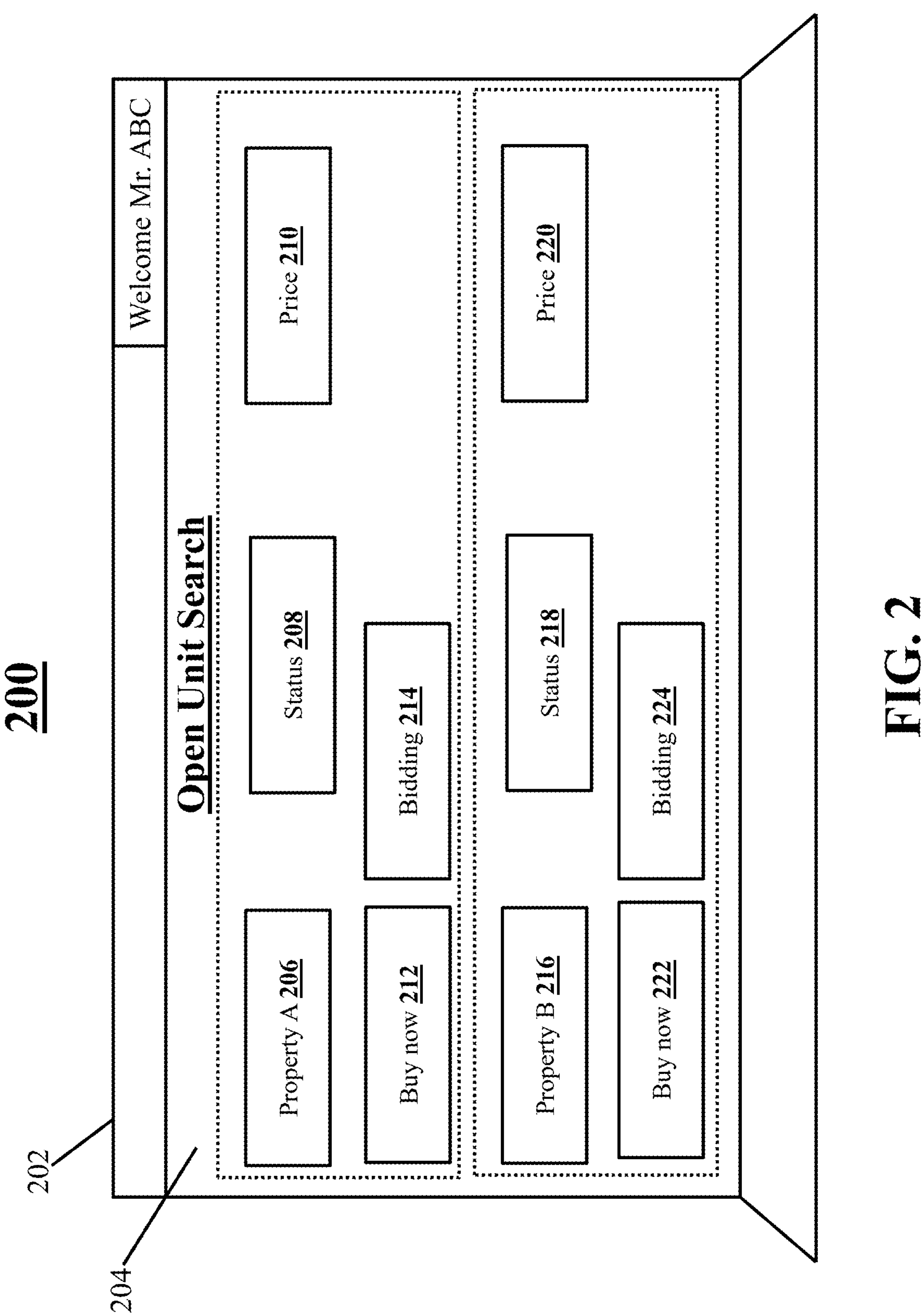
FIG. 2 illustrates an electronic dashboard of a user device, according to an embodiment.

FIG. 2 illustrates a user device 200 of a system. The user device 200 may be a portable or a non-portable device, such as a laptop, a personal computer, a smart phone, a smart watch, a personal digital assistant, or the like. The user device 200 may include a processor, which may perform one or more operations according to one or more programming instructions. The user device 200 may be capable of communicating with a server and an administrator device through a communications network using wired or wireless communication capabilities. The user device 200 is operated by a user (for example, Mr. ABC).

The user device 200 may have an interactive graphical user interface 202. The graphical user interface 202 may be a communication interface. The graphical user interface 202 may be a liquid crystal display, a plasma display, a light emitting diode display, an organic light-emitting diode display, an electronic paper display, or any other suitable type of display able to present digital content thereon. The graphical user interface 202 may include a touch sensor associated with the graphical user interface 202 to provide a touchscreen display configured to receive touch inputs for enabling interaction with information presented on the graphical user interface 202.

A cloud-based web application may be running on the user device 200. The user device 200 may have access to pre-stored web-based interfaces, such as webpages associated with the cloud-based web application including a number of preconfigured sub-interfaces or containers, which may be dynamically populated.

The user using the user device 200 may access the cloud-based web application by a common access method, e.g., keying in a URL, etc. In order to provide access to the cloud-based web application, the server managing the cloud-based web application may require user verification based upon a set of user credentials (e.g., username, password, biometrics, cryptographic certificate) from the user. Upon the submission of the set of user credentials from the user using the user device 200, the server may access a database configured to store the user credentials in order to determine whether a set of entered credentials from the user purportedly verifying the user match an appropriate set of credentials in the database that identify and verify the user. The server may generate and serve a electronic dashboard 204 associated with the cloud-based web application on the graphical user interface 202 of the user device 200, in response to successful verification of the user.

The electronic dashboard 204 associated with the cloud-based web application shown on the graphical user interface 202 of the user device 200 may present a specific set of graphical components based on information within a user profile of the user stored in the database. The information within the user profile may include pre-registration data along with historical bid information inputted by the user during signing up for the cloud-based web application. The information within the user profile may be used to enhance user experience and manage user access on the electronic dashboard 204 associated with the cloud-based web application. Each graphical component on the electronic dashboard 204 may represent a unit. The specific set of graphical components may include a first graphical component 206 and a second graphical component 216.

The first graphical component 206 may represent a property A. The first graphical component 206 may be associated with a first set of sub-graphical components. The first set of sub-graphical components may include a first sub-graphical component 208 and a second sub-graphical component 210. The first sub-graphical component 208 may represent a status of the property A. The status may include a geographical location of the property A, current bidders of the property A, etc. In some configurations, the server may provide more in depth status information, such as occupancy, foreclosure consents, vacate dates, which improves buyer confidence when bidding and leads to higher prices and improved network operation rates. The second sub-graphical component 210 may represent a price of the property A. The price may include a current cost of the property A. The first graphical component 206 may further be associated with a set of selectable buttons. The set of selectable buttons may include a first selectable button 212 and a second selectable button 214.

The first selectable button 212 may represent a buy now button. The buy now button may be selected by the user to buy the property A at the current price (or a suggested "buy now" price) prior to an actual scheduled event of the property A. When the user selects the first selectable button 212, a notification may be transmitted to the server and the administrator device regarding a buy request of the user. The second selectable button 214 may be a bidding button. The bidding button may be selected by the user to submit a bid for the property A prior to the scheduled event sale of the property A. The sale may occur after the actual scheduled event but before the certificate of title has recorded (second chance). When the user selects the second selectable button 214, a notification may be transmitted to the server and the administrator device regarding a bid request of the user. As will be described throughout, the platforms provided by the server may provide multiple bidding options for potential buyers including traditional bidding, reserve minimum bidding, and automatic bidding (e.g., bidding where the potential buyer can identify a maximum amount and the server automatically ensures to submit bids up to the maximum amount).

The second graphical component 216 may represent a property B. The second graphical component 216 may be associated with a second set of sub-graphical components. The second set of sub-graphical components may include a first sub-graphical component 218 and a second sub-graphical component 220. The first sub-graphical component 218 may represent a status of the property B. The status may include a geographical location of the property B, current bidders of the property B, and other features described above. The second sub-graphical component 220 may represent a price of the property B. The price may include a current cost of the property B. The second graphical component 216 may further be associated with a set of selectable buttons.

The set of selectable buttons may include a first selectable button 222 and a second selectable button 224. The first selectable button 222 may represent a buy now button. The buy now button may be selected by the user to buy the property B at the current price prior to the actual foreclosure sale of the property B. When the user selects the first selectable button 222, a notification may be transmitted to the server and the administrator device regarding a buy request of the user. The second selectable button 224 may be a bidding button. The bidding button may be selected by the user to submit a bid for the property B prior to the actual scheduled event of the property B. When the user selects the second selectable button 224, a notification may be transmitted to the server and the administrator device regarding a bid request of the user.

Figure 3:
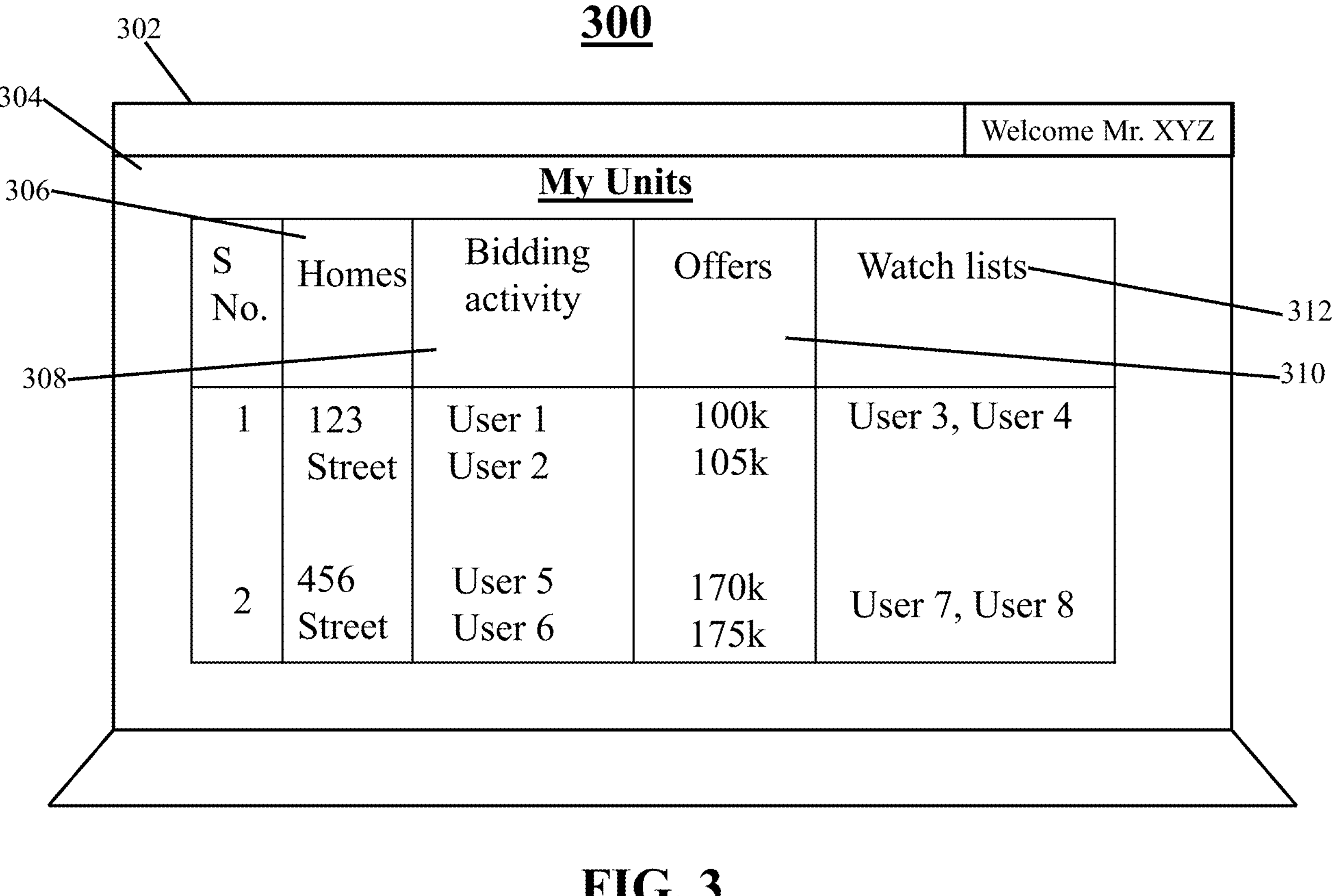
FIG. 3 illustrates an electronic dashboard of an administrator device, according to an embodiment

FIG. 3 illustrates an administrator device 300 of a system. The administrator device 300 may be a portable or a non-portable device, such as a laptop, a personal computer, a smart phone, a smart watch, a personal digital assistant, or the like. The administrator device 300 may include a processor, which may perform one or more operations according to one or more programming instructions. The administrator device 300 may be capable of communicating with a server and a user device through a communications network using wired or wireless communication capabilities. An administrator (for example, Mr. XYZ) may operate the administrator device 300.

The administrator device 300 may have an interactive and a dynamic graphical user interface 302. The graphical user interface 302 may be a communication interface. The graphical user interface 302 may be a liquid crystal display, a plasma display, a light emitting diode display, an organic light-emitting diode display, an electronic paper display, or any other suitable type of display able to present digital content thereon. The graphical user interface 302 may include a touch sensor associated with the graphical user interface 302 to provide a touchscreen display configured to receive touch inputs for enabling interaction with information presented on the graphical user interface 202.

A cloud-based web application may be running on the administrator device 300. The administrator device 300 may have access to pre-stored web-based interfaces, such as webpages associated with the cloud-based web application including a number of preconfigured sub-interfaces or containers, which may be dynamically populated.

The administrator using the administrator device 300 may access the cloud-based web application by a common access method, e.g., keying in a URL, etc. In order to provide access to the cloud-based web application, the server may require administrator verification based upon a set of administrator credentials (e.g., username, password, biometrics, cryptographic certificate) from the administrator. Upon the submission of the set of administrator credentials from the administrator using the administrator device 300, the server may access a database configured to store the administrator credentials in order to determine whether a set of entered credentials from the administrator purportedly verifying the administrator match an appropriate set of credentials in the database that identify and verify the administrator. The server may generate and serve a dynamic electronic dashboard 304 associated with the cloud-based web application on the graphical user interface 302, in response to successful verification of the administrator.

The electronic dashboard 304 associated with the cloud-based web application shown on the graphical user interface 302 may present multiple graphical components, which may be selectable. The graphical components may include a first graphical component 306, a second graphical component 308, a third graphical component 310, and a fourth graphical component 312, among others.

The first graphical component 306 may represent a list of homes (for example, units) available for purchase or bidding during a scheduled event within a predetermined time period (for example, 45 days). The second graphical component 308 may represent bidding activity for each unit within the list of units. The bidding activity may include names of all users participating in the bidding. Whenever the server may detect any change in information or status (for example, the bidding activity) associated with a particular unit within the list of units, the server may generate and transmit a notification to all the users that were participating in the bidding of the particular unit and the administrator.

The third graphical component 310 may represent all offers provided during the bidding activity for each unit within the list of units. The fourth graphical component 312 may represent names of all users in a watch list for purchase or bidding of each unit within the list of units. Whenever the server may detect any change in information or status (for example, the offers) associated with the particular unit within the list of units, the server may generate and transmit the notification to the administrator.

The administrator may interact with the multiple graphical components using an input device, such as, a pointer of the administrator device 300. When the user interacts with any of the multiple graphical components, multiple sub-interfaces may be displayed on the interactive graphical user interface 302. The multiple sub-interfaces may present detailed information associated with each topic represented by the multiple graphical components.

The dynamic electronic dashboard associated with the cloud-based web application displayed by the server on the graphical user interface 302 is not limited to the embodiments described herein. Some embodiments described herein describe a dynamic electronic dashboard having top and bottom portions. However, in other embodiments the server may generate three or more portions of the dynamic electronic dashboard where each portion is dynamically populated. Furthermore, instead of top or bottom portions, the server may use any other configuration (e.g., top half, bottom half, left and side sides, top ⅓ middle ⅓, and/or bottom ⅓). Furthermore, the administrator may customize the number of screen portions and/or sub-interfaces to be displayed on the graphical user interface 302. Therefore, the administrator may desire to have multiple sub-interfaces within a bottom portion and only one sub-interface within the top portion.

FIG. 4 shows execution steps for presenting a plurality of electronic dashboards on a plurality of devices, according to a method 400. The method 400 shown in the FIG. 4 may include execution steps 402, 404, 406, and 408. However, it should be appreciated that other embodiments may include additional or alternative execution steps, or may omit one or more steps altogether. It should also be appreciated that other embodiments may perform certain execution steps in a different order; steps may also be performed simultaneously or near-simultaneously with one another. In addition, the method 400 of the FIG. 4 is described as being executed by a server of a call center in this embodiment. The server executing one or more steps may be programmed to execute various other, unrelated essential features. The steps may also be executed by a plurality of server computing devices operating in a distributed computing environment.

In a first step 402, a user device being operated by a user may execute a cloud-based web application, which may be managed by a server. When the user device executes the cloud-based web application, the server may display a first electronic dashboard of a plurality of electronic dashboards associated with the cloud-based web application on the user device. The first electronic dashboard may be a first webpage of the cloud-based web application.

In a next step 404, the server may, in response to receiving one or more inputs from the first user device, present a first set of graphical components on the first electronic dashboard where each graphical component of the first set of graphical components represents a data record satisfying the one or more inputs and is configured to direct the first user device to an electronic page displaying at least one attribute of the data record.

In certain embodiments, the server is configured to present, via the web application, a first set of graphical components on a first electronic dashboard displayed by the first user device. The presentation of the first set of graphical components may be performed in response to receiving one or more search or filter inputs from the first user device. Each graphical component of the first set corresponds to a unique data record retrieved from one or more data repositories and satisfies the criteria defined by the received inputs. The graphical components may be implemented as interactive visual elements, such as icons, tiles, images, or textual panels, each of which is configured to direct the first user device to a corresponding electronic page or view. The electronic page associated with each graphical component displays at least one attribute of the data record, such as asset identifiers, descriptive parameters, status indicators, valuation data, transaction history, or other record-specific information stored in the system database. In some embodiments, interaction with a graphical component may be accomplished by user selection via touchscreen input, pointer device, or other interface mechanism, causing the web application to retrieve additional attribute data for presentation and enabling further actions by the first user, including initiating a transaction process, saving the record to a watch list, or requesting supplemental documentation.

In some embodiments, the receive one or more inputs from the user of the user device via the first webpage of the cloud-based web application. The server may present a first set of graphical components on the first electronic dashboard where each graphical component of the first set of graphical components represents a data record that may correspond to a unit (also referred to herein as "property") satisfying the one or more inputs and is configured to direct the first user to a display page displaying at least attribute of the data record. The one or more inputs may include one or more geographical locations, in response to receiving one or more inputs from a first user of the first user device. The one or more inputs may further include a preference for a size, a price range, a type of data record (e.g., apartments, houses) an occupancy status (occupied or vacant), an ownership status, a unit mix (bedroom/bathroom count), and amenities (for example, air conditioning, in unit washer and dryer, washer/dryer hookups, dishwasher, wheelchair access, parking, laundry facilities, fitness center, pool, elevator, dog friendly, cat friendly, furnished, etc.). Based on the one or more inputs and historical bidding data associated with the user, the server may filter and select a first set of units from multiple units.

The server may present a first set of graphical components on the first electronic dashboard. Each graphical component of the first set of graphical components may represent a data record satisfying the one or more inputs. Each graphical component of the first set of graphical components may be configured to direct the user to a new display page on the first electronic dashboard displaying one or more attributes of each selected data record. The one or more attributes of each data record may include a size, a price, and the like. Each graphical component of the first set of graphical components may further be associated with a plurality of buttons. The plurality of buttons may include a buy now button and a bidding button.

In a next step 406, the server may, in response to receiving one or more inputs from the first user device, present a first set of graphical components on the first electronic dashboard where each graphical component of the first set of graphical components represents a data record satisfying the one or more inputs and is configured to direct the first user device to an electronic page displaying at least one attribute of the data record.

In certain embodiments, the server is configured, in response to receiving from the first user device a selection of a first graphical component corresponding to a first data record and an associated first value, to generate an immutable executable file prior to a scheduled event related to the first data record. The immutable executable file may be created contemporaneously with the selected parameters and stored in a manner preventing subsequent modification, such as by cryptographically signing the file, storing a hash value, or using write-once memory. In some embodiments, the immutable executable file comprises a dataset that includes at least one attribute of the first data record, such as asset identifiers, descriptive details, status indicators, or valuation metrics, together with the first value provided by the user. The immutable executable file may further comprise one or more computer-readable instructions configured to cause a computing device to, upon occurrence of the scheduled event, generate and submit a proposed value for the first data record.

In certain embodiments, the computer-readable instruction may include logic for incrementally adjusting the proposed value so that it exceeds proposed values received from other digital participants in the event while remaining within predefined thresholds or limits. The instructions may be executable by the system server itself or transmitted to a secondary event-hosting server for autonomous execution. The generation process may also include embedding event metadata, such as scheduled time, event host information, and applicable rules, to ensure correct execution and compliance with the governing event protocols.

In a non-limiting example, the user device may interact with the electronic dashboard and may select a first graphical component from the first set of graphical components presented on the first electronic dashboard. The first graphical component may correspond to a first data record presented on the first electronic dashboard. The first data record may be associated with a first value (e.g., but now price). The server may receive a notification regarding the selection of the first graphical component from the user device via the cloud-based web application.

As described herein, the user may view various data associated with the selected unit and may enter a live event and/or exercise the buy now option. As a result, the user may either input a winning bid (live event) or confirm that the user is willing to pay the buy now price by interacting with one or more graphical indicators displayed on the electronic dashboard/platform. When the server determines that the user is the winning bidder (or has exercised the buy now option), the server may generate an executable file corresponding to a binding forward executable instruction.

The executable file may comprise a dataset and further include rules/instructions configured to instruct other features described herein to perform various actions. To ensure that the user will obtain title of the unit, the executable file may be immutable, such that no party can revise, delete, and/or overwrite the executable file. The dataset within the executable file may include various attributes associated with the unit (e.g., size, locations, price, ownership information), various documents associated with the unit and/or the owners (e.g., inspections reports, photographs, and titles), information (e.g. sale date and jurisdiction), network operation information (e.g. earnest money deposits, title company, escrow agent, and closing timelines) and event information (e.g., various bidders and their corresponding submitted bids, timestamp, winning bidder's activity on the platform, system administrator's activity on the platform, communications between any affiliated party). Additionally or alternatively, the dataset may also include data associated with the user who has submitted the winning bid/buy now price (e.g., name, account number, and address).

The dataset may also include various instructions causing other servers, computers, and/or entities to perform predetermined actions based upon the information included within the dataset. For instance, the instructions may cause a server associated with a payment platform (e.g., winning bidder's payment account) to transfer money to another account (e.g., an escrow account and/or another account associated with the seller or the platform). The instructions can also cause the platform to cease from electronically publishing the same data record on the platform. For instance, the same unit can longer be involved in another event on the platform.

The binding forward executable instruction may also instruct the server or any other party associated with the platform (e.g., the party offering the unit to the winning bidder) to transmit a winning bid at the time that the selected data record. The binding forward executable instruction may ensure that the title of the data record is passed on to the system administrator (e.g., seller) at the time of the scheduled event. For instance, if the data record is assigned to an event within the platform (or any other third-party platforms) at the time the data record is foreclosed upon, the binding forward executable instruction (e.g., instructions) may ensure that a system administrator or another party associated with the unit summits the highest bid, such that they obtain the title to the unit. The binding forward executable instruction also ensures that the title is then passed on the user who submitted the winning bid or exercised the buy now option. In some configurations, the server, via the platforms descried herein, may accept unsolicited offers and the system administrator (using the admin electronic dashboard/platform) can accept the offer by interacting with one or more GUIs described herein (e.g., interacting with an accept offer button, which initiates the executable instruction process described herein).

In some embodiments, the executable file may be overwritten, changed, or otherwise revised based on predetermined criteria (e.g., when the system administrator confirms, when all parties agree to new terms and conditions, and/or various override features that allow manual entries on the platforms described herein). The server may store the executable file in a system database and/or may send a copy of the executable file to be stored on the user device.

In certain embodiments, once the immutable executable file has been generated, the server is configured to store the file in a system database under secure storage protocols, and simultaneously transmit a copy of the same immutable executable file to the first user device for local retention. The dual-location storage is intended to prevent unauthorized revision or alteration of the file content by ensuring that both the system's authoritative copy and the user's local copy can be cross-verified against each other. In some embodiments, the file stored in the system database may reside in encrypted form within a secure database system, such as a relational database or distributed ledger, and be protected by access controls, audit logging, and cryptographic hash validation. The copy transmitted to the first user device may be stored in a secure, write-once memory segment or digitally signed container on that device, making it resistant to modification by external processes. Periodic checksum comparison or hash validation between the system copy and the local copy may be employed to detect inconsistencies and to abort execution if disparity is identified, thereby ensuring that only an unaltered, verified version of the immutable executable file can be executed during the scheduled event.

In certain embodiments, the immutable executable file comprises computer-readable instructions that, when executed by any suitable processor, such as the system server discussed herein, enable autonomous discovery and participation in an event platform associated with the first data record. The instructions may cause the processor to initiate a network crawling routine which systematically queries internet resources, indexed search services, application programming interfaces (APIs), and proprietary data repositories to identify an active transaction or auction site hosting the scheduled event for the first data record. Once the correct event platform is detected—using matching criteria such as asset identifiers, property address, title number, or unique platform reference codes—the processor may establish a secure connection to the platform using authenticated session protocols.

The immutable executable file may then cause the processor to subscribe to and continuously monitor live bid or offer data received from the platform in real time. This monitoring can include acquiring incremental participant values, timestamps, and bidder identifiers as they are broadcast or updated by the event host system. Based on the live data feed, the instructions may execute an adaptive bid logic module that compares the current highest value to predefined parameters contained within the dataset and determines a new proposed value that exceeds the highest participant value while conforming to preset thresholds, such as a maximum allowable amount or margin percentage. The processor may repeatedly update and submit proposed values during the event until the bidding sequence ends, thereby ensuring that the proposed value transmitted on behalf of the first user remains higher than all other participant values at the close of the event, and resulting in successful assignment of the first data record to the first user per the stored transaction rules.

In certain embodiments, the computer-readable instructions embedded within the immutable executable file are configured to ensure that, upon detection of the commencement of the scheduled event associated with the first data record, the processor automatically submits the appropriate proposed value in accordance with the pre-defined transaction terms stored in the file's dataset. The "appropriate proposed value" may be determined by rules contained in the dataset specifying exact submission amounts, incremental adjustments to exceed competing participant values, and maximum allowable thresholds to maintain compliance with event protocols and user-specified parameters. Because the immutable executable file is generated prior to the event, cryptographically secured, and stored in redundant write-protected locations, the decision logic and value definitions cannot be altered or corrupted between the time of generation and execution. On initiation, the instructions cause the processor to execute a sequence of actions that includes establishing a secure communication session with the event host platform, monitoring incoming participant values in real time if applicable, comparing those values to the stored parameters, and issuing the resulting proposed value without human intervention. This technical process provides a deterministic execution path that removes timing uncertainty, manual input errors, and variability present in conventional transaction systems, which typically rely on real-time human participation or unsecured, modifiable scripts that may be out-of-sync with the event timeline. The guaranteed automated execution afforded by the immutable instruction set thereby increases system reliability, ensures transactional integrity, and materially improves the probability of achieving the desired event outcome compared to existing solutions.

In a next step 408, upon identifying the immutable executable file for the first data record at the event for the first data record, automatically execute the immutable executable file, such that the computer readable instruction of the immutable executable file causes the server to: generate, in accordance with the computer readable instruction within the immutable executable file, a proposed value for a associated with the first data record on behalf of the first user, wherein the winning bid causes the data record to be automatically assigned to the first user, and transmit the generated proposed value to a second server associated with the event, such that the immutable executable file causes the second server to automatically block other proposed values from other digital participants at the event.

In certain embodiments, upon detecting the commencement of a scheduled event associated with the first data record, the system server identifies the corresponding immutable executable file previously generated for that record. Identification may occur through event metadata matching, time-based triggers, or monitoring of inbound event notifications from external systems. Once the file is located, the server automatically executes the immutable executable file without requiring manual intervention. Execution causes the server to process the computer-readable instructions contained within the file and generate a proposed value for the first data record on behalf of the first user, the proposed value being determined in accordance with the rules and parameters stored in the dataset component of the file. When such proposed value is recognized by the event host system as the winning value under the governing event protocols, the data record is automatically assigned to the first user, with the assignment recorded in both the system database and the event platform records. The immutable executable file further directs the server to transmit the generated proposed value to a second server associated with hosting the event. In some embodiments, the transmitted proposed value is accompanied by control instructions or authentication tokens that cause the second server to enforce acceptance of the submitted value over other contemporaneous proposed values, effectively blocking or rejecting competing submissions from other digital participants. This coordinated execution ensures transactional certainty by combining secure, pre-authorized bid logic with automated enforcement mechanisms, providing a technical advantage over conventional systems that rely on real-time human input or unsynchronized scripts, which may fail to execute timely submissions or may allow competing values to supersede agreed pre-event commitments.

As described above, the server may monitor to identify when the data record is associated with a scheduled event. For instance, the server may periodically monitor third-party servers to identify whether the unit is listed in a scheduled event. At a time of the actual scheduled event associated with the unit, the server may automatically generate a proposed value (e.g., winning bid) to submit for the data record (e.g., purchase the unit) on behalf of the first user, in accordance with a set of rules within the dataset. For instance, the set of rules may indicate that a price of the proposed value may be increased until the successful purchase indication is received from the scheduled event. The winning bid may correspond to a maximum balance amount associated with a mortgage of the unit. The winning bid to purchase the unit on behalf of the first user may include a second price (e.g., a price that is different from the winning bid submitted by the user).

When the submitted proposed value at the scheduled event is successful, the server may generate a document indicating a purchase record of the unit. The server may transmit the purchase record of the unit to the user device and/or the administrator by revising either platform accordingly. In some configurations, the server may also transmit record of the buyer and/or seller to the other party. For instance, the buyer may receive the seller's records and tracking, and vice versa.

Figure 23:
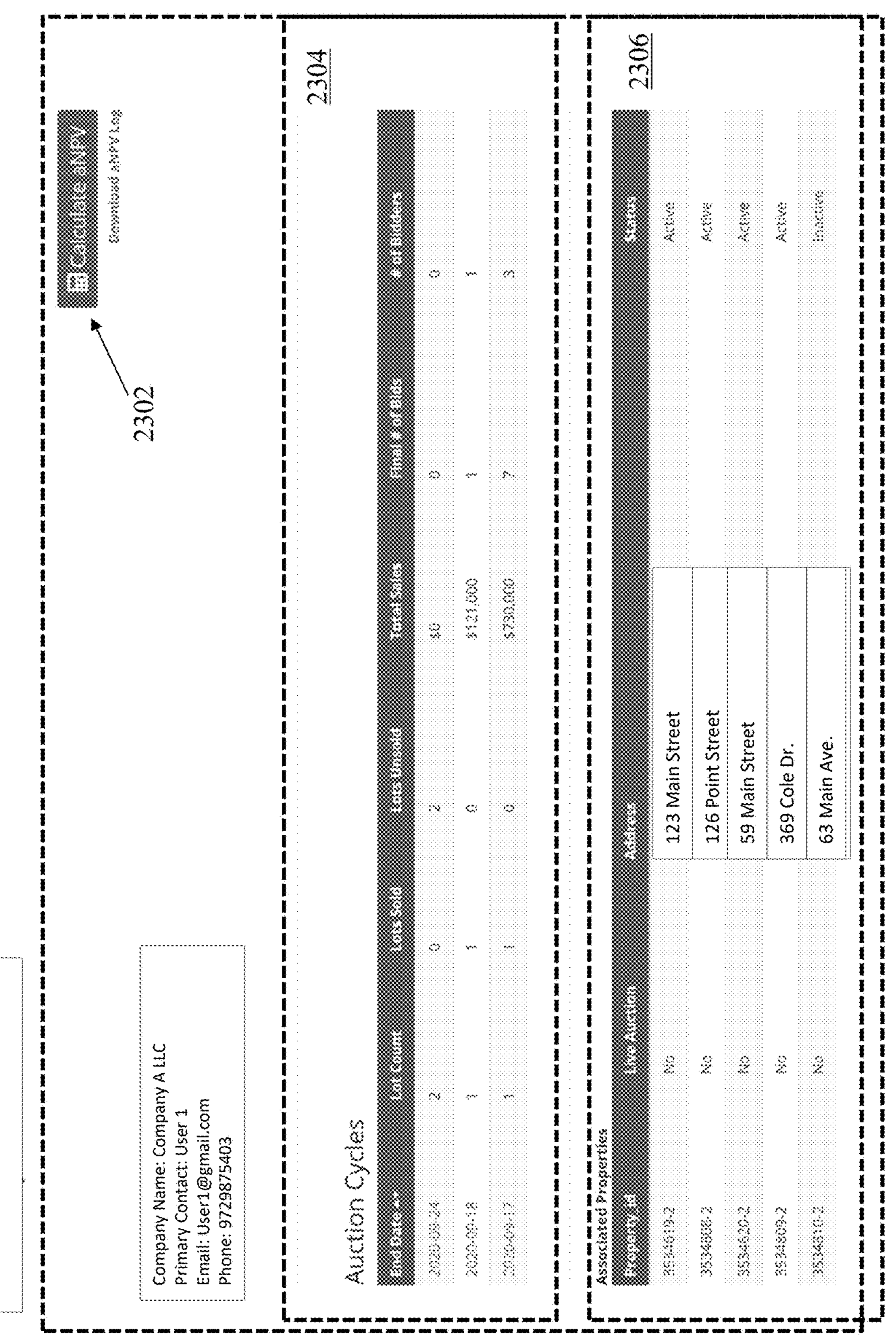

In some configurations, if a buyer wins an event or exercises the buy now option, the server may display the GUI 2300 depicted in FIG. 23. The GUI 2300 may be a part of the seller electronic dashboard/platform. The seller and/or the administrator may use GUI 2300 to calculate net present value by interacting with the graphical indicator 2302. The seller may also monitor various events depicted in the graphical component 2304. The seller may also review/analyze associated units, as depicted in the graphical component 2306.

Figure 24:
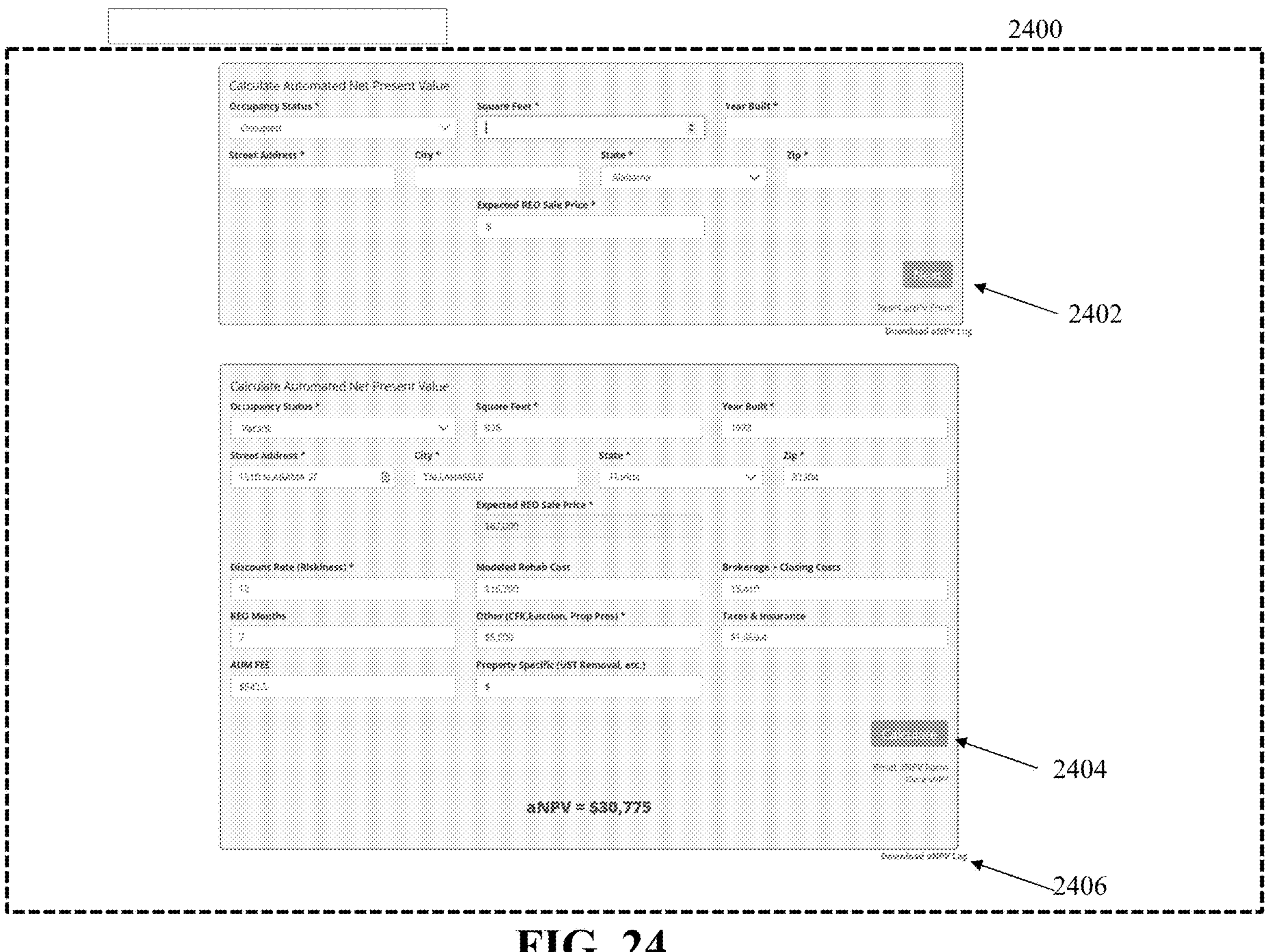
Figure 27:
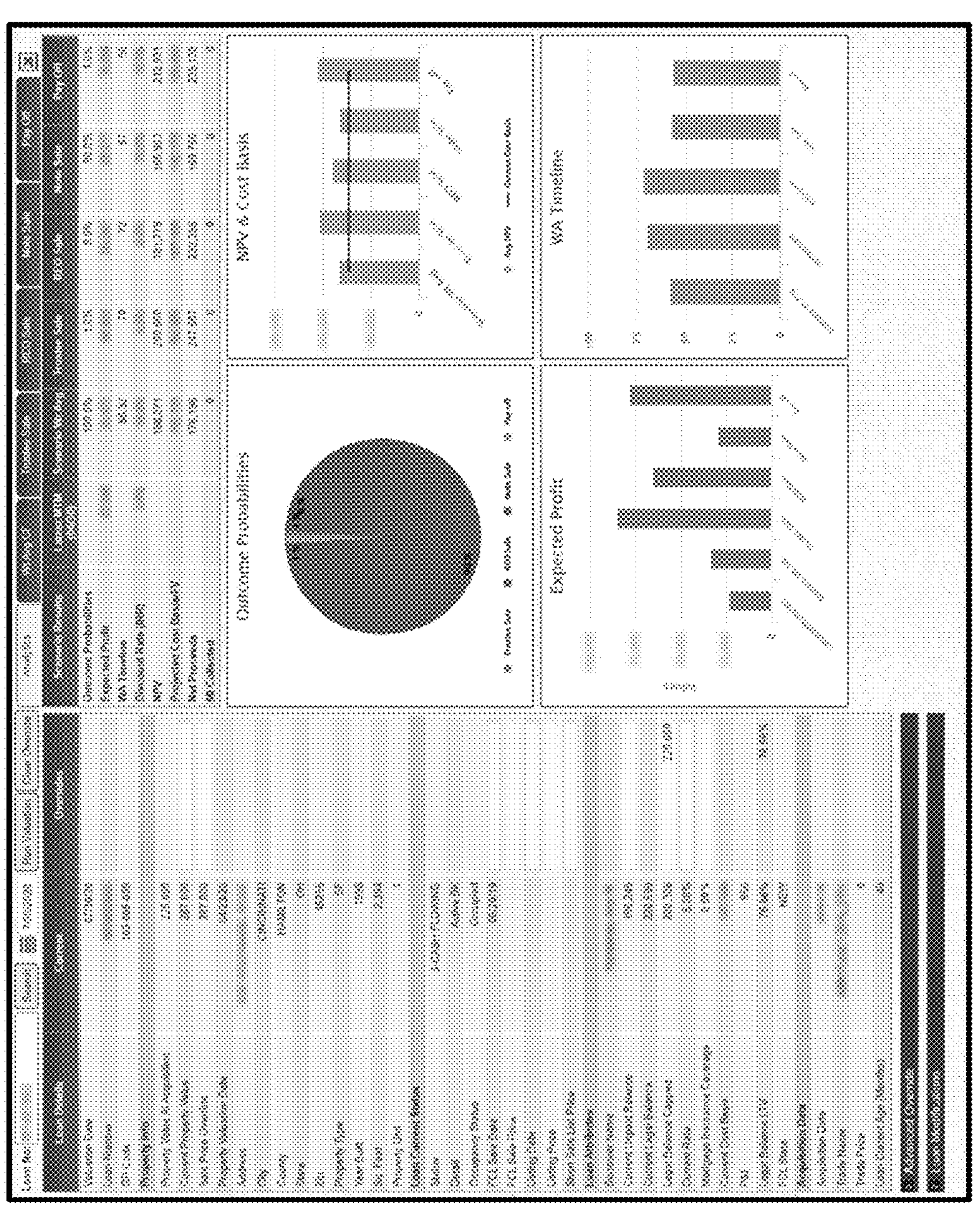

The server may also display the GUI 2400 that allows a seller to identify a net present value for units not currently listed. For instance, the server may interact with the graphical component 2402 and 2404 to calculate net present value for the seller's unit. The seller may also interact with the graphical indicator 2406 and download a net present value log (e.g., GUI 2700 depicted in FIG. 27 or GUI 2800 in FIG. 28). As discussed above, the server may communicate with one or more third-party affiliate data repositories and retrieve one or more proprietary datasets representing data associated with similar units. Using this data, in conjunction with property data (e.g., size, location, age, and condition), the analytics server may execute an NPV model and identify the unit's NPV. In some embodiments, as depicted in FIG. 24, the analytics server may prepopulate one or more fields using data retrieved from the third-party data repository (e.g., based on similar units).

The server may generate and display a second electronic dashboard of the plurality of electronic dashboards on an administrator device, in response to execution of the cloud-based web application on the administrator device. The second electronic dashboard may display a second set of graphical components. Each graphical component of the second set of graphical components may represent the unit. The server may present on the second electronic dashboard a status of a corresponding unit associated with the second set of graphical components, in response to an interaction with any of the second set of graphical components. The server may update a status of the unit associated with the second set of graphical components in real time based on one or more input selections received from the one or more user devices. The one or more input selections may include a selection to buy or a selection to bid the units. The server may transmit a notification to the administrator device and the one or more user devices in real time when the status of the unit associated with the second set of graphical components is updated based on processing of the one or more input selections.

Figure 26:
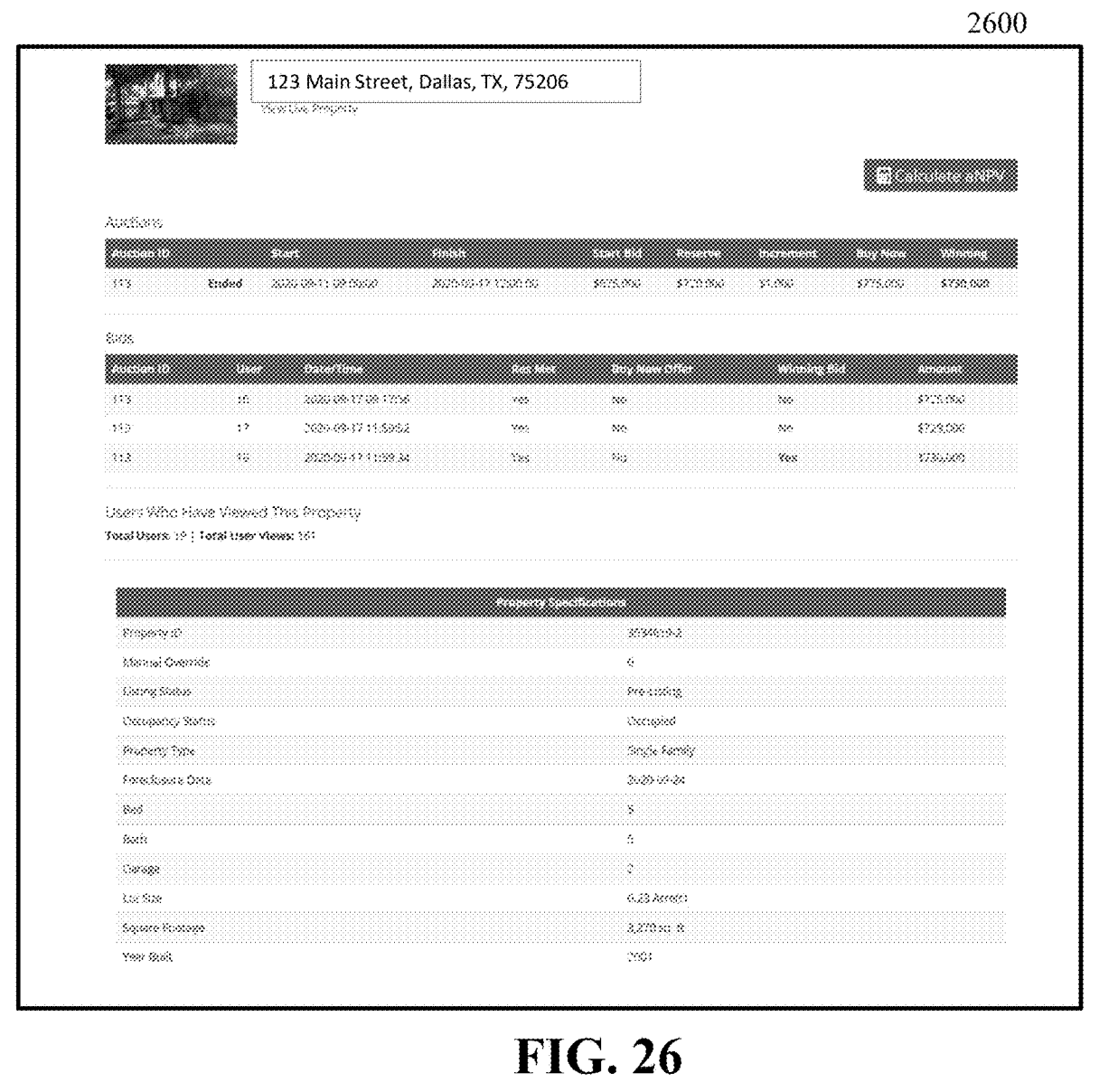

For instance, the server may present the GUI 2500 depicted in FIG. 25 that illustrates data corresponding to the events ending on a specific date (e.g., time stamp, address, start bid, reserve, increments (for instance, incremental amount for different bids), and the buy now price). The server may provide detailed information to the seller/administrator. For instance, the seller/administrator can access the GUI 2600 depicted in FIG. 26 to review event data and unit specification for a specific unit. The GUI 2600 depicts an individual unit screen showing bidding data specific to that unit.

Additionally or alternatively, the binding forward executable instruction may instruct the server to transmit the money (sometimes held in an escrow account) to an account associated with the seller or a system administrator. Furthermore, the server may display the content of the binding forward executable instruction, such that one or more parties can view the contents (e.g., terms and conditions).

Non-Limiting Example

The user accesses the web application described herein. Upon proper authentication of the user, the web application identifies and displays a set of units matching one or more attributes (e.g., geographic area, price range, number of bedrooms) selected by the user. The web application also provides the user with two options for purchasing the unit. First, the user can guarantee a purchase of the unit by choosing a "buy now" option and agreeing to pay a suggested price displayed by the web application. Second, the user may engage in a timed bidding session and attempt to outbid other users utilizing the web application's bidding interface.

At the conclusion of the timed bidding session or if the user selects the "buy now" option, the server operationally connected to the web application generates a binding forward executable instruction between the user and a secured party who legally owns the unit. The binding forward executable instruction ensures that the secured party will transfer title of the unit to the user at the completion of the scheduled event of the real estate. The binding forward executable instruction also ensures that the secured party will retain ownership of the unit subsequent to the actual scheduled event until it is transferred to the winning bidder. For instance, the binding forward executable instruction ensures that the secured party does not transfer ownership of the unit to anyone other than the user.

In some embodiments, the server may also sell the recorded judgment and assign it before the scheduled event in which case the winning bidder would enter their own max credit bid at the actual scheduled event.

In accordance with obligations imposed by the binding forward executable instruction, the secured party (or a third party's authorized representative) must attend (physically or virtually) the actual scheduled event of the unit and ensure that the ownership of the unit reverts to the secured party. For instance, if the actual scheduled event of the unit is held, the secured party must outbid other third-party bidders. Once the unit reverts to the secured party, the binding forward executable instruction requires the secured party to transfer ownership of the unit to the user.

The methods and systems described herein provide a multi-tiered (e.g., asynchronous) auctioning system. A first bidding session (or a buy now option) is a closed bidding session where only users of the web application can participate and submit offers. A second bidding session (or a bidding option) is a public scheduled event where others can submit offers on a foreclosed unit. Using the methods and systems described herein, a user of the web application can purchase the unit using the closed bidding session without attending a public scheduled event. The methods and systems described herein transfer the bid of the user from the closed bidding session and specific bidding instructions to the party conducting the public foreclosure sale. Additionally, the methods and systems described herein ensure the secured party or authorized agent of the secured party will instruct the party conducting the scheduled event to continue bidding for the unit until all other third party bidders have ceased bidding, or until the amount of the Borrower's total indebtedness to the secured party is equivalent to the last amount bid by the party conducting the scheduled event. That is, the systems/methods described herein guarantee that the secured party will bid to its max balance per the contract to make every effort to ensure a successful outcome.

The platform described herein may also provide a "second chance" opportunity to the users utilizing the buyer's platform. For instance, the server may generate a listing that includes a particular unit and may display the unit onto the buyer's platform. The server may also present a live event (including a buy now option) on the buyer's platform. If the server receives a winning bid or a buy now price from a user, the server may execute the method 400 and may generate the executable file that ensures that the unit is reverted back to the seller (at the time of or as soon as practicable after the foreclosure) and subsequently transferred to the winning bidder. However, if the server does not receive either a winning bid or no buyer exercises the buy now option and the unit reverts to the secured party at the scheduled event, the server may present an additional event (second chance event) after the scheduled event providing users (and other third party participants) an additional chance to purchase the unit before title has vested to the secured party and a deed recorded. If the secondary event is successful, the server executes the method 400. If the secondary event is not successful, the server may continue to offer the unit in a listing service or remove the listing from the platform.

The secondary event may include a lower/revised starting bid or may include a lower/revised reserve price and/or buy now price. The revised values may be based on further NPV analyses and fair market value calculations. Various factors may affect a revised NPV. For instance, a status change (e.g. occupancy may change from occupied to vacant) or additional information corresponding to the unit condition or market may precipitate a re-pricing of the unit. The secondary event may commence soon after the scheduled event and may run through the period when the title of the unit vests in the secured party's name and the asset becomes real estate owned (REO).

Referring now to FIGS. 5-22, various graphical user interfaces (GUIS) depicting different examples of user experiences are illustrated. More specifically, FIGS. 5-15 depict an end-user experience where the user can generate an account, retrieve a list of available inventory, place a bid and/or exercise the buy now option, and generate/request an electronic executable instruction. These figures are sometimes referred to herein as the buyer's platform or a user electronic dashboard. FIGS. 16-22 depict GUIS displayed on an administrator computing device where an administrator (e.g., an administrator of the platform or a user having interest/title to one or more units listed on the buyer's platform) can monitor different end-users' activities (e.g., biding submittals and viewing of property listings). These figures are sometimes referred to herein as the "system administrator platform" or an administrator electronic dashboard. Both electronic dashboards/platforms may be generated, hosted, revised, and or displayed by a central server, such as the server discussed in FIG. 1A.

Figure 5:
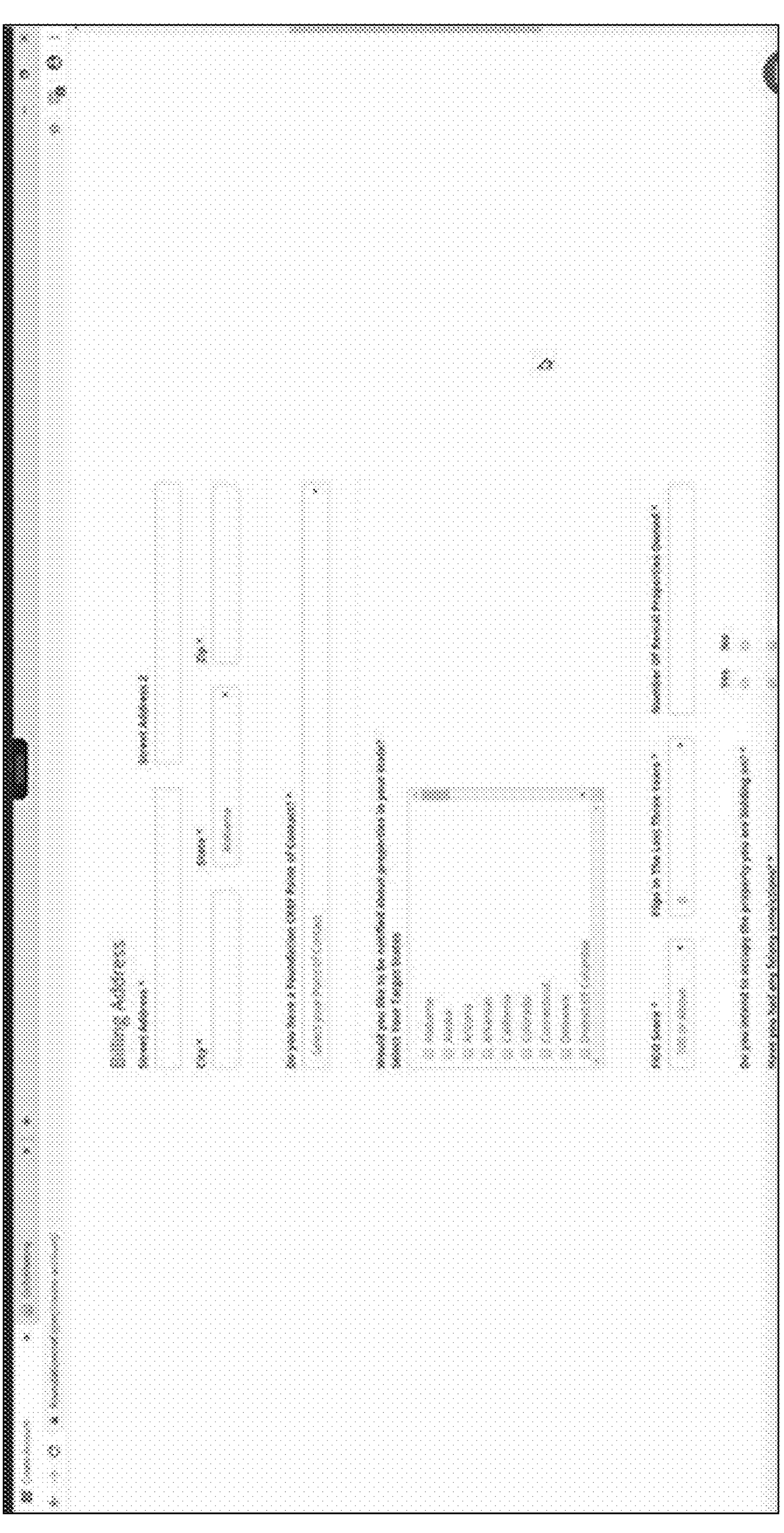
Figure 6:
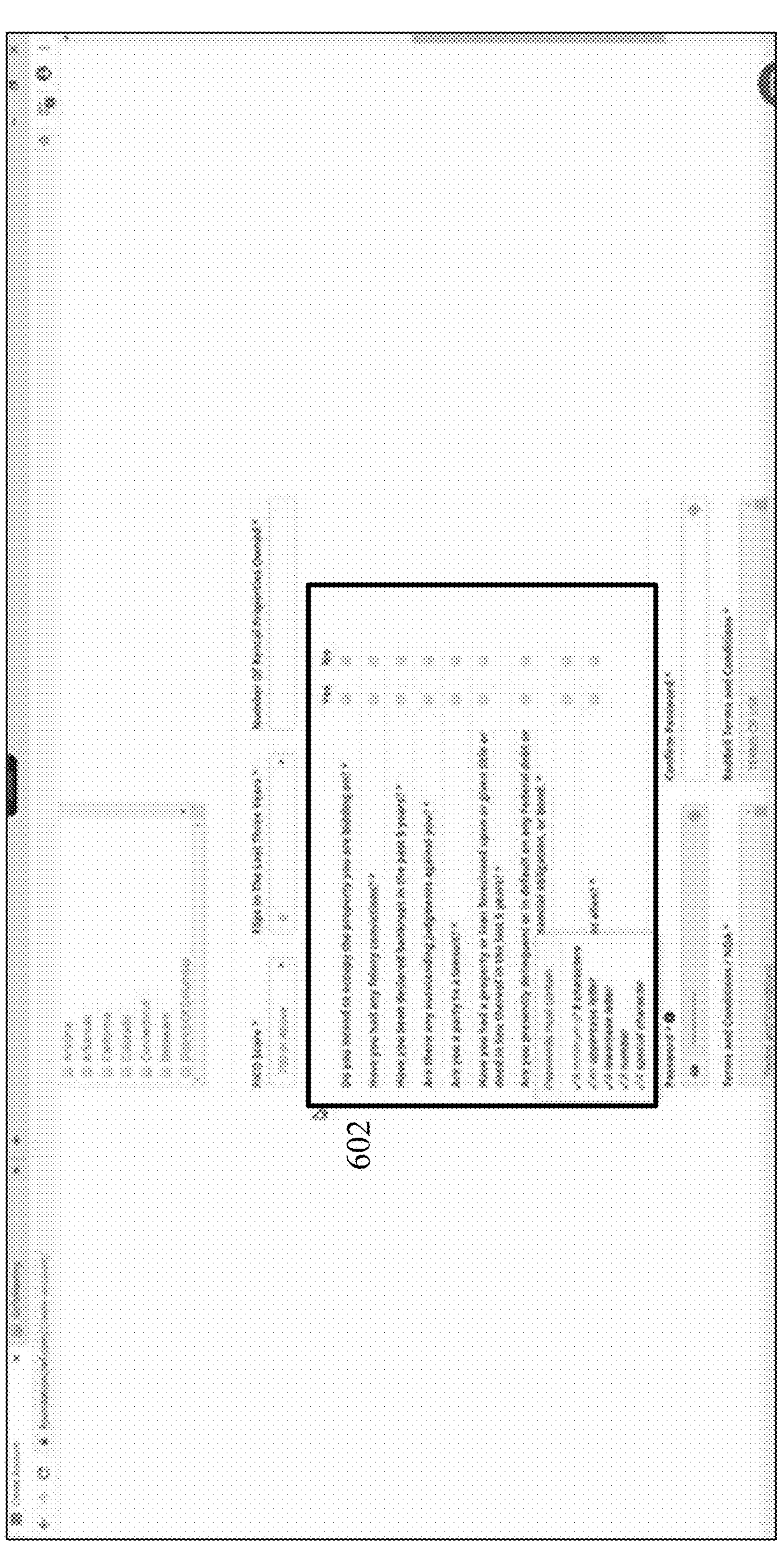

The end-user experience starts with FIG. 5 where the user can generate a new account. As depicted in GUI 500, the server may display various input elements (e.g., string input elements, radio buttons, and drop-down menus) where the user can input various personal and financial information, such as name, billing address, FICO score, and other personal/financial information to generate an account. The systems/methods described herein may also capture information during users' account creation about the user's buying preferences (e.g. target geographies). The server may use this data to customize the platform displaying certain units and provide notifications geared toward those buyer preferences to increase buyer bidding activity, seller pricing history, and overall network operation rates.

The computer may also display input elements corresponding to specific attributes that may affect the user's eligibility. For instance, graphical component 602 depicted in the GUI 600 (FIG. 6) inquires whether the user has declared bankruptcy or committed a felony before. The graphical component 602 also inquires whether the user intends to occupy the unit or is the unit an investment property. The server may use this information to identify whether a user is qualified to bid on or exercise the buy now option. For instance, the system administrator may predefine various rules and thresholds, such that answering yes to one or more of the questions depicted in the graphical component 602 disqualifies a user from participating in a live event or exercising the buy now option. In a non-limiting example, if a user has declared bankruptcy and/or has a low FICO score, the user may be disqualified to bid on a particular unit satisfying one or more attributes (e.g., unit's valued higher than a threshold).

In some embodiments, the server may compile all unapproved accounts and email accounts that have not been verified in a bidder approval electronic dashboard that provides tools for follow up and or manual approval.

The end-user may complete the account generation process by providing a password and accepting terms and conditions provided by the server, as depicted in GUI 600.

Figure 7:
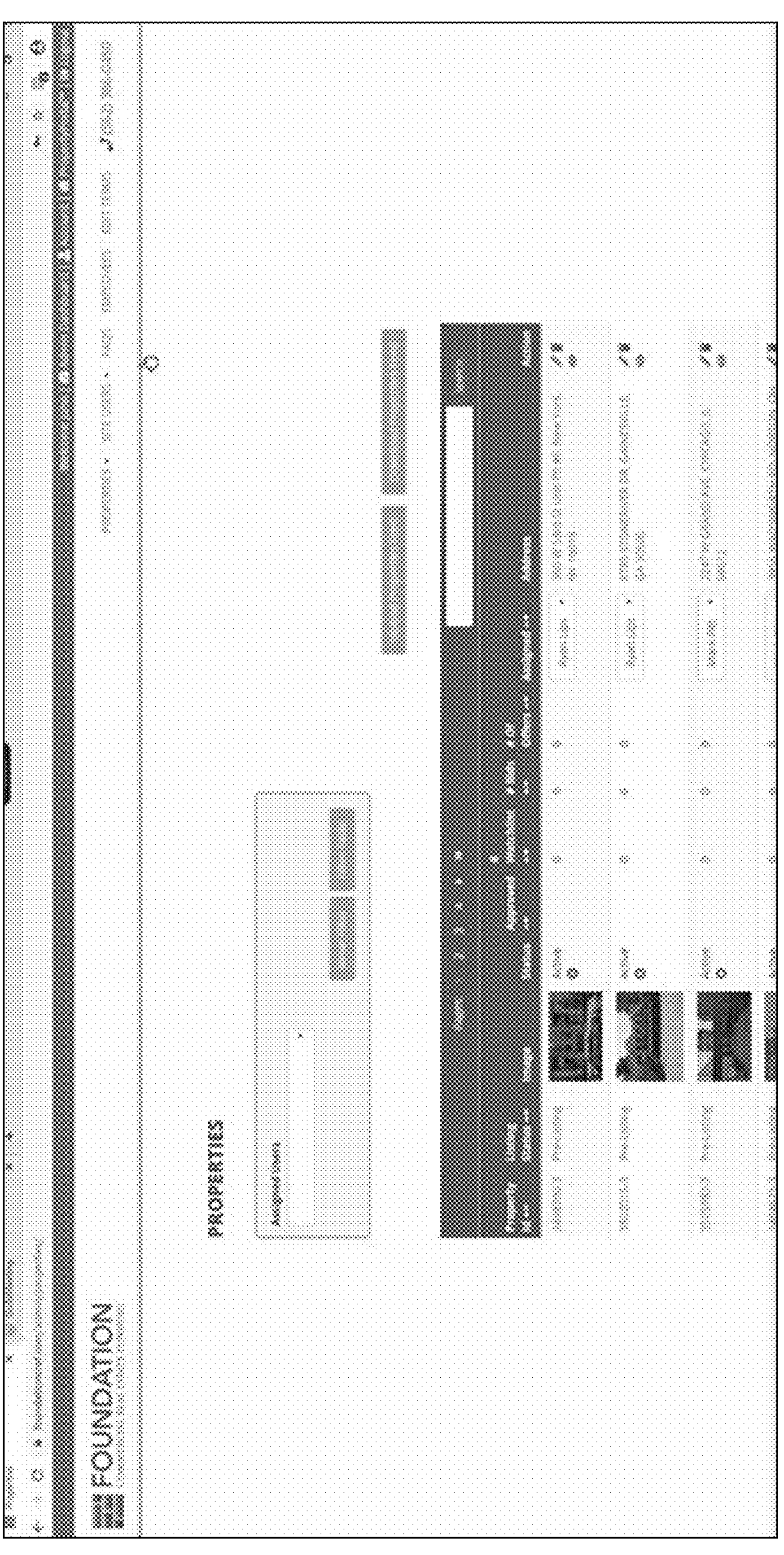

The server may implement an email verification step before the account is approved where the server sends an approval email with link for the user to click. When the account generation is completed, the user may view one or more units available for bidding (live event) and/or the buy now option. For instance, as depicted in FIG. 7, the computer may generate a list of available units and their attributes. The user may filter the list of units based on one or more property attributes (e.g., geographic, price, size, number of bedrooms, a number of viewers, and/or based on the number of events). In some configurations, the server may also display a similar GUI on the seller's electronic dashboard for inventory management. The server may display an initial view of the units where the units are shown in thumbnails. The end-user can interact with the thumbnails to receive more detailed data. In some embodiments, prior to account approval, the end-user can only see thumbnails with key information redacted or otherwise obfuscated (e.g., FIG. 8).

Figure 8:
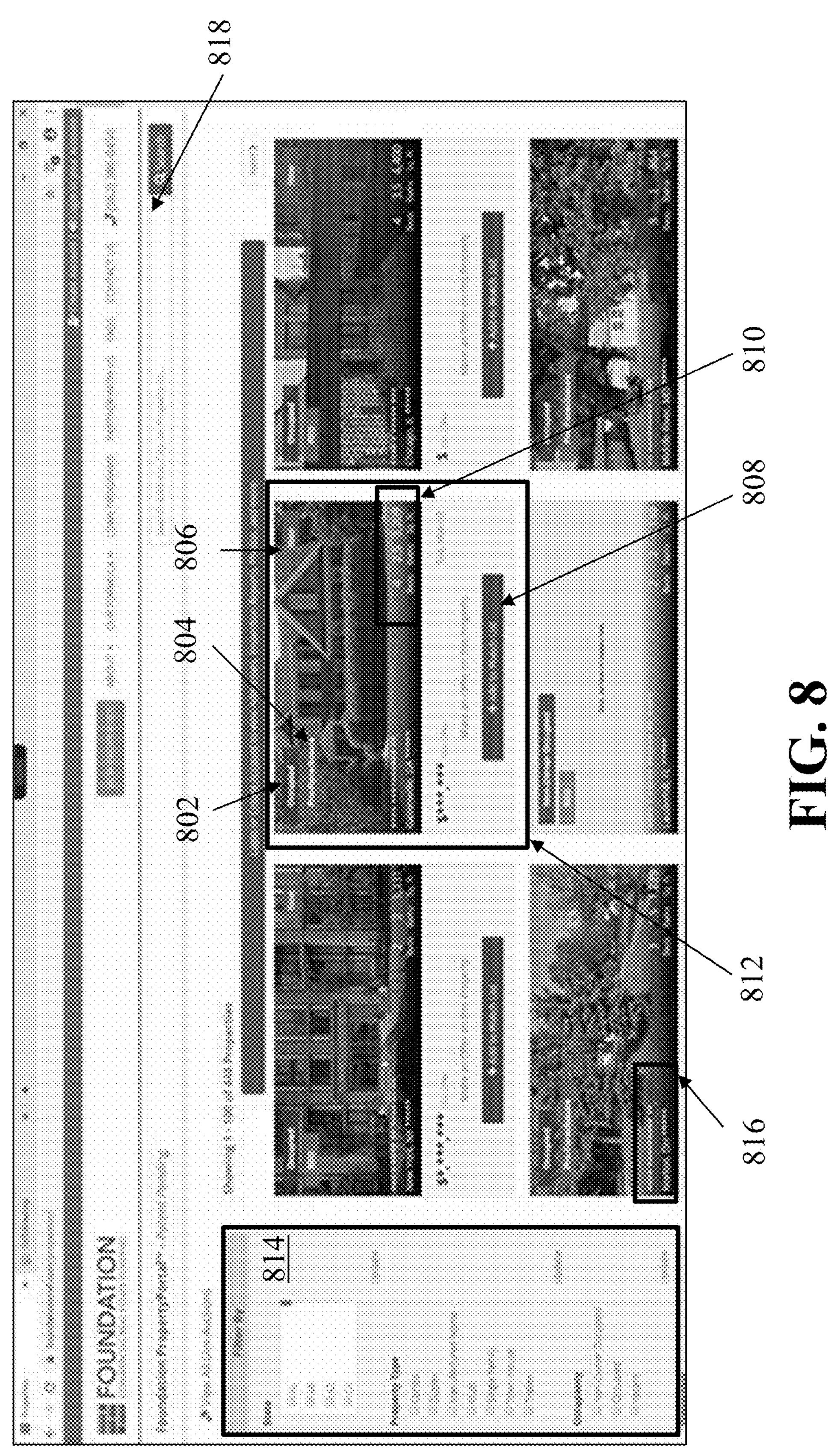
Figure 13A:
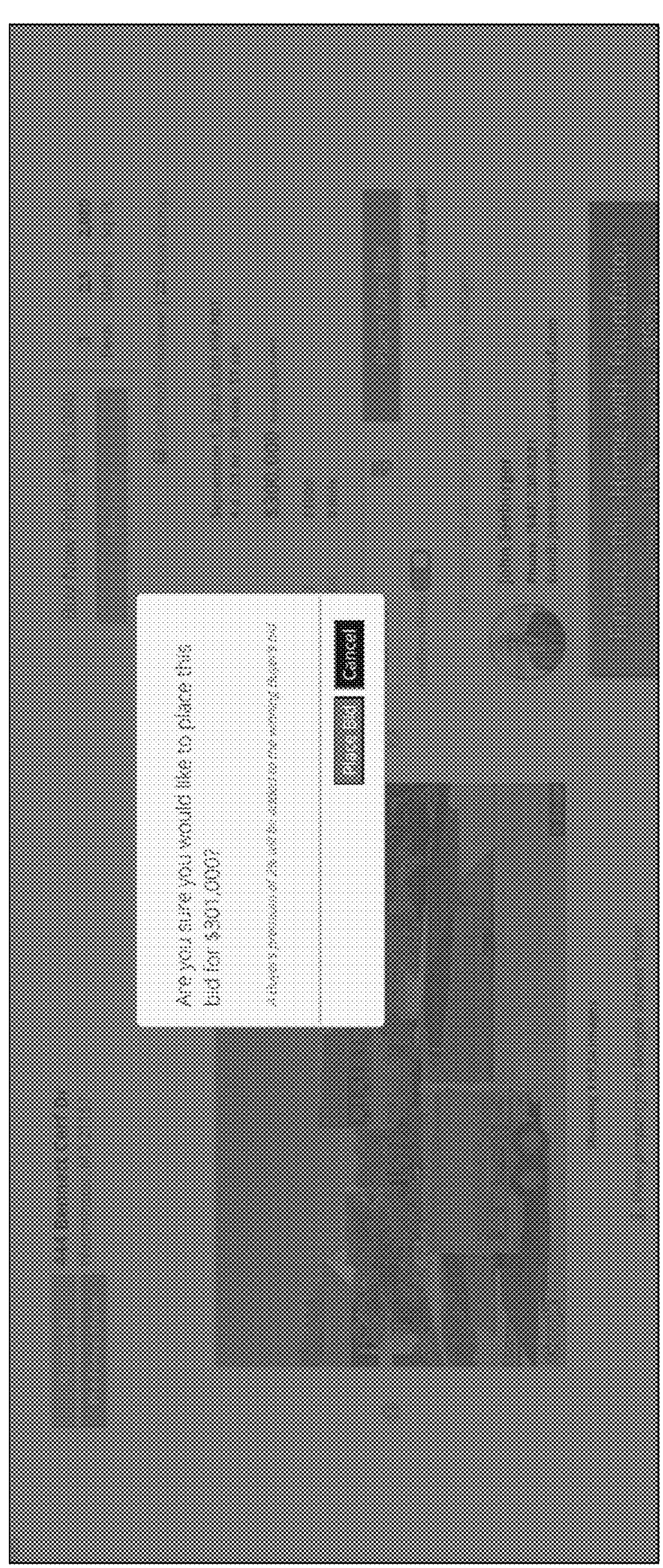
Figure 13B:
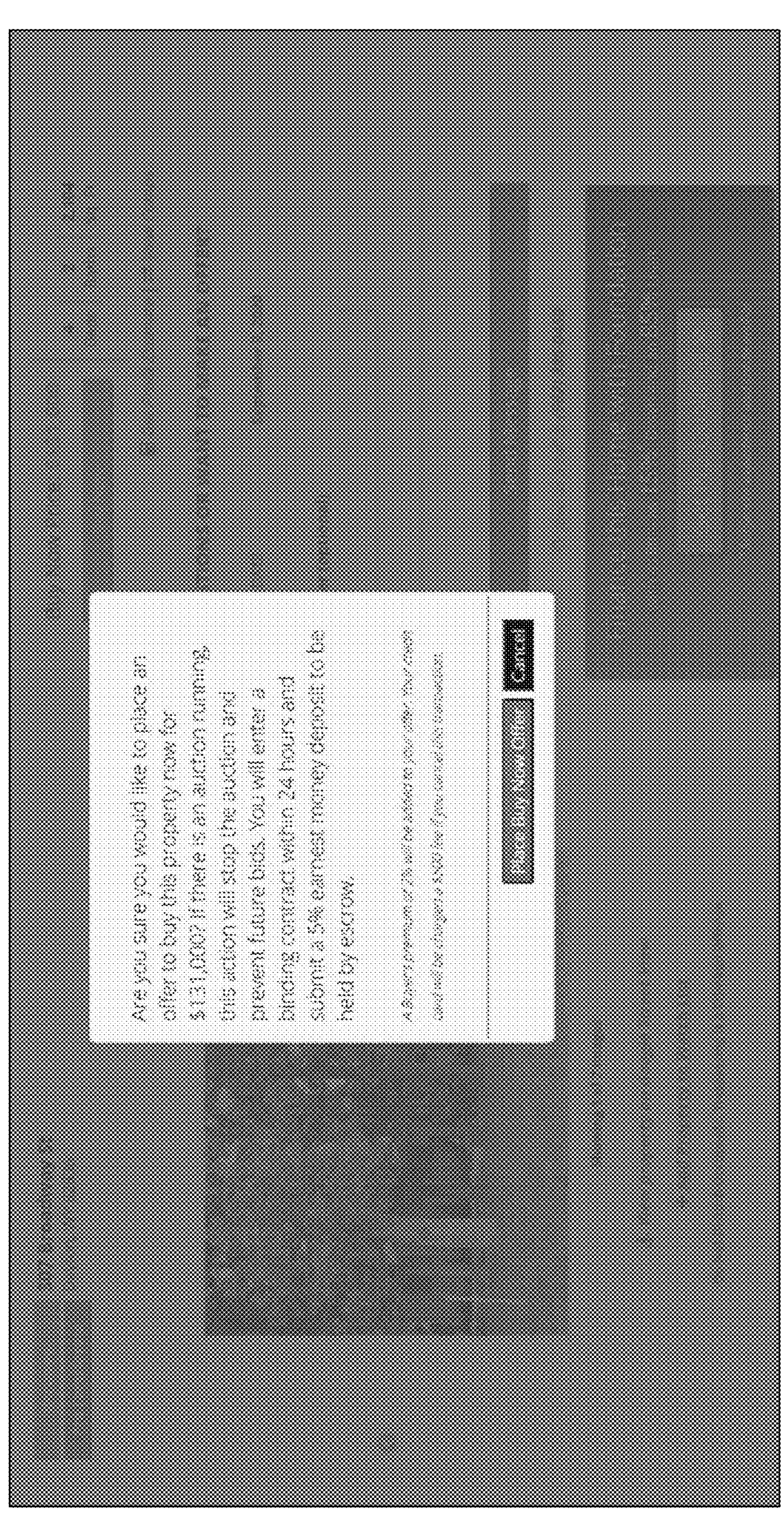
Figure 13C:
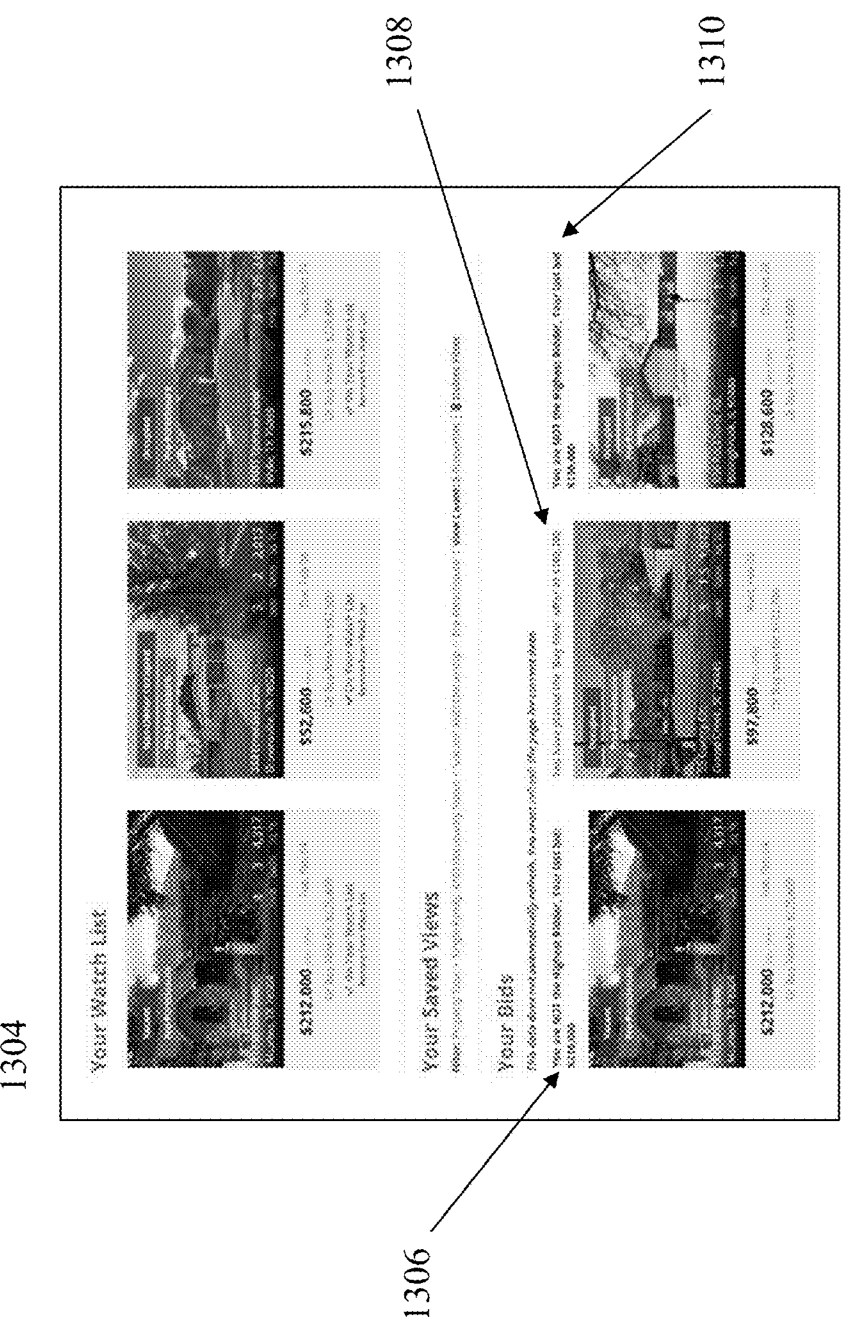
Figure 13D:
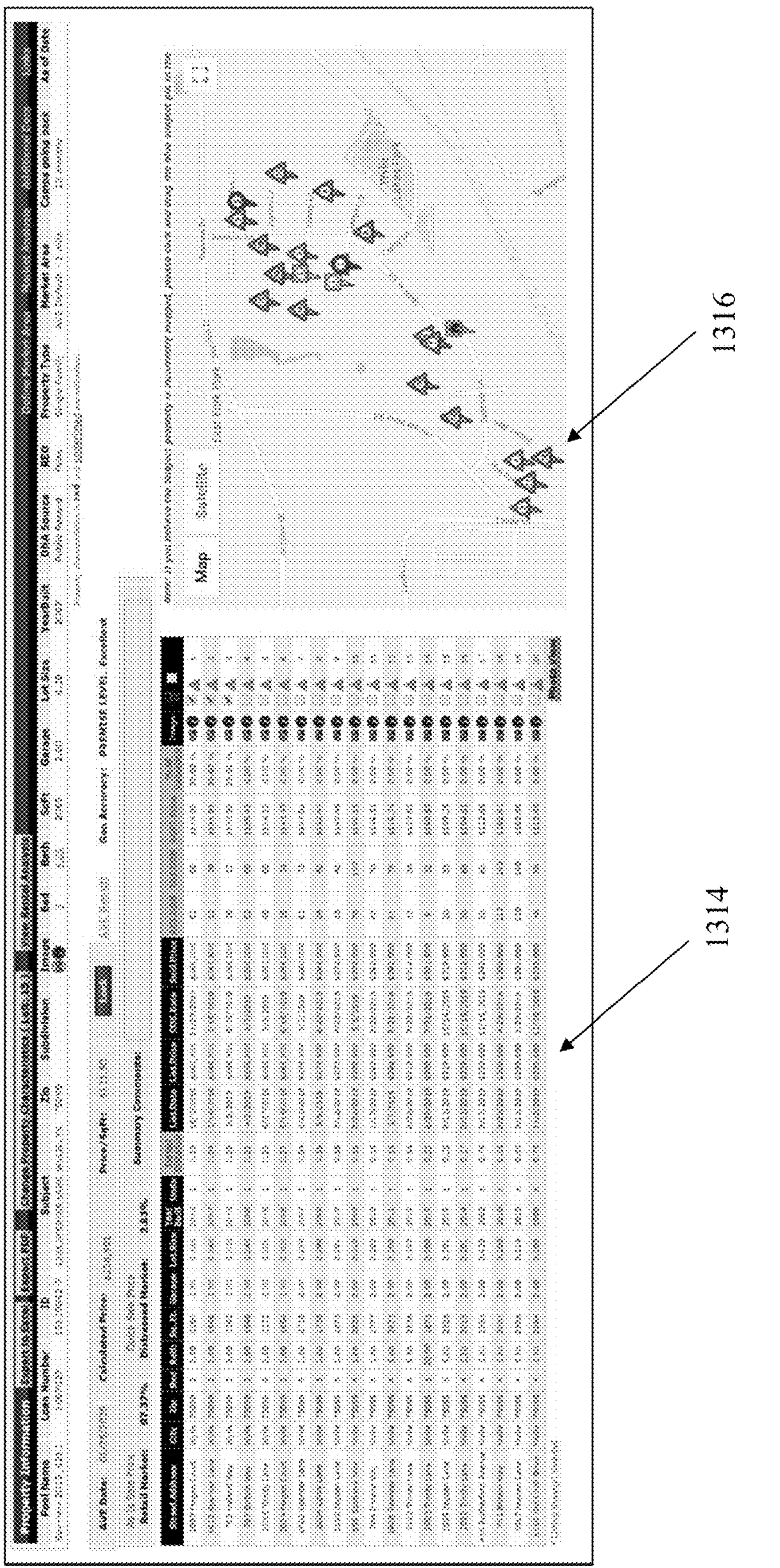

After receiving the user's criteria, the server may display GUI 800 depicted in FIG. 8. As illustrated, GUI 800 includes various graphical components each corresponding to a particular unit (e.g., thumbnails). For example, graphical component 812 corresponds to a unit offered by the platform. The graphical component 812 includes various indicators providing information to the user regarding the unit. For instance, the graphical indicator 802 identifies that the unit is currently occupied by the residents, graphical indicator 804 indicates that the unit is in a pre-foreclosure state, the graphical indicator 806 indicates that the unit has been newly added to the platform. The graphical component 812 also provides some preliminary information regarding the unit. For example, the graphical indicator 810 identifies a square footage, number of bedrooms, and number of bathrooms for the unit. The end-user either may interact with the graphical component 812 to receive more information or may interact with the graphical indicator 808 to add this unit to his watch list. If the user adds the unit to his watch list, the server transitions to the GUI 1100 depicted in FIG. 11. The server may also add the watch listed unit to the user's electronic dashboard (e.g., showing the watch list, saved views, user bids, and the like), as illustrated in FIG. 13C. In some configurations, this also triggers the server to transmit an electronic notification (e.g., email or SMS) to one or more other users associated with the unit.

Figure 9:
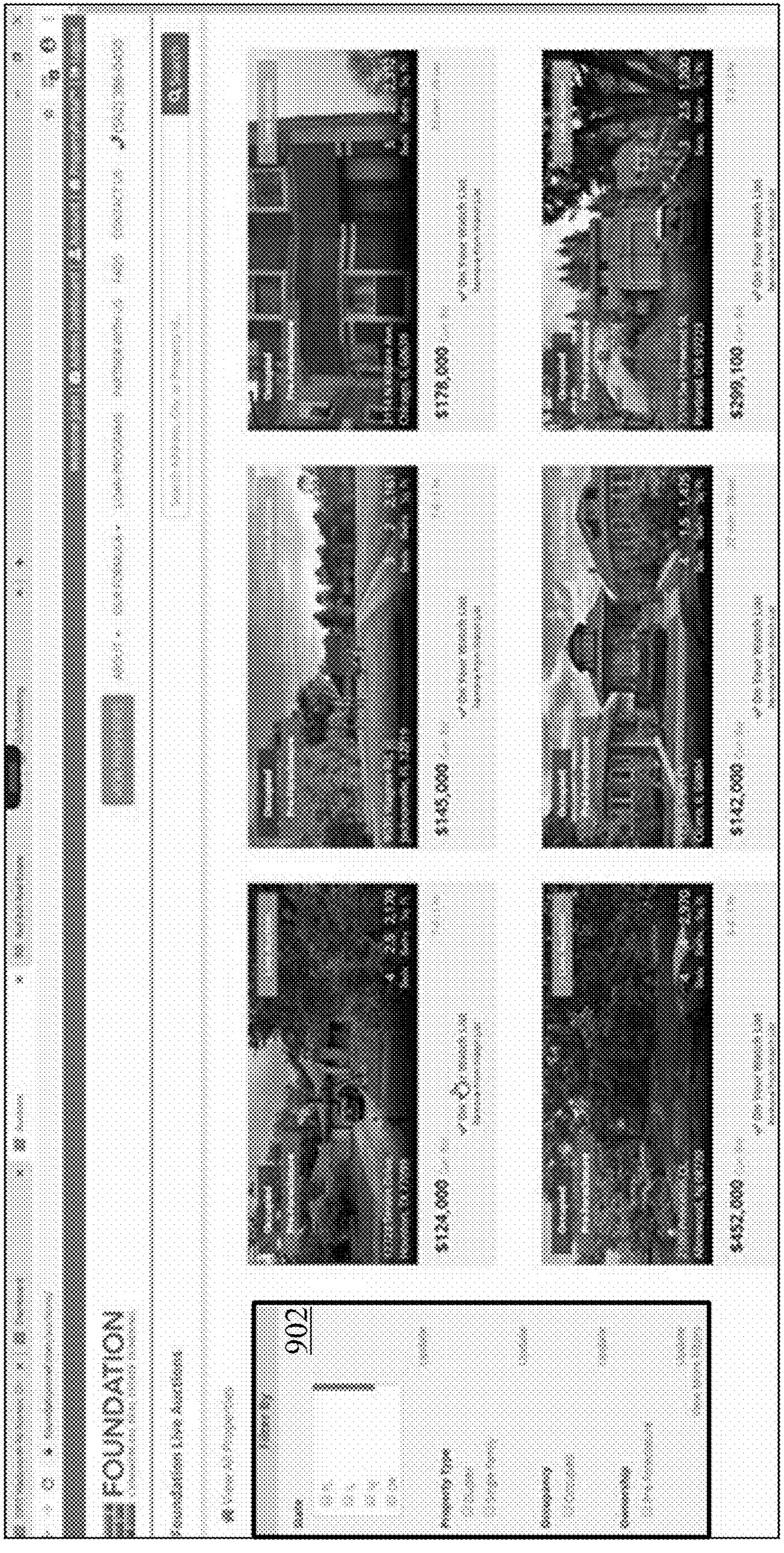

The end-user may also use various input elements displayed within the graphical component 814 to further filter/sort or otherwise refine units displayed within the GUI 800. In some configurations, the information presented on the GUI 800 may be redacted, such that only registered users can access/view the information. For instance, the information identifying the address and ZIP code of a property listing may be redacted as depicted in the graphical component 816. When the user logs in (or is otherwise authenticated), the server may display the information as depicted in FIG. 9. Furthermore, the user may use the search bar 818 to search for specific units using their address or any other identifiers.

Figure 10:
Figure 11:
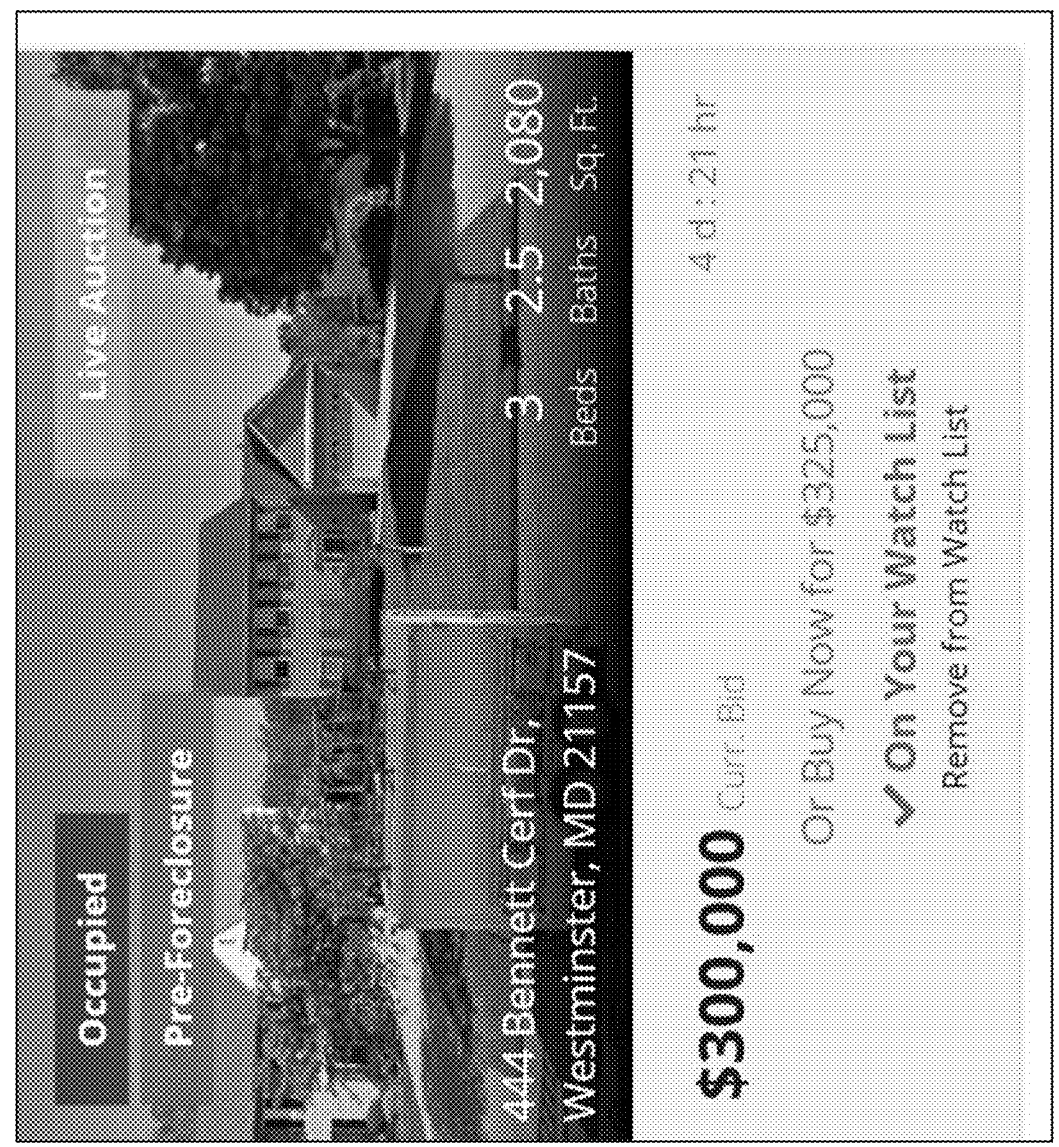

The end-user may also filter the units, such that the server only displays units within the end-user's watch list. For instance, and referring to FIG. 13C, GUI 1304 displays various units on the end-user's watch list. The server may also display similar information displayed in the GUI 800. Furthermore, the end-user may similarly revise, sort, and/or filter the results based on various criteria by interacting with various graphical components displayed on the platform. If desired, the server may display the same information as a list of units (without thumbnail images), as depicted in FIG. 10. As depicted, FIG. 10 is an administrator view for event management. The server may provide list views (or thumbnail views) for potential buyer end-users.

Furthermore, the server may display all live events, as depicted in FIG. 9 (GUI 900). The end-user may similarly revise, sort, and/or filter the results based on various criteria by interacting with various graphical components displayed on the platform.

Figure 12A:
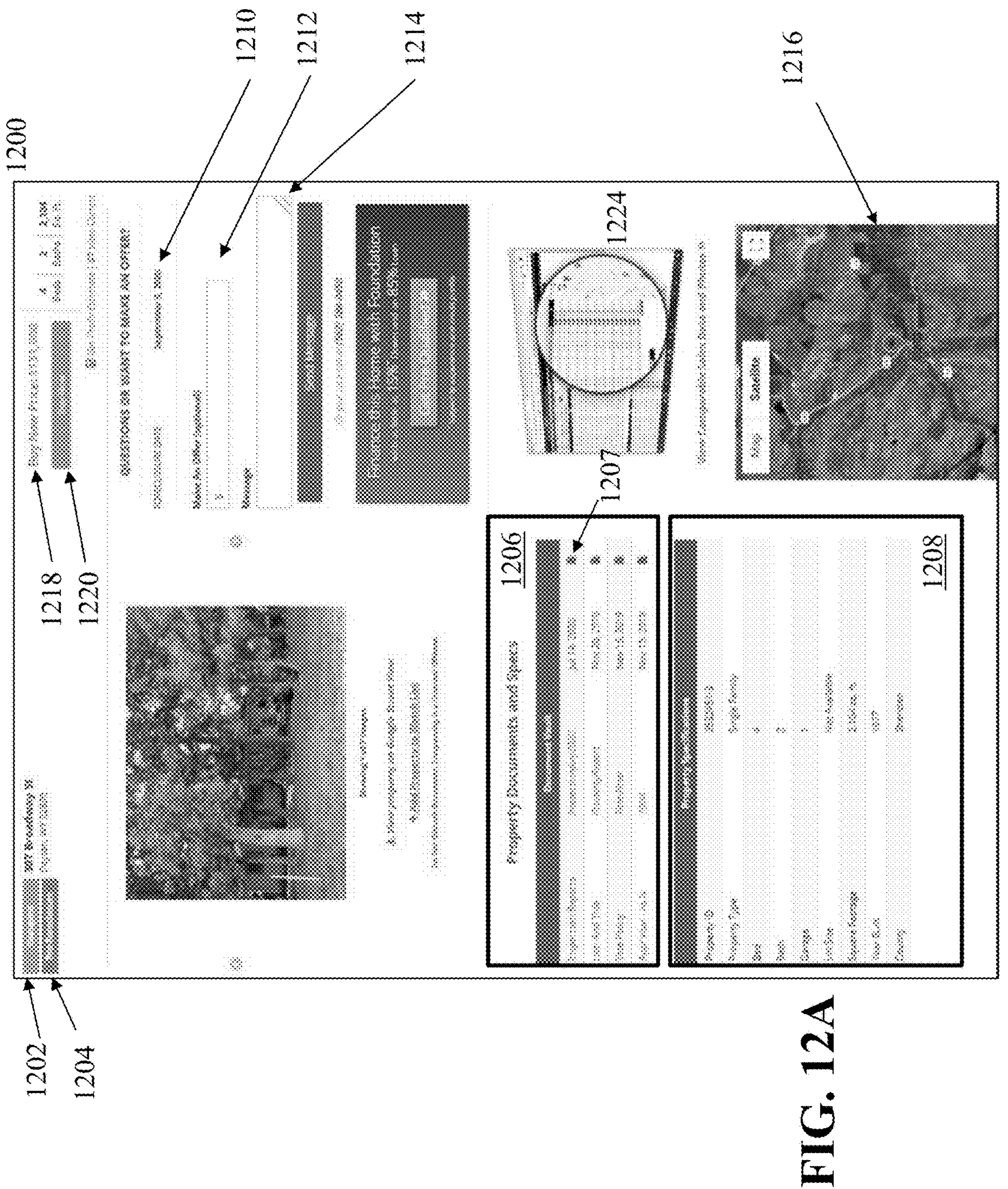
Figure 12B:
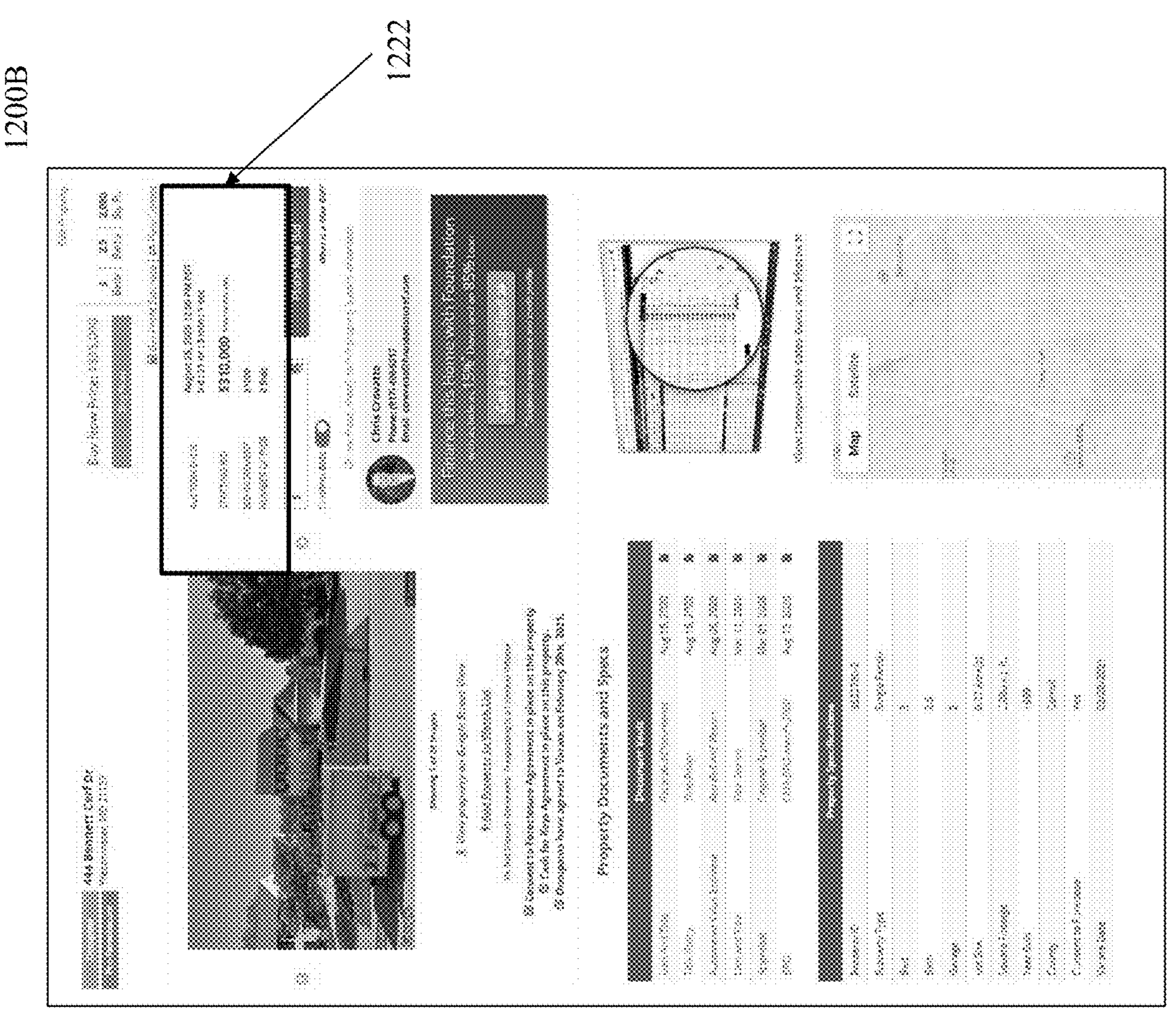

When the end-user interacts (e.g., clicks) with a graphical component representing a unit, the server displays detailed information regarding that particular unit, as depicted in FIG. 12A. The GUI 1200 displays various graphical indicators identifying detailed information regarding the unit and configured to receive bid information from the end-user. For instance, the graphical indicator 1202 identifies that the unit is currently occupied and the graphical indicator 1204 identifies that the unit has a scheduled event date in the future.

The graphical components 1206, 1208 further provide unit information. For instance, the graphical component 1206 directs the end-user to inspection reports, lien and title reports, title policy, appraisal information, or any other documents associated with the unit. For instance, the end-user can interact with the graphical indicator 1207 where the server directs the end-user to a new page or a pop-up window that displays inspection report files (e.g., scanned inspection reports). The graphical components 1208 displays information and specifications of the unit. The GUI 1200 also includes a map 1216 displaying the location of the unit.

By interacting with the graphical component 1206, the server may direct the end-user to the GUI 1312 (FIG. 13D) displaying additional information regarding the unit. Specifically, the graphical components 1316 and 1314 display information helping end-users to identify a fair market value and fair market rental rate associated with the unit, such as other similar/relevant units. In some embodiments, interacting with the graphical component 1224 may direct the user to a new GUI (sometimes hosted by a third party affiliated with the server) that displays comparable sale information, such as sales information for categorically similar units.

Referring back to FIG. 12A, the end-user may use the GUI 1200 to submit an offer by interacting with graphical components 1212 and 1214 or by guaranteeing a transfer of the title by interacting with the graphical indicator 1220. The graphical components 1212 and 1214 provide the end-user the ability to submit offers when there is no live event being executed by the server. When an event has been created, the server may transition to GUI 1200B.

As described above, the platform provides two options to end-users. First, end-users may enter a live event where they compete with other end-users. The system administrator may select a bid (e.g., the highest bid or the most appropriate bid) as the winning bid. Second, end-users may exercise the buy now option where the end-user guarantees the payment of the buy now price and the server guarantees that the unit will be transferred to the end-user at a time before or after the scheduled event specified in the binding forward executable instruction. In some configurations, when a unit is associated with a live event, the server may display the GUI 1200B depicted in FIG. 12B. The GUI 1200B may include the graphical component 1222 providing detailed event information. To help the end-user through this process, the GUI 1200 displays a buy now price (graphical indicator 1218) and a corresponding graphical indicator 1220. When the end-user interacts with the graphical indicator 1220, the server moves to GUI 1302 (FIG. 13B) where the server receives confirmation from the end-user. As described herein, when the user exercises the buy now option, the server ensures that the unit will be transferred to the end-user at a time either before or after the scheduled event date indicated within the graphical indicator 1210.

The server may also provide the option for the end-user to monitor one or more ongoing buy now activity and/or live events. For instance, as depicted in GUI 1304 (FIG. 13C), the user may view all watch listed units and saved views. The user may also view and monitor all bidding activity. The server may display an indicator identifying a status of the user's bidding activity. For instance, graphical indicator 1306 identifies that the end-user's bid was not the highest (the server may also identify the user's bid amount), the graphical indicator 1308 identifies that the user has placed a buy now offer which has been accepted, and the graphical indicator 1310 identifies that the user has lost the live event on the corresponding unit.

Referring back to FIG. 12A, the end-user may enter a live event by inputting an offer using the graphical input element 1212. In some configurations, if the listing is offered without a timed event, the end-user can make an offer in any amount with an accompanying message. However, if the server is displaying a minimum offer, the user must enter an offer above the minimum offer. Therefore, the end-user may interact with the graphical input element 1212 to submit a bid. The user may also input a customized message to be reviewed by the system administrator by using the graphical input element 1214. When the server receives an offer from the end-user, the server transitions to GUI 1300 depicted in FIG. 13A.

Figure 14:
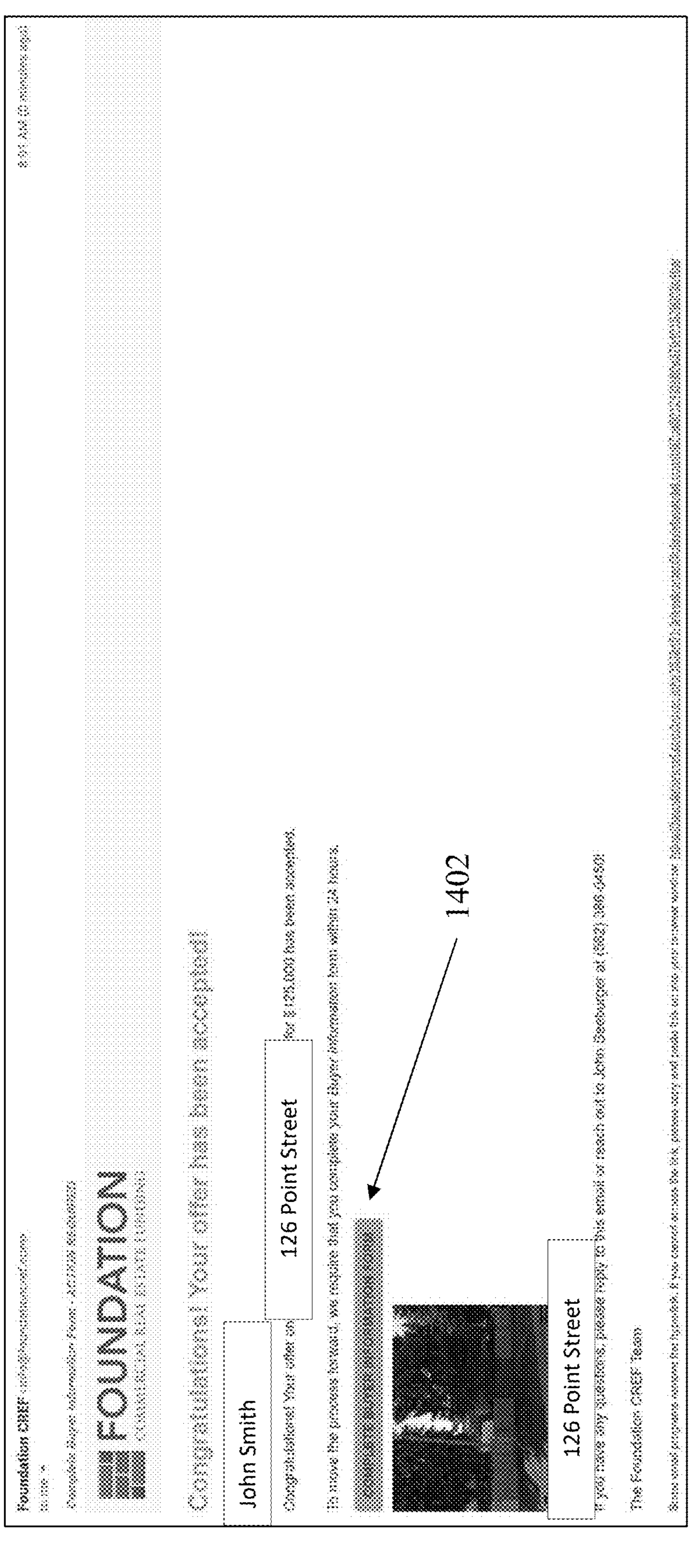
Figure 15:
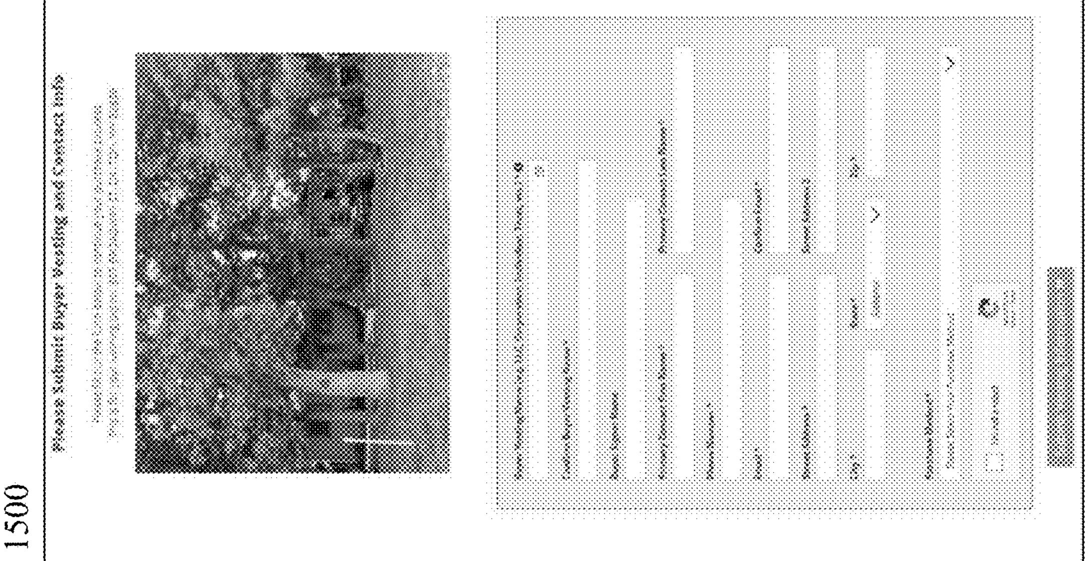

When the end-user's bid is accepted or if the end-user exercises the buy now option, the server displays GUI 1400 depicted in FIG. 14. The GUI 1400 informs the end-user that the end-user's bid has been accepted. The GUI 1400 further displays information associated with the unit. The GUI 1400 also includes the graphical indicator 1402 prompting the user to complete the buyer information form. When the server receives an indication that the user has clicked or otherwise interacted with the graphical indicator 1402, the server transitions to GUI 1500 depicted in FIG. 15. In a non-limiting example, the server may include the GUI 1400 in an electronic message (e.g., email) that is sent to the winning bidder with a button (e.g., 1402) that hyperlinks to the buyer information form.

The GUI 1500 depicts an example of a buyer vesting and contact information. The GUI 1500 may comprise multiple input elements, such as text strings, radio buttons, and/or drop-down menus. The user is then prompted to provide and submit appropriate inputs/responses. Upon completion of the form depicted in GUI 1500, the server stores the information and generates the binding executable instruction.

Using the methods and systems described herein (e.g., using the platforms described herein), potential buyers can access a pipeline of pre-foreclosure and pre-listing REO properties. The disclosed platform improves unit searches and bid tracking, while access to detailed unit level data mitigates risk associated with blind bidding and live events. The interactive platform described herein enables and monitors buyer and seller interactions. The information access and transparency along with pricing guidance improves the buyer's ability to submit appropriate bids while at the same time the system-generated pricing discovery data improves the seller's ability to achieve optimum pricing and willingness to transact.

Referring now to FIGS. 16-22, the platform viewed by a system administrator is illustrated, according to an embodiment. As described herein, a system administrator can access this platform to monitor various user activities, such as sellers pricing their units prior to or after listing on the platform, sellers placing their units onto the buyer's platform, potential buyers viewing units, potential buyers submitting bids, and the like.

Figure 16:
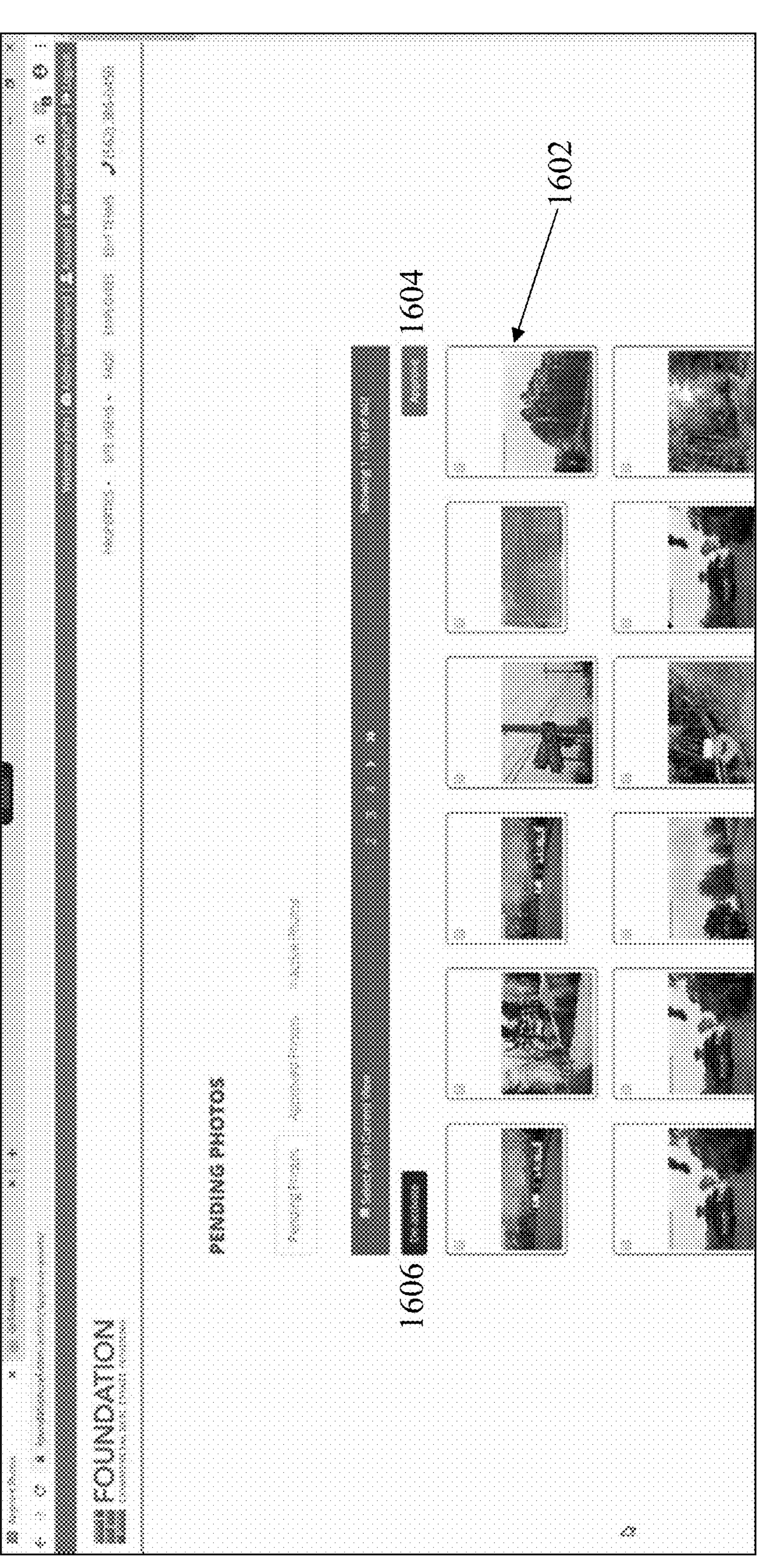
Figure 17:
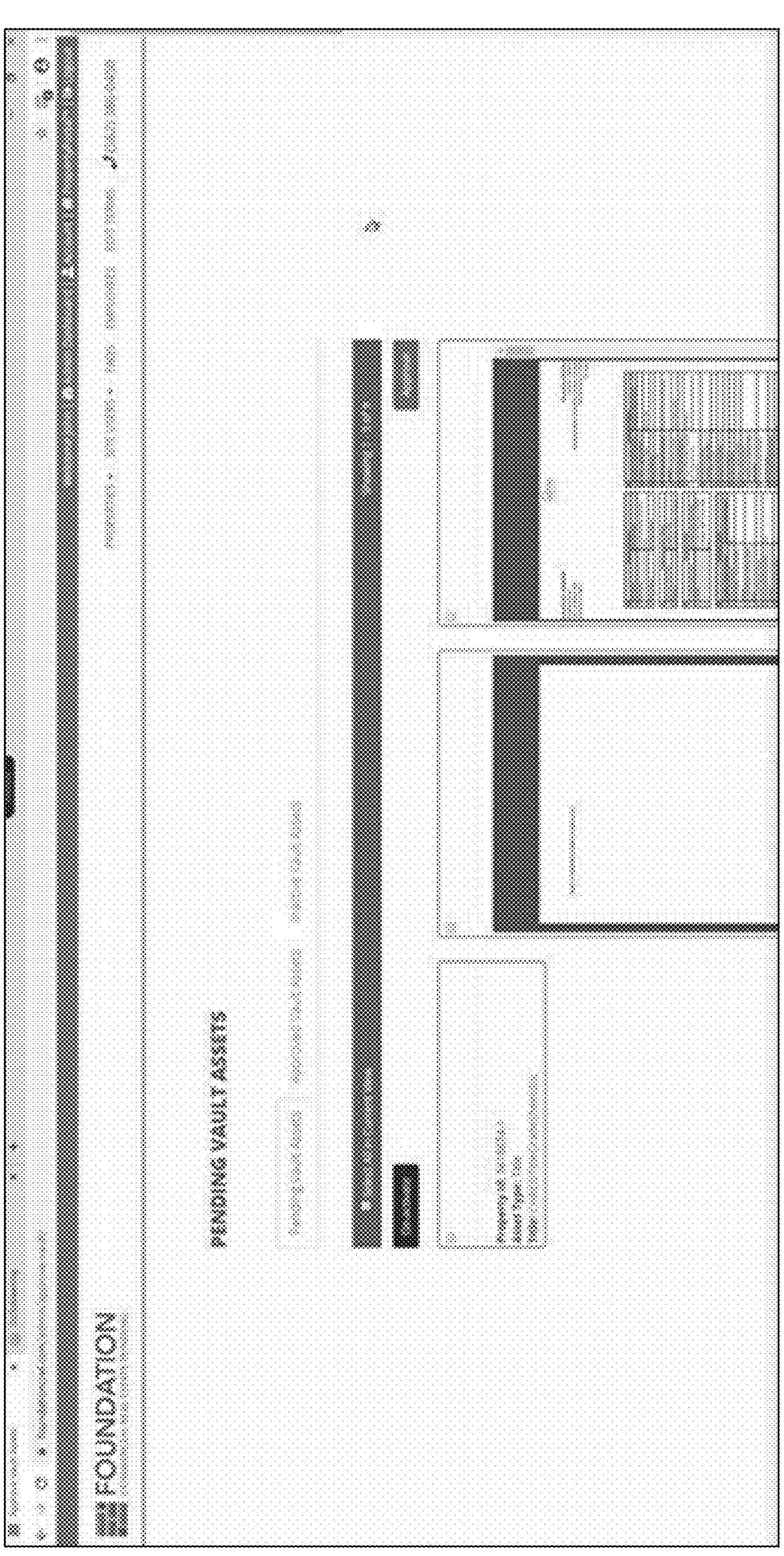

Referring now to FIG. 16, the system administrator can approve or deny various attributes and documents associated with each listing in bulk or on a unit-by-unit basis. For instance, GUI 1600 displays a list of unit pictures uploaded by the seller (e.g., picture 1602). The system administrator may select and/or deselect one or more pictures and approve or deny each picture using the interactive graphical components 1604 and 1606. If a picture is approved, the picture appears on the listing, such that potential buyers can view the pictures. Referring now to FIG. 17, the system administrator can also approve or deny documents to be uploaded, as depicted in GUI 1700. As described above, potential sellers can view/review various documents (e.g., title documents, evaluation documents, and inspection reports). Before these documents are added to the platform (to be eventually viewed by the end-users), the system administrator can review them using the GUI 1700.

Figure 18:
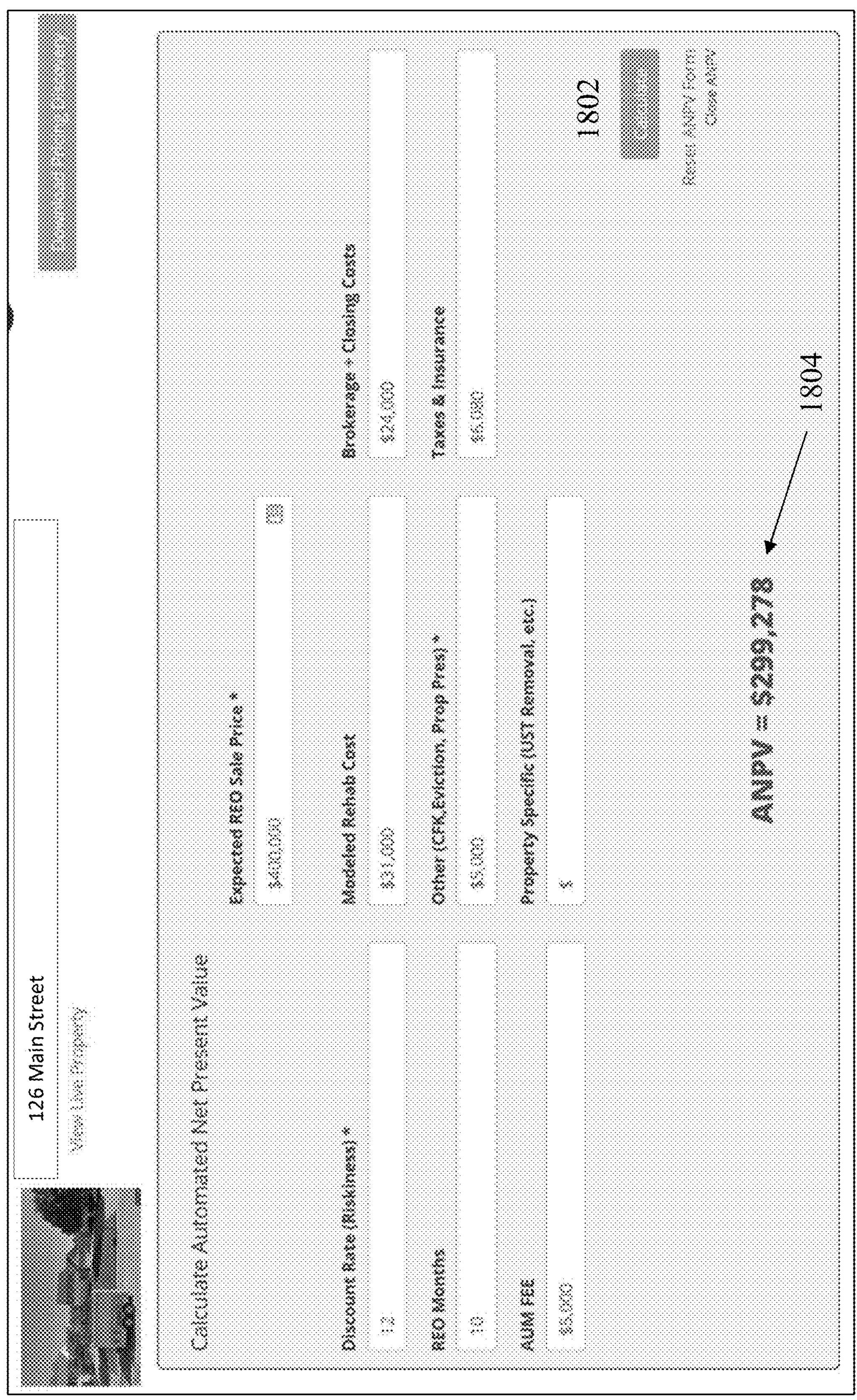

Referring now to FIG. 18, the system administrator can monitor (or calculate) net present values associated with each unit. For instance, GUI 1800 includes various input elements inquiring various values associated with each unit, such as expected rate of return on sale price, closing cost, property taxes, property renovation costs, discount rate, and various other depicted attributes. The system administrator may calculate a net present value for each unit based on the inputted values. In some embodiments, one or more of the depicted values are pre-populated by the platform using algorithms or with information input to the system database from various administrator databases via an automated application programming interface. When the values are inputted, the system administrator may interact with the graphical element 1802 to calculate a net present value of the unit (1804) to set starting bids, reserve prices and buy now prices that improve probability of successfully transacting.

Figure 19A:
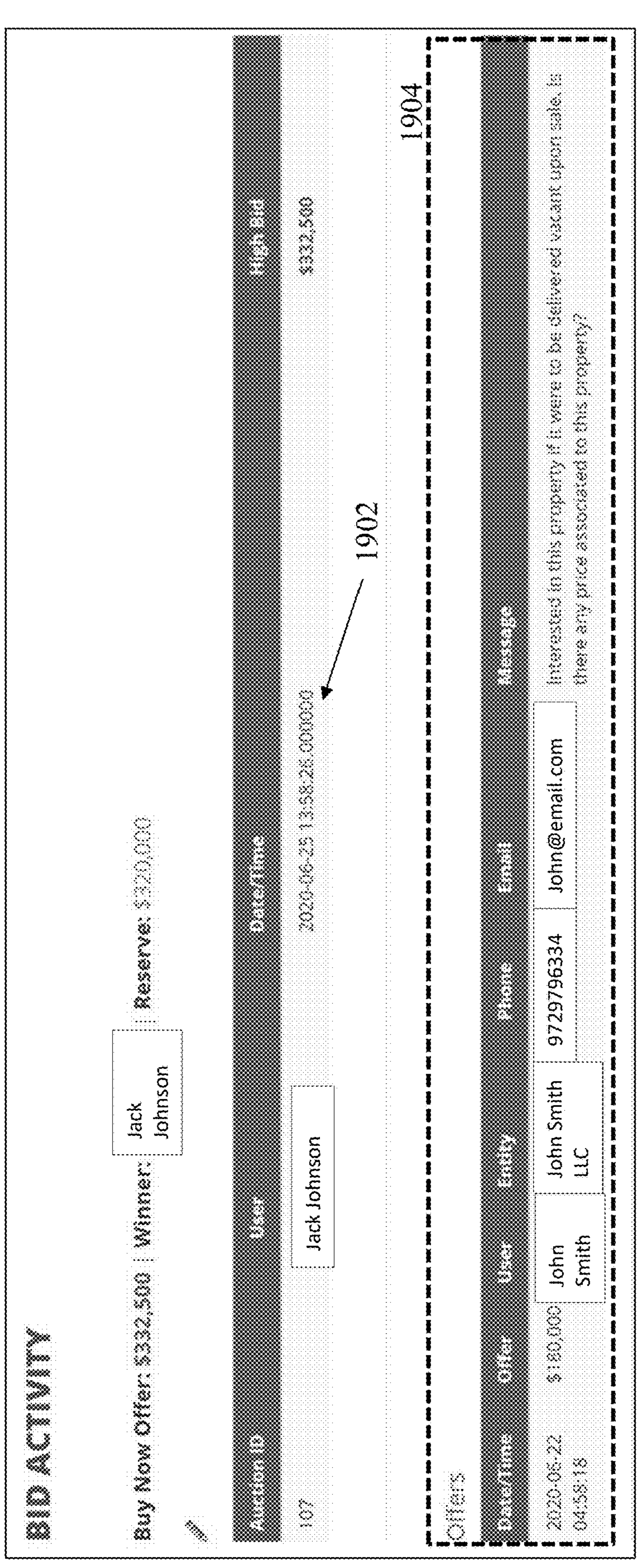
Figure 20:
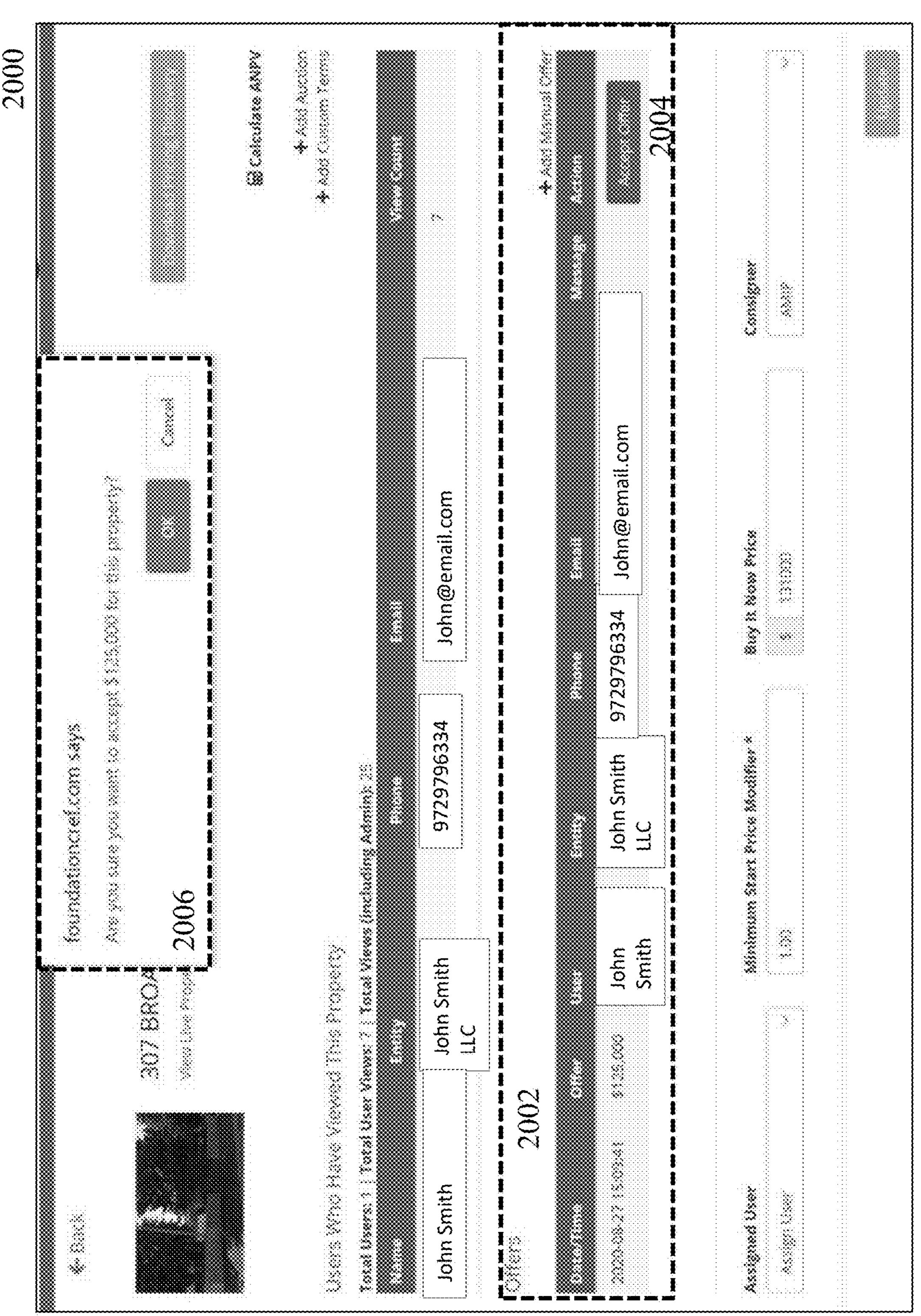
Figure 21:
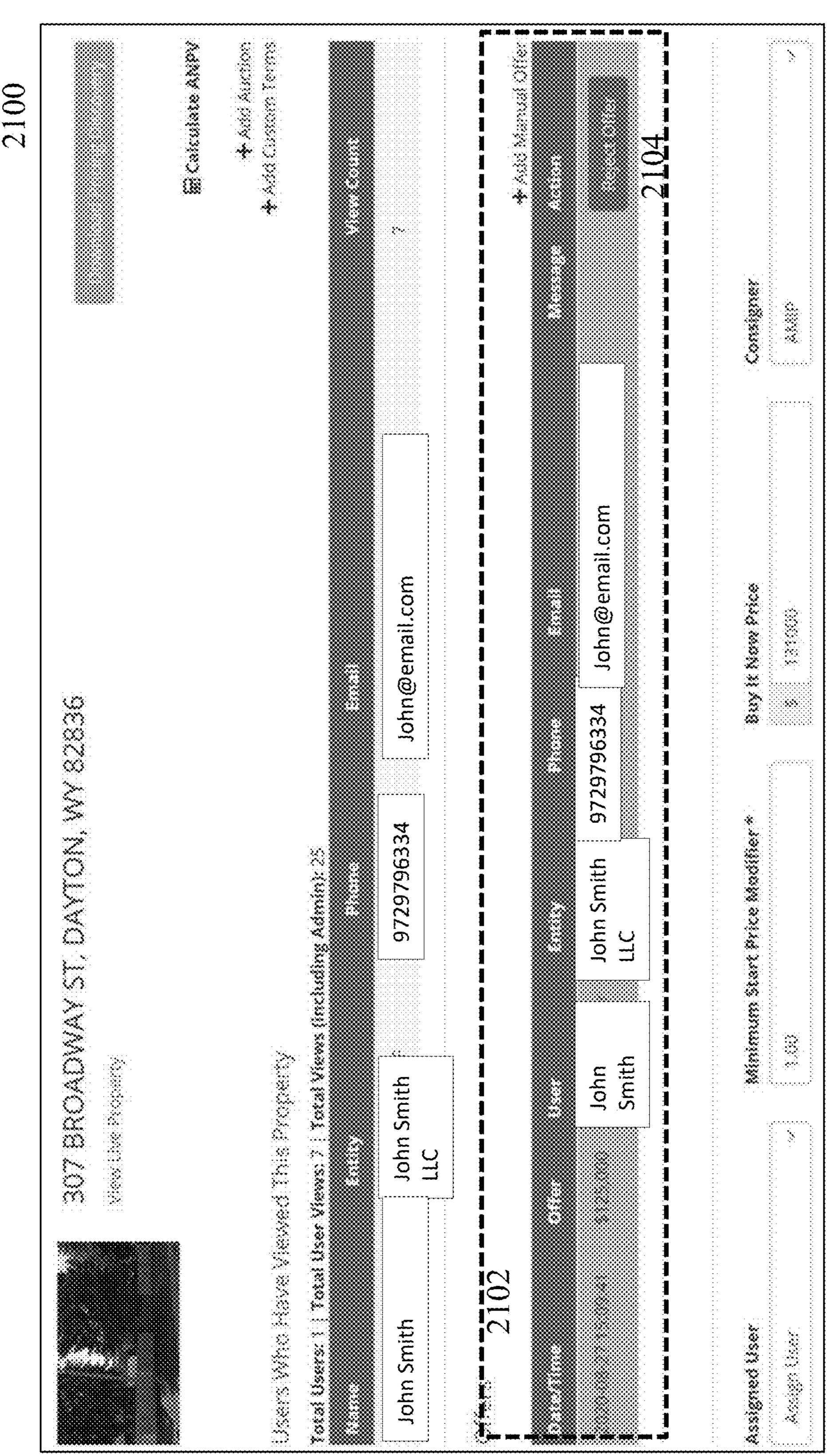

The system administrator can also monitor live events or buy now offers for one or more units listed on the platform. Referring now to FIGS. 19A-B, GUI 1900 identifies the winner of an event associated with a particular unit. GUI 1900 identifies that Jack Johnson submitted a buy now offer of $332,500, while also displaying the reserve price (e.g., the minimum price accepted in a live event). The GUI 1900 also includes a timestamp 1902 identifying a time associated with the submittal of the offer. The GUI 1900 also includes details of other bids submitted and messages (if any) provided by other potential buyers. For instance, the graphical component 1904 indicates that John Smith submitted an offer of $180,000 on June 22. The graphical component 1904 also indicates a message submitted by John Smith. The system administrator can review other offers submitted and may contact other users based on their contact information, such as via the email indicated in the graphical component 1904. As depicted in GUI 1908 in FIG. 19B, some events may include multiple bids (graphical components 1906).

As described herein, potential buyers have the option of entering into a live event or exercising the buy now option. When a unit is associated with live event, the system administrator may access GUI 2000 (FIG. 20) to monitor bidding activity and/or accept or deny various offers. For instance, the graphical component 2002 indicates that an end-user has submitted an offer of $125,000. The system administrator can interact with the interactive component 2004 to accept the offer. If the server receives an indication that the system administrator has accepted the offer, the server may display the graphical component 2006 inquiring the system administrator to confirm the acceptance.

Similarly, the system administrator may view GUI 2100 (FIG. 21) and reject the offer identified within the graphical component 2102 using the interactive graphical component 2104.

The disclosed platform may also display the GUI 2200 to allow the system administrator to monitor the live event. As described herein, the server may synchronize various GUIs disclosed herein, such as the system administrator platform and the buyer platform in real-time or near real-time, such that different users are viewing the latest and updated information. For instance, when the server receives a bid submitted by a buyer using the buyer platform, the server may update the monitoring GUI displayed on the system administrator platform. As a result, the system administrator is reviewing the latest bids received.

The GUI 2200 may be displayed after the live event has ended or displayed during the live event where the server updates the GUI 2200 in real-time or near real-time. The GUI 2200 may include the graphical component 2202 indicating that the live event has ended. The graphical component 2202 also describes a summary of the event including the start bid, reserve price, increments, buy now price, winning bid (e.g., highest bid or buy now option), identification of the winner, and status of the event (e.g., inactive if the live event has ended).

The graphical component 2204 identifies the highest bid and identification of the bid winner. The graphical component 2206 identifies a list of all users (and their corresponding contact information) who have viewed the listing and their corresponding view count. The graphical component 2208 identifies any other offers or submitted bids that were unsuccessful. For instance, as depicted in the graphical component 2208, John Smith submitted a bid for $180,000, which was lower than the starting bid as well as the buy now price offered by Jack Johnson. The GUI 2200 may also include the graphical component 2210 that identifies users who had watch listed the listing or the particular unit. Using the information described herein, the system administrator can contact other potential buyers and/or accept/reject any offers. The system administrator may use the information described herein to offer similar units to the unsuccessful users to enhance the buyer and seller experience.

In a non-limiting example, a central server generates three sets of platforms. The first platform corresponds to a buyer's platform. The buyer's platform is viewed to potential buyers and other end-users. The second platform corresponds to a seller's platform and can be viewed by any seller authorized user. The third platform (system administrator platform) can be viewed by system administrator or any other authorized user. In general, various end-users access the buyer's platform, view property listings, and submit bids. Sellers' representatives may access the seller platform to run NPV analyses for purpose of setting bids and to monitor listings and bidding activity. The system administrator may access the system administrator platform, monitor bidding activity, and accept/reject various bids.

The central server may continuously monitor user activities on all platforms and may update all graphical user interfaces described herein in real-time or near real-time.

As described above, a buyer end-user may access the buyer's platform and enter various criteria (e.g., price, location, property size). As a result, the server identifies a set of units and displays unit listings on the buyer's platform. The buyer end-user can then either enter a live event (submit a bid and compete with other buyers end-users) or can submit a buy now offer. The seller end user can simultaneously monitor all bidding activity. When the event closes or when a buyer end-user submits a buy now offer, the central server notifies a system administrator that a winning bid has been submitted. The system administrator can then access the system administrator platform to accept/reject the winning bid.

If the winning bid is accepted, the central server then generates a binding forward executable instruction ensuring that when foreclosure occurs, the buyer end-user associated with the winning bid receives title of the unit after the conclusion of the scheduled event.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the methods and embodiments described herein. Thus, the operation and behavior of the systems and methods were described without reference to the specific software code being understood that software and control hardware can be designed to implement the systems and methods based on the description herein When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system comprising:

a server comprising a hardware processor and a non-transitory computer-readable medium containing instructions that when executed by the hardware processor causes the processor to perform operations comprising:

display a first dashboard on a first user device of one or more user devices upon execution of a web application on the first user device;

receiving one or more inputs from the first user device;

in response to receiving one or more inputs from the first user device, present a first set of graphical components on the first dashboard where each graphical component of the first set of graphical components represents a real estate unit satisfying the one or more inputs and is configured to direct the first user device to a display page displaying at least one attribute of the real estate unit;

receiving a selection of a first graphical component corresponding to a first real estate unit and a first price at a time before a foreclosure event of the first real estate unit;

in response to receiving the selection of a first graphical component corresponding to a first real estate unit and a first price at a time before a foreclosure event of the first real estate unit, generate an immutable executable file based on the selection associated with the foreclosure event of the first real estate unit, the immutable executable file comprising:

a dataset comprising at least one attribute of the first real estate unit, the first price, and a computer-readable instruction configured to cause a computer to generate and submit a winning bid at the foreclosure event associated with the first real estate unit, the winning bid corresponding to any amount higher than other bidders;

store the immutable executable file in a system database and a copy of the immutable executable file on the first user device to avoid an unauthorized revision of the immutable executable file;

periodically perform hash validation between the immutable executable file and the copy of the immutable executable file to identify inconsistencies between immutable executable file and the copy of the immutable executable file;

if an inconsistency is identified, abort execution of the immutable executable file; and if no inconsistency is identified, identifying the immutable executable file for the first real estate unit at the foreclosure event for the first real estate unit and automatically execute the immutable executable file, such that the computer readable instruction of the immutable executable file causes the server to:

generate, in accordance with the computer readable instruction within the immutable executable file, a winning bid for a transaction of the first real estate unit on behalf of the first user, where the winning bid has a second price corresponding to any amount higher than other bidders, wherein the winning bid causes the real estate unit to be automatically transferred to the first user, and transmit the generated winning bid to a second server, such that the immutable executable file causes the second server to automatically block other proposed values from other digital participants at the foreclosure event.

2. The system of claim 1, wherein the instructions further cause the processor to:

display a second dashboard of the one or more dashboards on an administrator device upon execution of the web application on the administrator device.

3. The system of claim 2, wherein the instructions further cause the processor to:

display a second set of graphical components where each graphical component of the second set of graphical components represents a real estate unit.

4. The system of claim 3, wherein the instructions further cause the processor to:

present on the second dashboard a status of a corresponding real estate unit associated with the second set of graphical components, in response to an interaction with any corresponding first set of graphical components.

5. The system of claim 4, wherein the instructions further cause the processor to:

update a status of the real estate unit associated with the second set of graphical components in real time based on one or more input selections received from the one or more user devices.

6. The system of claim 5, wherein the instructions further cause the processor to:

transmit a notification to the administrator device and the one or more user devices in real time when the status of the real estate unit associated with the second set of graphical components is updated.

7. The system of claim 1, wherein the instructions further cause the processor to:

present the first set of graphical components on the first dashboard based on the one or more inputs and historical bidding data associated with the first user of the first user device.

8. The system of claim 1, wherein the one or more inputs comprises a geographical location and a type of real estate unit.

9. The system of claim 1, wherein the winning bid corresponds to a maximum balance amount associated with a mortgage of the first real estate unit.

10. The system of claim 1, wherein the first price is associated with the winning bid of an auction for the first real estate unit.

11. A method comprising:

displaying, by a server, a first dashboard on a first user device of one or more user devices upon execution of a web application on the first user device;

receiving one or more inputs from the first user device;

in response to receiving one or more inputs from the first user device, presenting, by the server, a first set of graphical components on the first dashboard where each graphical component of the first set of graphical components represents a real estate unit satisfying the one or more inputs and is configured to direct the first user device to a display page displaying at least one attribute of the real estate unit;

receiving a selection of a first graphical component corresponding to a first real estate unit and a first price at a time before a foreclosure event of the first real estate unit;

in response to receiving the selection of a first graphical component corresponding to a first real estate unit and a first price at a time before a foreclosure event of the first real estate unit, generating, by the server, an immutable executable file based on the selection associated with the foreclosure event of the first real estate unit, the immutable executable file comprising:

a dataset corresponding to at least one attribute of the first real estate unit, the first price, and a computer readable instruction configured to cause a computer to generate and submit a winning bid at the foreclosure event associated with the first real estate unit, the winning bid corresponding to any amount higher than other bidders;

storing, by the server, the immutable executable file in a system database and a copy of the immutable executable file on the first user device to avoid an unauthorized revision of the immutable executable file;

periodically perform, by the server, hash validation between the immutable executable file and the copy of the immutable executable file to identify inconsistencies between immutable executable file and the copy of the immutable executable file;

if an inconsistency is identified, aborting, by the server, execution of the immutable executable file;

if no inconsistency is identified, identifying, by the server, the immutable executable file for the first real estate unit at the foreclosure event for the first real estate unit and automatically executing the immutable executable file, such that the computer readable instruction of the immutable executable file causes the server to:

generate, by the server, in accordance with the instruction within the immutable executable file, a winning bid for a transaction of the first real estate unit on behalf of the first user, where the winning bid has a second price corresponding to any amount higher than other bidders, wherein the winning bid causes the real estate unit to be automatically transferred to the first user, and transmitting, by the server, the generated winning bid to a second server, such that the immutable executable file causes the second server to automatically block other proposed values from other digital participants at the foreclosure event.

12. The method of claim 11, further comprising:

displaying, by the server, a second dashboard of the one or more dashboards on an administrator device upon execution of the web application on the administrator device.

13. The method of claim 12, further comprising:

displaying, by the server, a second set of graphical components where each graphical component of the second set of graphical components represents a real estate unit.

14. The method of claim 13, further comprising:

presenting, by the server, on the second dashboard a status of a corresponding real estate unit associated with the second set of graphical components, in response to an interaction with any corresponding first set of graphical components.

15. The method of claim 14, further comprising:

updating, by the server, a status of the real estate unit associated with the second set of graphical components in real time based on one or more input selections received from the one or more user devices.

16. The method of claim 15, further comprising:

transmitting, by the server, a notification to the administrator device and the one or more user devices in real time when the status of the real estate unit associated with the second set of graphical components is updated.

17. The method of claim 11, further comprising:

presenting, by the server, the first set of graphical components on the first dashboard based on the one or more inputs and historical bidding data associated with the first user of the first user device.

18. The method of claim 11, wherein the one or more inputs comprises a geographical location and a type of real estate unit.

19. The method of claim 11, wherein the winning bid corresponds to a maximum balance amount associated with a mortgage of the first real estate unit.

20. The method of claim 11, wherein the first price is associated with the winning bid of an auction for the first real estate unit.

* * * * *